US012588063B2

(12) United States Patent
Taherzadeh Boroujeni et al.

(10) Patent No.: US 12,588,063 B2
(45) Date of Patent: Mar. 24, 2026

(54) TECHNIQUES FOR INDICATING MESSAGE REPETITION PARAMETERS

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 554 days.

(21) Appl. No.: 17/671,350

(22) Filed: Feb. 14, 2022

(65) Prior Publication Data

US 2022/0322450 A1 Oct. 6, 2022

Related U.S. Application Data

(60) Provisional application No. 63/173,698, filed on Apr. 12, 2021, provisional application No. 63/171,055, filed on Apr. 5, 2021.

(51) Int. Cl.
*H04W 74/0833* (2024.01)
*H04W 74/0838* (2024.01)

(52) U.S. Cl.
CPC .... *H04W 74/0833* (2013.01); *H04W 74/0838* (2024.01)

(58) Field of Classification Search
CPC ..... H04L 5/0091; H04L 5/001; H04L 5/0053; H04L 1/08; H04W 74/0833
See application file for complete search history.

(56) References Cited

U.S. PATENT DOCUMENTS

| | | | | |
|---|---|---|---|---|
| 2015/0085717 A1* | 3/2015 | Papasakellariou | .... | H04W 72/30 370/280 |
| 2018/0070278 A1* | 3/2018 | Uemura | ................ | H04W 48/00 |
| 2019/0045552 A1* | 2/2019 | Blankenship | ......... | H04W 72/21 |
| 2020/0015258 A1* | 1/2020 | Zhou | ..................... | H04W 72/20 |
| 2020/0037293 A1* | 1/2020 | Reial | ..................... | H04W 48/08 |

(Continued)

FOREIGN PATENT DOCUMENTS

JP 2017509187 A 3/2017

OTHER PUBLICATIONS

International Search Report and Written Opinion—PCT/US2022/016429—ISA/EPO—Jul. 29, 2022.

(Continued)

*Primary Examiner* — Syed Ali
(74) *Attorney, Agent, or Firm* — Holland & Hart LLP/Qualcomm Incorporated

(57) ABSTRACT

Techniques and devices for wireless communications are described. A base station may indicate to a user equipment (UE) repetition parameters for an uplink message using transmission parameters in a response message of a random access channel (RACH) procedure. In some examples, the base station may transmit system information to the UE configuring a mapping between the transmission parameters and the repetition parameters, for example based on a repetition request or a capability indication in a random access request from the UE. The indications in the response message configuring uplink message repetitions may enable increased system efficiency and reduced latency at the UE, among other benefits.

27 Claims, 24 Drawing Sheets

(56) References Cited

U.S. PATENT DOCUMENTS

| | | | | |
|---|---|---|---|---|
| 2020/0389922 | A1* | 12/2020 | Xu | H04L 5/0098 |
| 2021/0051707 | A1 | 2/2021 | Rastegardoost et al. | |
| 2022/0124822 | A1* | 4/2022 | Taherzadeh Boroujeni | H04W 72/23 |
| 2022/0132590 | A1* | 4/2022 | Chen | H04L 1/1893 |
| 2022/0322443 | A1* | 10/2022 | Kwak | H04W 74/0836 |
| 2022/0377798 | A1* | 11/2022 | Chien | H04L 1/1812 |
| 2023/0015843 | A1* | 1/2023 | Li | H04W 74/0891 |
| 2023/0092324 | A1* | 3/2023 | Seidel | H04W 74/0833 370/329 |
| 2023/0180301 | A1* | 6/2023 | Seidel | H04W 74/006 370/329 |
| 2024/0031056 | A1* | 1/2024 | Rastegardoost | H04W 74/0833 |
| 2024/0049276 | A1* | 2/2024 | Mu | H04L 1/08 |

OTHER PUBLICATIONS

Partial International Search Report—PCT/US2022/016429—ISA/EPO—Jun. 8, 2022.
CMCC: "Discussion on PUCCH Enhancements", 3GPP TSG RAN WG1 #105-e, R1-2104628, e-Meeting, May 10-27, 2021, 2 Pages.

* cited by examiner

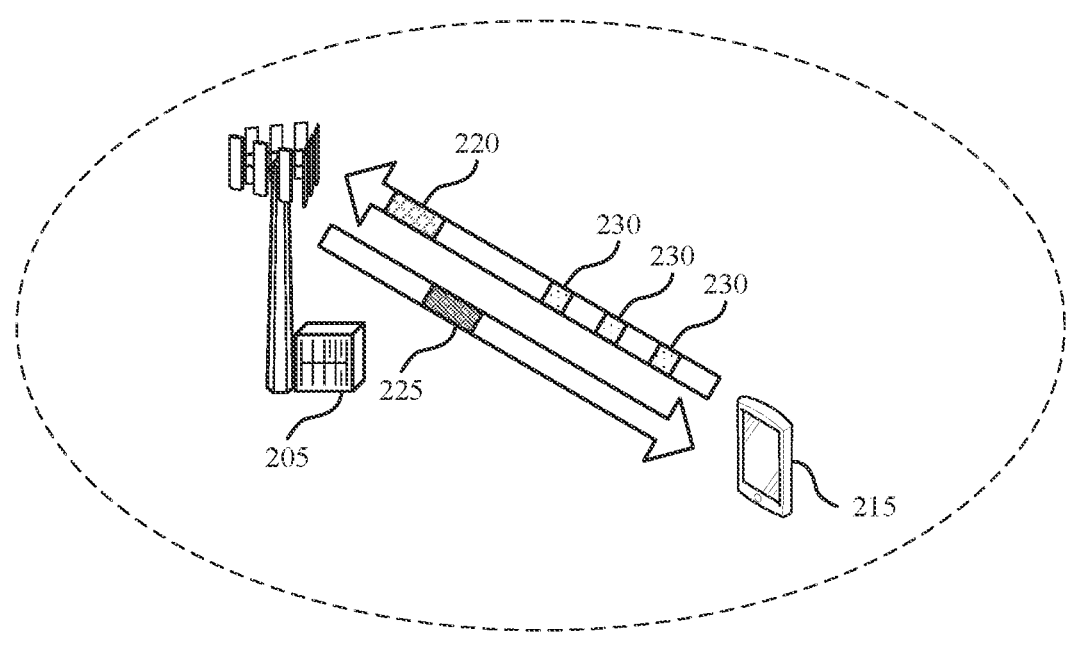
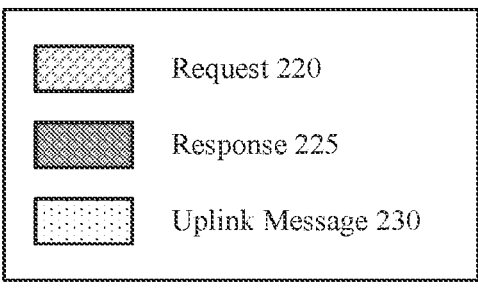
FIG. 2

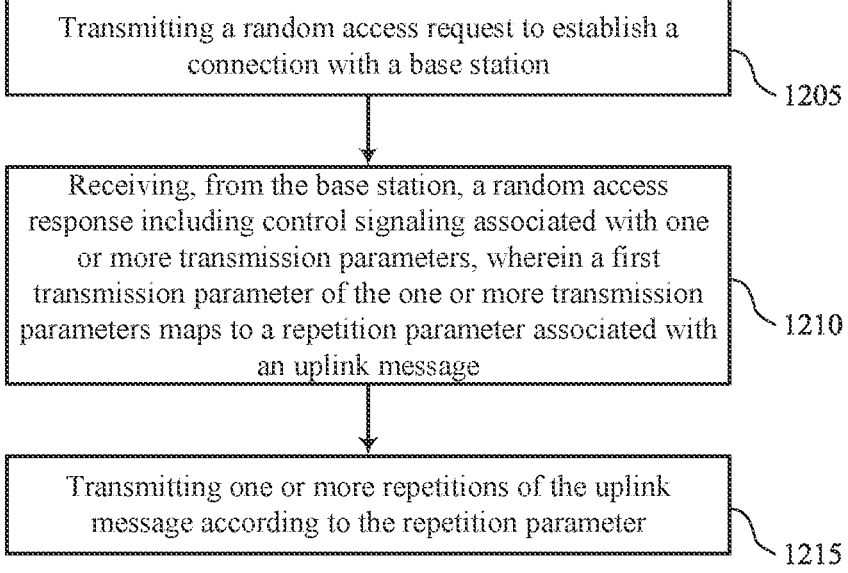

Transmitting a random access request to establish a connection with a base station

1205

Receiving, from the base station, a random access response including control signaling associated with one or more transmission parameters, wherein a first transmission parameter of the one or more transmission parameters maps to a repetition parameter associated with an uplink message

1210

Transmitting one or more repetitions of the uplink message according to the repetition parameter

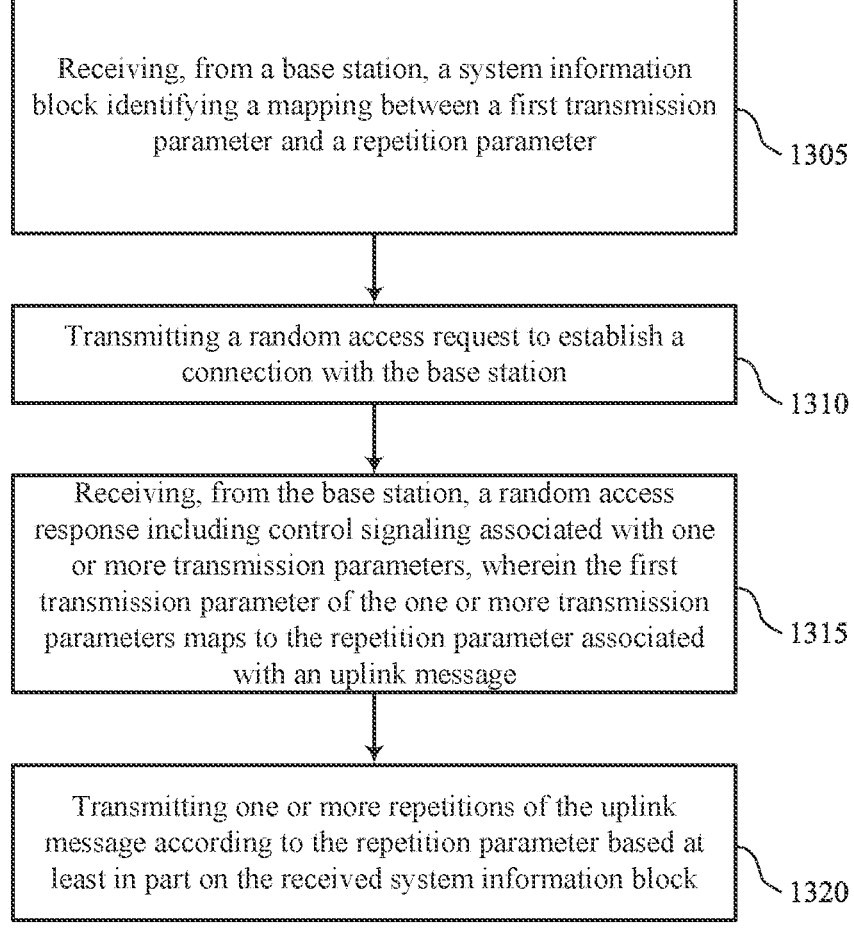

Receiving, from a base station, a system information block identifying a mapping between a first transmission parameter and a repetition parameter

1305

Transmitting a random access request to establish a connection with the base station

1310

Receiving, from the base station, a random access response including control signaling associated with one or more transmission parameters, wherein the first transmission parameter of the one or more transmission parameters maps to the repetition parameter associated with an uplink message

1315

Transmitting one or more repetitions of the uplink message according to the repetition parameter based at least in part on the received system information block

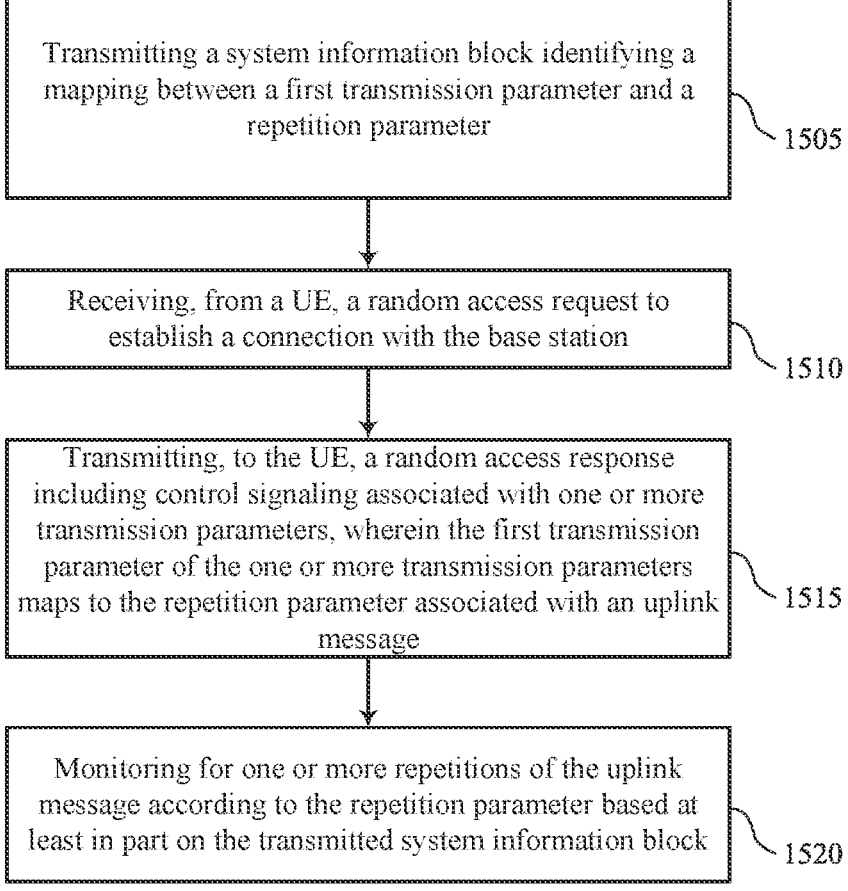

Transmitting a system information block identifying a mapping between a first transmission parameter and a repetition parameter

1505

Receiving, from a UE, a random access request to establish a connection with the base station

1510

Transmitting, to the UE, a random access response including control signaling associated with one or more transmission parameters, wherein the first transmission parameter of the one or more transmission parameters maps to the repetition parameter associated with an uplink message

1515

Monitoring for one or more repetitions of the uplink message according to the repetition parameter based at least in part on the transmitted system information block

Receiving, from a base station, system information comprising a random access response (RAR) configuration, the RAR configuration indicating a plurality of intervals of a RAR window which indicates a time period during which a second random access message is to be received, and each interval of the plurality of intervals corresponding to a distinct transmission configuration of a third random access message

702

Sending, to the base station, a first random access message requesting to initiate a random access procedure

704

Receiving, from the base station in response to sending the first random access message, the second random access message during the RAR window

706

Determining a particular interval of the plurality of intervals of the RAR window according to timing information of the second random access message comprising at least one of a time at which the second random access message was received and physical downlink control channel (PDCCH) scheduling of the second random access message

708

Sending one or more times, to the base station, the third random access message according to the distinct transmission configuration corresponding to the particular interval

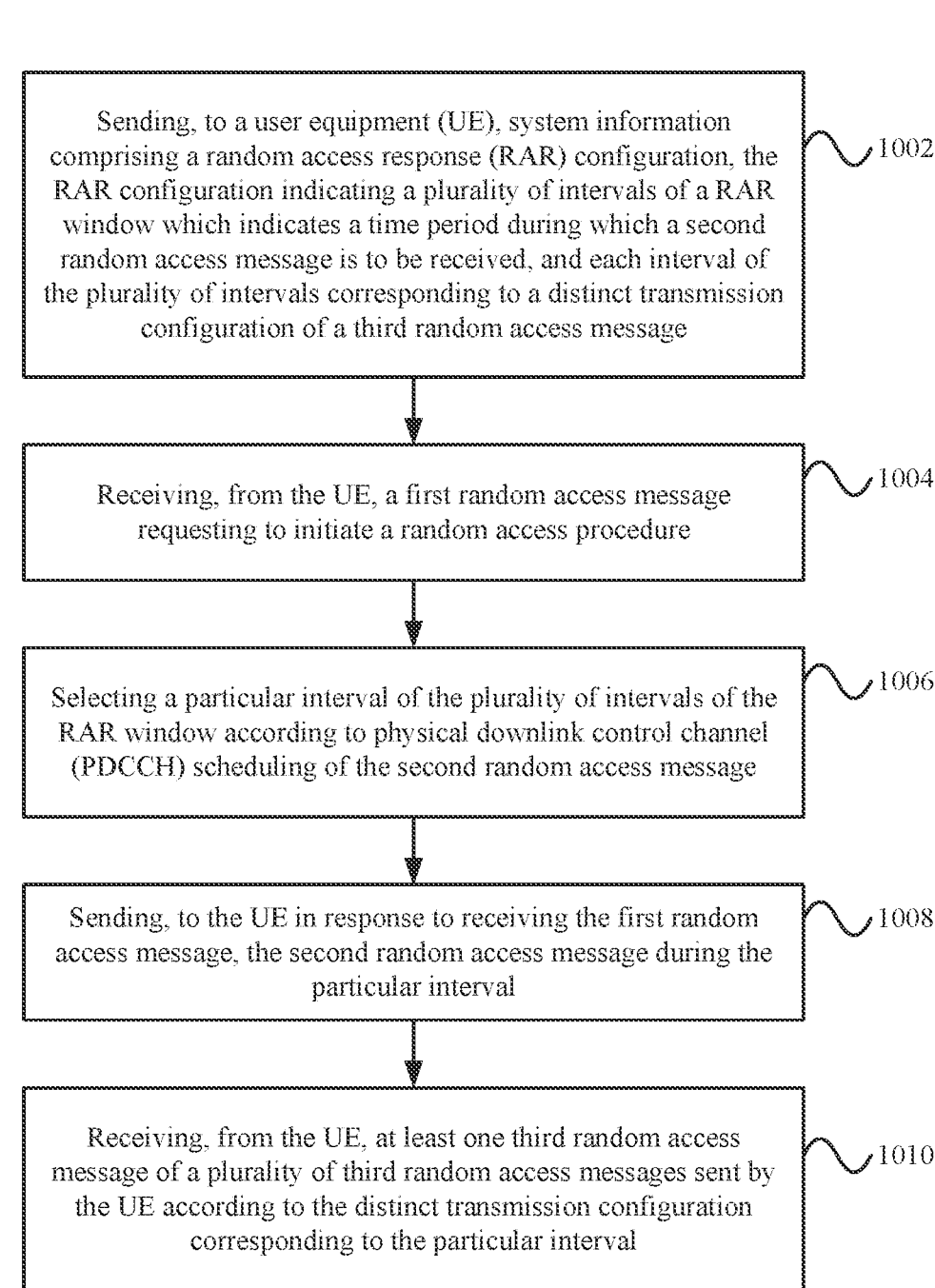

Sending, to a user equipment (UE), system information comprising a random access response (RAR) configuration, the RAR configuration indicating a plurality of intervals of a RAR window which indicates a time period during which a second random access message is to be received, and each interval of the plurality of intervals corresponding to a distinct transmission configuration of a third random access message    1002

Receiving, from the UE, a first random access message requesting to initiate a random access procedure    1004

Selecting a particular interval of the plurality of intervals of the RAR window according to physical downlink control channel (PDCCH) scheduling of the second random access message    1006

Sending, to the UE in response to receiving the first random access message, the second random access message during the particular interval    1008

Receiving, from the UE, at least one third random access message of a plurality of third random access messages sent by the UE according to the distinct transmission configuration corresponding to the particular interval    1010

FIG. 25

TECHNIQUES FOR INDICATING MESSAGE REPETITION PARAMETERS

CROSS REFERENCES

The present Application for Patent claims the benefit of U.S. Provisional Patent Application No. 63/171,055 by TAHERZADEH BOROUJENI et al., entitled "TECHNIQUES FOR INDICATING MESSAGE REPETITION PARAMETERS," filed Apr. 5, 2021, and U.S. Provisional Patent Application No. 63/173,698 by TAHERZADEH BOROUJENI et al., entitled "RANDOM ACCESS MESSAGE 3 REPETITION INDICATION VIA RANDOM ACCESS MESSAGE 2 TIMING," filed Apr. 12, 2021, each of which is assigned to the assignee hereof and hereby incorporated by reference in its entirety.

FIELD OF DISCLOSURE

The following relates to wireless communications, including techniques for indicating message repetition parameters and for performing random access procedures with repeated transmissions of random access message 3.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (UE) systems, UE-Advanced (UE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may be configured to establish a connection with a base station using a random access channel (RACH) procedure. However, for some use cases, conventional RACH techniques may be deficient or suboptimal in some current configurations.

In some cases, wireless communications may include random access procedures that allow UE to initiate and/or resume communications with a network (e.g., a base station). Under some channel conditions, various messages of the random access procedures may not be received correctly, which may delay and/or prevent the UE from communicating with the network.

SUMMARY

The described techniques relate to improved methods, systems, devices, and apparatuses that support techniques for indicating message repetition parameters. For example, the described techniques provide for enabling a base station to indicate to a user equipment (UE) repetition parameters for an uplink message using transmission parameters in a response message of a random access channel (RACH) procedure. In some examples, the base station may transmit system information to the UE configuring a mapping between the transmission parameters and the repetition parameters, for example based on a repetition request or a capability indication in a random access request from the UE. The indications in the response message configuring uplink message repetitions may enable increased system efficiency and reduced latency at the UE, among other benefits.

A method for wireless communications at a UE is described. The method may include transmitting a random access request to establish a connection with a base station, receiving, from the base station, a random access response (RAR) including control signaling associated with one or more transmission parameters, where a first transmission parameter of the one or more transmission parameters maps to a repetition parameter associated with an uplink message, and transmitting one or more repetitions of the uplink message according to the repetition parameter.

An apparatus for wireless communications at a UE is described. The apparatus may include a processor, memory coupled with the processor, and instructions stored in the memory. The instructions may be executable by the processor to cause the apparatus to transmit a random access request to establish a connection with a base station, receive, from the base station, a RAR including control signaling associated with one or more transmission parameters, where a first transmission parameter of the one or more transmission parameters maps to a repetition parameter associated with an uplink message, and transmit one or more repetitions of the uplink message according to the repetition parameter.

Another apparatus for wireless communications at a UE is described. The apparatus may include means for transmitting a random access request to establish a connection with a base station, means for receiving, from the base station, a RAR including control signaling associated with one or more transmission parameters, where a first transmission parameter of the one or more transmission parameters maps to a repetition parameter associated with an uplink message, and means for transmitting one or more repetitions of the uplink message according to the repetition parameter.

A non-transitory computer-readable medium storing code for wireless communications at a UE is described. The code may include instructions executable by a processor to transmit a random access request to establish a connection with a base station, receive, from the base station, a RAR including control signaling associated with one or more transmission parameters, where a first transmission parameter of the one or more transmission parameters maps to a repetition parameter associated with an uplink message, and transmit one or more repetitions of the uplink message according to the repetition parameter.

Some examples of the method, apparatuses, and non-transitory computer-readable medium described herein may further include operations, features, means, or instructions for receiving, from the base station, a SIB identifying a mapping between the first transmission parameter and the repetition parameter, where the one or more repetitions of the uplink message may be transmitted based on the received SIB.

Some examples of the method, apparatuses, and non-transitory computer-readable medium described herein may further include operations, features, means, or instructions for detecting a control channel element in the received RAR, where the first transmission parameter includes a location of the detected control channel element in a control resource set (CORESET) of the RAR.

In some examples of the method, apparatuses, and non-transitory computer-readable medium described herein, the repetition parameter may be based on an index of the detected control channel element.

Some examples of the method, apparatuses, and non-transitory computer-readable medium described herein may further include operations, features, means, or instructions for detecting an aggregation level associated with the received RAR, where the first transmission parameter includes the detected aggregation level.

Some examples of the method, apparatuses, and non-transitory computer-readable medium described herein may further include operations, features, means, or instructions for detecting a reference signal sequence associated with the received RAR, where the first transmission parameter includes the detected reference signal sequence.

In some examples of the method, apparatuses, and non-transitory computer-readable medium described herein, transmitting the random access request may include operations, features, means, or instructions for transmitting, in the random access request, a capability indication, where the one or more transmission parameters associated with the received RAR may be based on the transmitted capability indication.

In some examples of the method, apparatuses, and non-transitory computer-readable medium described herein, transmitting the random access request may include operations, features, means, or instructions for transmitting, in the random access request, a repetition request, where the one or more transmission parameters associated with the received RAR may be based on the transmitted repetition request.

In some examples of the method, apparatuses, and non-transitory computer-readable medium described herein, a second transmission parameter associated with the received RAR maps to a second repetition parameter of the uplink message and the one or more repetitions may be transmitted according to the second repetition parameter.

In some examples of the method, apparatuses, and non-transitory computer-readable medium described herein, the repetition parameter includes an indication of a presence of repetitions, a quantity of repetitions, an inter-slot frequency hopping pattern, an intra-slot frequency hopping pattern, a joint channel estimation configuration across the one or more repetitions, or any combination thereof.

In some examples of the method, apparatuses, and non-transitory computer-readable medium described herein, the received RAR includes a physical downlink control channel (PDCCH).

A method is described. The method may include receiving, from a base station, system information including a RAR configuration, the RAR configuration indicating a set of multiple intervals of a RAR window which indicates a time period during which a second random access message is to be received, and each interval of the set of multiple intervals corresponding to a distinct transmission configuration of a third random access message, sending, to the base station, a first random access message requesting to initiate a random access operation, receiving, from the base station in response to sending the first random access message, the second random access message during the RAR window, determining a particular interval of the set of multiple intervals of the RAR window according to timing information of the second random access message including at least one of a time at which the second random access message was received and PDCCH scheduling of the second random access message, and sending one or more times, to the base station, the third random access message according to the distinct transmission configuration corresponding to the particular interval.

An apparatus is described. The apparatus may include a processor, memory coupled with the processor, and instructions stored in the memory. The instructions may be executable by the processor to cause the apparatus to receive, from a base station, system information including a RAR configuration, the RAR configuration indicating a set of multiple intervals of a RAR window which indicates a time period during which a second random access message is to be received, and each interval of the set of multiple intervals corresponding to a distinct transmission configuration of a third random access message, send, to the base station, a first random access message requesting to initiate a random access operation, receive, from the base station in response to sending the first random access message, the second random access message during the RAR window, determine a particular interval of the set of multiple intervals of the RAR window according to timing information of the second random access message including at least one of a time at which the second random access message was received and PDCCH scheduling of the second random access message, and send one or more times, to the base station, the third random access message according to the distinct transmission configuration corresponding to the particular interval.

Another apparatus is described. The apparatus may include means for receiving, from a base station, system information including a RAR configuration, the RAR configuration indicating a set of multiple intervals of a RAR window which indicates a time period during which a second random access message is to be received, and each interval of the set of multiple intervals corresponding to a distinct transmission configuration of a third random access message, means for sending, to the base station, a first random access message requesting to initiate a random access operation, means for receiving, from the base station in response to sending the first random access message, the second random access message during the RAR window, means for determining a particular interval of the set of multiple intervals of the RAR window according to timing information of the second random access message including at least one of a time at which the second random access message was received and PDCCH scheduling of the second random access message, and means for sending one or more times, to the base station, the third random access message according to the distinct transmission configuration corresponding to the particular interval.

A non-transitory computer-readable medium storing code is described. The code may include instructions executable by a processor to receive, from a base station, system information including a RAR configuration, the RAR configuration indicating a set of multiple intervals of a RAR window which indicates a time period during which a second random access message is to be received, and each interval of the set of multiple intervals corresponding to a distinct transmission configuration of a third random access message, send, to the base station, a first random access message requesting to initiate a random access operation, receive, from the base station in response to sending the first random access message, the second random access message during the RAR window, determine a particular interval of the set of multiple intervals of the RAR window according to timing information of the second random access message including at least one of a time at which the second random access message was received and PDCCH scheduling of the second random access message, and send one or more times, to the base station, the third random access message according to the distinct transmission configuration corresponding to the particular interval.

In some examples of the method, apparatuses, and non-transitory computer-readable medium described herein, the distinct transmission configuration may include operations, features, means, or instructions for an indicator indicating a quantity of third random access message transmission repetitions to be sent by the UE.

In some examples of the method, apparatuses, and non-transitory computer-readable medium described herein, a first distinct transmission configuration may include operations, features, means, or instructions for the indicator indicating a first quantity of the third random access message transmission repetitions to be sent by the UE, the first quantity being an integer greater than zero.

In some examples of the method, apparatuses, and non-transitory computer-readable medium described herein, the distinct transmission configuration includes an indication of whether the third random access message may be to be sent using inter-slot frequency-hopping and receiving the second random access message includes receiving, from the base station via the PDCCH, the second random access message.

In some examples of the method, apparatuses, and non-transitory computer-readable medium described herein, determining the particular interval of the set of multiple intervals of the RAR window may include operations, features, means, or instructions for recording a first time at which the first random access message was sent, measuring a second time at which the second random access message was received, calculating a time offset between the first time and the second time, and determining, according to the time offset, the particular interval of the set of multiple intervals of the RAR window.

In some examples of the method, apparatuses, and non-transitory computer-readable medium described herein, sending the first random access message may include operations, features, means, or instructions for sending, to the base station, the first random access message including capability information of the UE indicating that the UE may be capable of sending the third random access message the one or more times according to the RAR configuration.

In some examples of the method, apparatuses, and non-transitory computer-readable medium described herein, sending the first random access message may include operations, features, means, or instructions for sending, to the base station, the first random access message including a request to send the third random access message the one or more times according to the RAR configuration.

In some examples of the method, apparatuses, and non-transitory computer-readable medium described herein, sending the first random access message may include operations, features, means, or instructions for sending, to the base station via a physical random access channel (PRACH), the first random access message including a radio network temporary identifier (RNTI) corresponding to the UE.

In some examples of the method, apparatuses, and non-transitory computer-readable medium described herein, sending the third random access message may include operations, features, means, or instructions for sending, to the base station via a physical uplink shared channel (PUSCH), the third random access message according to the distinct transmission configuration corresponding to the particular interval.

In some examples of the method, apparatuses, and non-transitory computer-readable medium described herein, receiving the second random access message during the RAR window may include operations, features, means, or instructions for receiving, from the base station, the second random access message including information corresponding to the UE and at least one other device, the time at which the second random access message was received indirectly indicating, without increasing a data size of the second random access message, a particular transmission configuration of the third random access message.

A method for wireless communications at a UE is described. The method may include transmitting a random access request to establish a connection with a base station, receiving, from the base station, a RAR including control signaling associated with one or more transmission parameters, where a first transmission parameter of the one or more transmission parameters maps to a repetition parameter associated with an uplink message, and transmitting one or more repetitions of the uplink message according to the repetition parameter.

An apparatus for wireless communications at a UE is described. The apparatus may include a processor, memory coupled with the processor, and instructions stored in the memory. The instructions may be executable by the processor to cause the apparatus to transmit a random access request to establish a connection with a base station, receive, from the base station, a RAR including control signaling associated with one or more transmission parameters, where a first transmission parameter of the one or more transmission parameters maps to a repetition parameter associated with an uplink message, and transmit one or more repetitions of the uplink message according to the repetition parameter.

Another apparatus for wireless communications at a UE is described. The apparatus may include means for transmitting a random access request to establish a connection with a base station, means for receiving, from the base station, a RAR including control signaling associated with one or more transmission parameters, where a first transmission parameter of the one or more transmission parameters maps to a repetition parameter associated with an uplink message, and means for transmitting one or more repetitions of the uplink message according to the repetition parameter.

A non-transitory computer-readable medium storing code for wireless communications at a UE is described. The code may include instructions executable by a processor to transmit a random access request to establish a connection with a base station, receive, from the base station, a RAR including control signaling associated with one or more transmission parameters, where a first transmission parameter of the one or more transmission parameters maps to a repetition parameter associated with an uplink message, and transmit one or more repetitions of the uplink message according to the repetition parameter.

Some examples of the method, apparatuses, and non-transitory computer-readable medium described herein may further include operations, features, means, or instructions for receiving, from the base station, a system information block (SIB) identifying a mapping between the first transmission parameter and the repetition parameter, where the one or more repetitions of the uplink message may be transmitted based on the received SIB.

Some examples of the method, apparatuses, and non-transitory computer-readable medium described herein may further include operations, features, means, or instructions for detecting a control channel element in the received RAR, where the first transmission parameter includes a location of the detected control channel element in a CORESET of the RAR.

In some examples of the method, apparatuses, and non-transitory computer-readable medium described herein, the repetition parameter may be based on an index of the detected control channel element.

Some examples of the method, apparatuses, and non-transitory computer-readable medium described herein may further include operations, features, means, or instructions for detecting an aggregation level associated with the received RAR, where the first transmission parameter includes the detected aggregation level.

Some examples of the method, apparatuses, and non-transitory computer-readable medium described herein may further include operations, features, means, or instructions for detecting a reference signal sequence associated with the received RAR, where the first transmission parameter includes the detected reference signal sequence.

In some examples of the method, apparatuses, and non-transitory computer-readable medium described herein, transmitting the random access request may include operations, features, means, or instructions for transmitting, in the random access request, a capability indication, where the one or more transmission parameters associated with the received RAR may be based on the transmitted capability indication.

In some examples of the method, apparatuses, and non-transitory computer-readable medium described herein, transmitting the random access request may include operations, features, means, or instructions for transmitting, in the random access request, a repetition request, where the one or more transmission parameters associated with the received RAR may be based on the transmitted repetition request.

In some examples of the method, apparatuses, and non-transitory computer-readable medium described herein, a second transmission parameter associated with the received RAR maps to a second repetition parameter of the uplink message and the one or more repetitions may be transmitted according to the second repetition parameter.

In some examples of the method, apparatuses, and non-transitory computer-readable medium described herein, the repetition parameter includes an indication of a presence of repetitions, a quantity of repetitions, an inter-slot frequency hopping pattern, an intra-slot frequency hopping pattern, a joint channel estimation configuration across the one or more repetitions, or any combination thereof.

In some examples of the method, apparatuses, and non-transitory computer-readable medium described herein, the received RAR includes a PDCCH.

A method for wireless communications at a base station is described. The method may include receiving, from a UE, a random access request to establish a connection with the base station, transmitting, to the UE, a RAR including control signaling associated with one or more transmission parameters, where a first transmission parameter of the one or more transmission parameters maps to a repetition parameter associated with an uplink message, and monitoring for one or more repetitions of the uplink message according to the repetition parameter.

An apparatus for wireless communications at a base station is described. The apparatus may include a processor, memory coupled with the processor, and instructions stored in the memory. The instructions may be executable by the processor to cause the apparatus to receive, from a UE, a random access request to establish a connection with the base station, transmit, to the UE, a RAR including control signaling associated with one or more transmission parameters, where a first transmission parameter of the one or more transmission parameters maps to a repetition parameter associated with an uplink message, and monitor for one or more repetitions of the uplink message according to the repetition parameter.

Another apparatus for wireless communications at a base station is described. The apparatus may include means for receiving, from a UE, a random access request to establish a connection with the base station, means for transmitting, to the UE, a RAR including control signaling associated with one or more transmission parameters, where a first transmission parameter of the one or more transmission parameters maps to a repetition parameter associated with an uplink message, and means for monitoring for one or more repetitions of the uplink message according to the repetition parameter.

A non-transitory computer-readable medium storing code for wireless communications at a base station is described. The code may include instructions executable by a processor to receive, from a UE, a random access request to establish a connection with the base station, transmit, to the UE, a RAR including control signaling associated with one or more transmission parameters, where a first transmission parameter of the one or more transmission parameters maps to a repetition parameter associated with an uplink message, and monitor for one or more repetitions of the uplink message according to the repetition parameter.

Some examples of the method, apparatuses, and non-transitory computer-readable medium described herein may further include operations, features, means, or instructions for transmitting a SIB identifying a mapping between the first transmission parameter and the repetition parameter, where the monitoring for the one or more repetitions of the uplink message may be based on the transmitted SIB.

In some examples of the method, apparatuses, and non-transitory computer-readable medium described herein, transmitting the RAR may include operations, features, means, or instructions for transmitting a control channel element in the RAR, where the first transmission parameter includes a location of the transmitted control channel element in a CORESET of the RAR.

In some examples of the method, apparatuses, and non-transitory computer-readable medium described herein, the repetition parameter may be based on an index of the transmitted control channel element.

In some examples of the method, apparatuses, and non-transitory computer-readable medium described herein, transmitting the RAR may include operations, features, means, or instructions for transmitting the RAR according to an aggregation level, where the first transmission parameter includes the aggregation level.

In some examples of the method, apparatuses, and non-transitory computer-readable medium described herein, transmitting the RAR may include operations, features, means, or instructions for transmitting a reference signal sequence associated with the transmitted RAR, where the first transmission parameter includes the transmitted reference signal sequence.

In some examples of the method, apparatuses, and non-transitory computer-readable medium described herein, receiving the random access request may include operations, features, means, or instructions for receiving, in the random access request, a capability indication, where the one or more transmission parameters associated with the transmitted RAR may be based on the received capability indication.

In some examples of the method, apparatuses, and non-transitory computer-readable medium described herein, receiving the random access request may include operations, features, means, or instructions for receiving, in the random access request, a repetition request, where the one or more transmission parameters associated with the transmitted RAR may be based on the received repetition request.

In some examples of the method, apparatuses, and non-transitory computer-readable medium described herein, a second transmission parameter associated with the transmitted RAR maps to a second repetition parameter of the uplink message and the monitoring for the one or more repetitions of the uplink message may be according to the second repetition parameter.

In some examples of the method, apparatuses, and non-transitory computer-readable medium described herein, the repetition parameter includes an indication of a presence of repetitions, a quantity of repetitions, an inter-slot frequency hopping pattern, an intra-slot frequency hopping pattern, a joint channel estimation configuration across the one or more repetitions, or any combination thereof.

In some examples of the method, apparatuses, and non-transitory computer-readable medium described herein, the transmitted RAR includes a PDCCH.

A method is described. The method may include receiving, from a base station, system information including a RAR configuration, the RAR configuration indicating a set of multiple intervals of a RAR window which indicates a time period during which a second random access message is to be received, and each interval of the set of multiple intervals corresponding to a distinct transmission configuration of a third random access message, sending, to the base station, a first random access message requesting to initiate a random access procedure, receiving, from the base station in response to sending the first random access message, the second random access message during the RAR window, determining a particular interval of the set of multiple intervals of the RAR window according to timing information of the second random access message including at least one of a time at which the second random access message was received and PDCCH scheduling of the second random access message, and sending one or more times, to the base station, the third random access message according to the distinct transmission configuration corresponding to the particular interval.

An apparatus is described. The apparatus may include a processor, memory coupled with the processor, and instructions stored in the memory. The instructions may be executable by the processor to cause the apparatus to receive, from a base station, system information including a RAR configuration, the RAR configuration indicating a set of multiple intervals of a RAR window which indicates a time period during which a second random access message is to be received, and each interval of the set of multiple intervals corresponding to a distinct transmission configuration of a third random access message, send, to the base station, a first random access message requesting to initiate a random access procedure, receive, from the base station in response to sending the first random access message, the second random access message during the RAR window, determine a particular interval of the set of multiple intervals of the RAR window according to timing information of the second random access message including at least one of a time at which the second random access message was received and PDCCH scheduling of the second random access message, and send one or more times, to the base station, the third random access message according to the distinct transmission configuration corresponding to the particular interval.

Another apparatus is described. The apparatus may include means for receiving, from a base station, system information including a RAR configuration, the RAR configuration indicating a set of multiple intervals of a RAR window which indicates a time period during which a second random access message is to be received, and each interval of the set of multiple intervals corresponding to a distinct transmission configuration of a third random access message, means for sending, to the base station, a first random access message requesting to initiate a random access procedure, means for receiving, from the base station in response to sending the first random access message, the second random access message during the RAR window, means for determining a particular interval of the set of multiple intervals of the RAR window according to timing information of the second random access message including at least one of a time at which the second random access message was received and PDCCH scheduling of the second random access message, and means for sending one or more times, to the base station, the third random access message according to the distinct transmission configuration corresponding to the particular interval.

A non-transitory computer-readable medium storing code is described. The code may include instructions executable by a processor to receive, from a base station, system information including a RAR configuration, the RAR configuration indicating a set of multiple intervals of a RAR window which indicates a time period during which a second random access message is to be received, and each interval of the set of multiple intervals corresponding to a distinct transmission configuration of a third random access message, send, to the base station, a first random access message requesting to initiate a random access procedure, receive, from the base station in response to sending the first random access message, the second random access message during the RAR window, determine a particular interval of the set of multiple intervals of the RAR window according to timing information of the second random access message including at least one of a time at which the second random access message was received and PDCCH scheduling of the second random access message, and send one or more times, to the base station, the third random access message according to the distinct transmission configuration corresponding to the particular interval.

In some examples of the method, apparatuses, and non-transitory computer-readable medium described herein, the distinct transmission configuration may include operations, features, means, or instructions for an indicator indicating a quantity of third random access message transmission repetitions to be sent by the UE.

In some examples of the method, apparatuses, and non-transitory computer-readable medium described herein, a first distinct transmission configuration may include operations, features, means, or instructions for the indicator indicating a first quantity of the third random access message transmission repetitions to be sent by the UE, the first quantity being an integer greater than zero.

In some examples of the method, apparatuses, and non-transitory computer-readable medium described herein, the distinct transmission configuration may include operations, features, means, or instructions for an indication of whether the third random access message may be to be sent using inter-slot frequency-hopping.

In some examples of the method, apparatuses, and non-transitory computer-readable medium described herein, determining the particular interval of the set of multiple intervals of the RAR window may include operations, features, means, or instructions for recording a first time at which the first random access message was sent, measuring a second time at which the second random access message was received, calculating a time offset between the first time and the second time, and determining, according to the time offset, the particular interval of the se of multiple intervals of the RAR window.

In some examples of the method, apparatuses, and non-transitory computer-readable medium described herein, sending the first random access message may include operations, features, means, or instructions for sending, to the base station, the first random access message including capability information of the UE indicating that the UE may be capable of sending the third random access message the one or more times according to the RAR configuration.

In some examples of the method, apparatuses, and non-transitory computer-readable medium described herein, sending the first random access message may include operations, features, means, or instructions for sending, to the base station, the first random access message including a request to send the third random access message the one or more times according to the RAR configuration.

In some examples of the method, apparatuses, and non-transitory computer-readable medium described herein, sending the first random access message may include operations, features, means, or instructions for sending, to the base station via a PRACH, the first random access message including a RNTI corresponding to the UE.

In some examples of the method, apparatuses, and non-transitory computer-readable medium described herein, receiving the second random access message may include operations, features, means, or instructions for receiving, from the base station via the PDCCH, the second random access message.

In some examples of the method, apparatuses, and non-transitory computer-readable medium described herein, sending the third random access message may include operations, features, means, or instructions for sending, to the base station via an PUSCH, the third random access message according to the distinct transmission configuration corresponding to the particular interval.

In some examples of the method, apparatuses, and non-transitory computer-readable medium described herein, receiving the second random access message during the RAR window may include operations, features, means, or instructions for receiving, from the base station, the second random access message including information corresponding to the UE and at least one other device, the time at which the second random access message was received indirectly indicating, without increasing a data size of the second random access message, a particular transmission configuration of the third random access message.

A method is described. The method may include sending, to a UE, system information including a RAR configuration, the RAR configuration indicating a set of multiple intervals of a RAR window which indicates a time period during which a second random access message is to be received, and each interval of the set of multiple intervals corresponding to a distinct transmission configuration of a third random access message, receiving, from the UE, a first random access message requesting to initiate a random access procedure, selecting a particular interval of the set of multiple intervals of the RAR window according to PDCCH scheduling of the second random access message, sending, to the UE in response to receiving the first random access message, the second random access message during the particular interval, and receiving, from the UE, at least one third random access message of a se of multiple third random access messages sent by the UE according to the distinct transmission configuration corresponding to the particular interval.

An apparatus is described. The apparatus may include a processor, memory coupled with the processor, and instructions stored in the memory. The instructions may be executable by the processor to cause the apparatus to send, to a UE, system information including a RAR configuration, the RAR configuration indicating a set of multiple intervals of a RAR window which indicates a time period during which a second random access message is to be received, and each interval of the set of multiple intervals corresponding to a distinct transmission configuration of a third random access message, receive, from the UE, a first random access message requesting to initiate a random access procedure, select a particular interval of the set of multiple intervals of the RAR window according to PDCCH scheduling of the second random access message, send, to the UE in response to receiving the first random access message, the second random access message during the particular interval, and receive, from the UE, at least one third random access message of a set of multiple third random access messages sent by the UE according to the distinct transmission configuration corresponding to the particular interval.

Another apparatus is described. The apparatus may include means for sending, to a UE, system information including a RAR configuration, the RAR configuration indicating a set of multiple intervals of a RAR window which indicates a time period during which a second random access message is to be received, and each interval of the set of multiple intervals corresponding to a distinct transmission configuration of a third random access message, means for receiving, from the UE, a first random access message requesting to initiate a random access procedure, means for selecting a particular interval of the set of multiple intervals of the RAR window according to PDCCH scheduling of the second random access message, means for sending, to the UE in response to receiving the first random access message, the second random access message during the particular interval, and means for receiving, from the UE, at least one third random access message of a set of multiple third random access messages sent by the UE according to the distinct transmission configuration corresponding to the particular interval.

A non-transitory computer-readable medium storing code is described. The code may include instructions executable by a processor to send, to a UE, system information including a RAR configuration, the RAR configuration indicating a set of multiple intervals of a RAR window which indicates a time period during which a second random access message is to be received, and each interval of the set of multiple intervals corresponding to a distinct transmission configuration of a third random access message, receive, from the UE, a first random access message requesting to initiate a random access procedure, select a particular interval of the set of multiple intervals of the RAR window according to PDCCH scheduling of the second random access message, send, to the UE in response to receiving the first random access message, the second random access message during the particular interval, and receive, from the UE, at least one third random access message of a set of multiple third random access messages sent by the UE according to the distinct transmission configuration corresponding to the particular interval.

In some examples of the method, apparatuses, and non-transitory computer-readable medium described herein, the distinct transmission configuration may include operations, features, means, or instructions for an indicator indicating a quantity of third random access message transmission repetitions to be sent by the UE.

In some examples of the method, apparatuses, and non-transitory computer-readable medium described herein, a first distinct transmission configuration may include operations, features, means, or instructions for the indicator indicating a first quantity of the third random access message transmission repetitions to be sent by the UE, the first quantity being an integer greater than zero.

In some examples of the method, apparatuses, and non-transitory computer-readable medium described herein, the distinct transmission configuration may include operations, features, means, or instructions for an indication of whether the set of multiple third random access messages may be to be sent using inter-slot frequency-hopping.

In some examples of the method, apparatuses, and non-transitory computer-readable medium described herein, receiving the first random access message may include operations, features, means, or instructions for receiving, from the UE, the first random access message including capability information of the UE indicating that the UE may be capable of sending the third random access message one or more times according to the RAR configuration.

In some examples of the method, apparatuses, and non-transitory computer-readable medium described herein, receiving the first random access message may, include operations, features, means, or instructions for receiving, from the UE, the first random access message including a request to send the third random access message one or more times according to the RAR configuration.

In some examples of the method, apparatuses, and non-transitory computer-readable medium described herein, receiving the first random access message may, include operations, features, means, or instructions for receiving, from the UE via a PRACH, the first random access message including a RNTI corresponding to the UE.

In some examples of the method, apparatuses, and non-transitory computer-readable medium described herein, sending the second random access message may include operations, features, means, or instructions for sending, to the UE via the PDCCH, the second random access message.

In some examples of the method, apparatuses, and non-transitory computer-readable medium described herein, receiving the at least one third random access message of the set of multiple third random access messages may include operations, features, means, or instructions for receiving, from the UE via an PUSCH, the at least one third random access message of the set of multiple third random access messages sent by the UE according to the distinct transmission configuration corresponding to the particular interval.

In some examples of the method, apparatuses, and non-transitory computer-readable medium described herein, sending the second random access message during the particular interval may include operations, features, means, or instructions for sending, to the UE, the second random access message including information corresponding to the UE and at least one other device, a time at which the second random access message may be sent indirectly indicating, without increasing a data size of the second random access message, a particular transmission configuration of the third random access message.

BRIEF DESCRIPTION OF DRAWINGS

FIGS. 1 and 2 illustrate examples of wireless communications systems that support techniques for indicating message repetition parameters in accordance with aspects of the present disclosure.

FIGS. 12 through 15 show flowcharts illustrating methods that support techniques for indicating message repetition parameters in accordance with aspects of the present disclosure.

FIG. 22 is a flowchart of a method of wireless communication at a UE, in accordance with various aspects of the present disclosure.

FIG. 25 is a flowchart of a method of wireless communication at a base station, in accordance with various aspects of the present disclosure.

DETAILED DESCRIPTION

Figure 1:
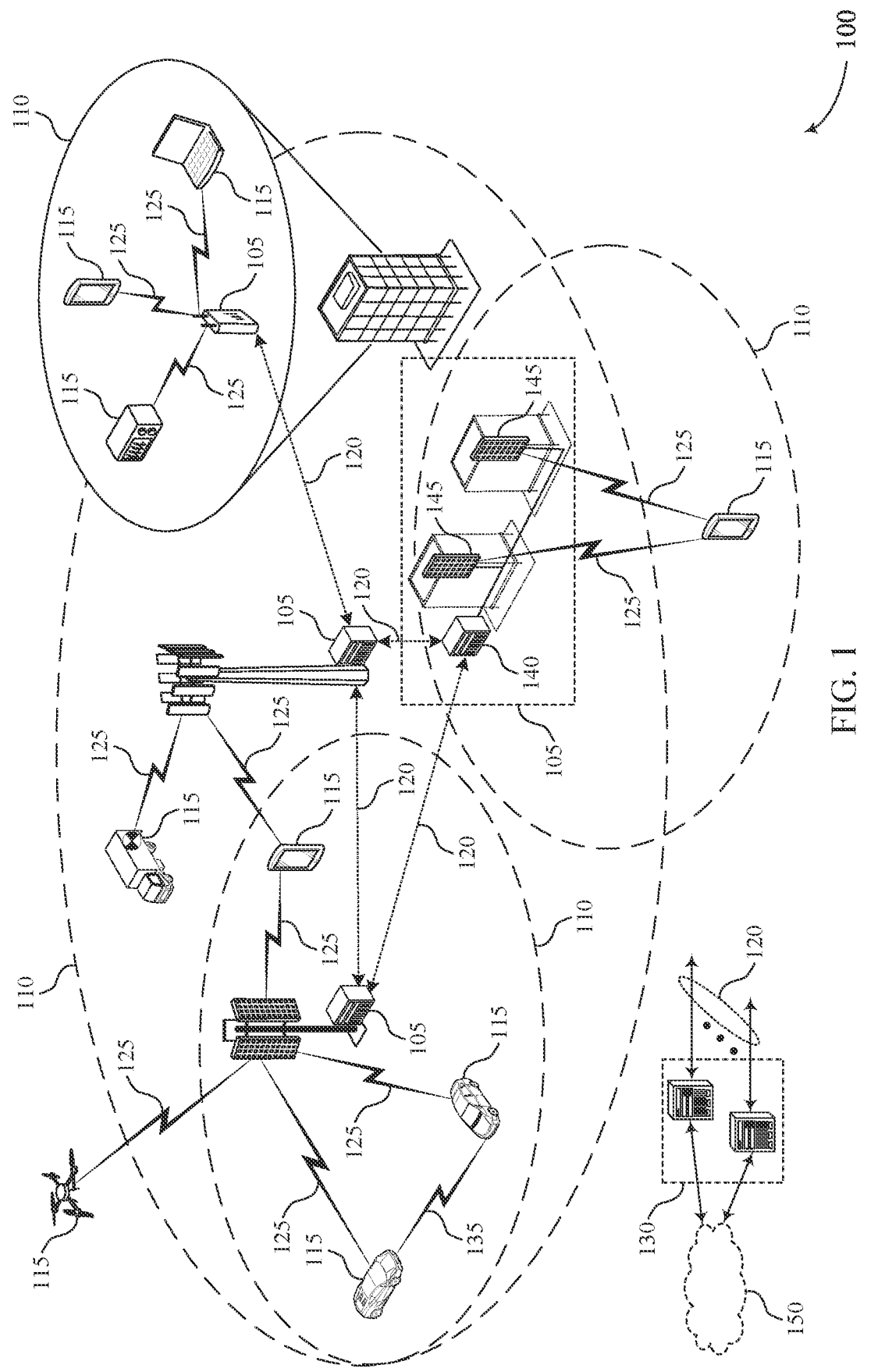

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A user equipment (UE) may perform a random access procedure (for example, a random access channel (RACH) procedure) with a base station to access a wireless network. Examples of RACH procedures may be performed when initially accessing the wireless network or during a handover. After successfully performing the random access procedure, the UE and the base station may establish a data connection to communicate subsequent transmissions of data and other communications. That is, the UE and the base station may establish a radio resource control (RRC) configuration for the data connection, and the base station may allocate resources (for example, time, frequency, or spatial resources) for uplink control transmissions such as scheduling requests. After the random access procedure, the UE may be in a connected state with the base station.

In some examples, the UE may transmit to the base station a random access request (e.g., Msg1), such as in a physical random access channel (PRACH) transmission, to establish a connection with the base station. In response to the random access request, the base station may transmit to the UE a response message, such as a random access response (RAR) (e.g., Msg2). The response message may include configuration information for an uplink message (e.g., Msg3) from the UE, in which the UE may transmit uplink scheduling information, for example in a physical uplink shared channel (PUSCH) transmission. In some cases, based on channel conditions, it may be beneficial for the UE to transmit one or more repetitions of the uplink message to increase a likelihood the base station will receive and successfully decode the uplink message. However, increasing a size of the response message to explicitly configure repetitions may increase signaling overhead and may reduce communications efficiency, for example in multiplexing scenarios.

According to the techniques described herein, a base station may indicate to a UE repetition parameters for an uplink message using transmission parameters in a response message. In some examples, the base station may transmit system information (e.g., in a remaining minimum system information (RMSI) portion of a system information block (SIB)) to the UE configuring a mapping between the transmission parameters and the repetition parameters, for example based on a repetition request or a capability indication in the random access request from the UE. The repetition parameters may include a presence of repetitions, a quantity of repetitions, frequency hopping parameters, other repetition parameters, or any combination thereof. In some examples, the transmission parameters may be associated with control signaling (e.g., a physical downlink control channel (PDCCH) transmission) in the response message. For example, the transmission parameters may include a location of a control channel element in a control resource set (CORESET) of the response message, an aggregation level associated with the control signaling, a reference signal sequence (e.g., a demodulation reference signal (DMRS) sequence) for the control signaling, or any combination thereof. The indications in the response message configuring uplink message repetitions may enable increased system efficiency and reduced latency at the UE, among other benefits.

Additionally, or alternatively, conventional wireless communication systems may perform RACH procedures in order for network devices to initiate and/or resume communications with each other. For example, a UE may trigger a RACH procedure in order to initiate and/or resume communication with a network device (e.g., a base station). However, under some channel conditions, transmitted messages of the RACH procedure may not be received correctly. For example, RACH message transmissions may be subject to significant path loss if or when some carrier frequencies (e.g., millimeter wave band) are utilized. Such wireless communication systems may attempt to address this problem with RACH procedures by utilizing repetition of RACH message transmissions. That is, a sender may transmit a RACH message several times (i.e., repetitions), which may improve the likelihood of correct reception of the RACH message. However, modification of an existing RACH message to add data indicating a message repetition configuration may not be desirable. For example, adding a random access message 3 (e.g., Msg3) repetition configuration to a random access message 2 (e.g., Msg2) may not be desirable. That is, the additional data may increase the size of the RACH message (e.g., Msg2) which may make transmission of the message more susceptible to transmission failures and/or may negatively impact the timing of the RACH procedure. In some aspects, a RACH message (e.g., Msg2) may include information for multiple devices, and, as such, increasing the data size for each device may significantly increase the size of the RACH message.

Aspects presented herein provide for multiple manners for a base station to indicate a Msg3 repetition configuration via timing of the Msg2 transmission to a UE. In some aspects, the UE may determine the Msg3 repetition configuration according to an interval of a RAR window corresponding to the reception of the Msg2 transmission. Further, aspects presented herein may improve reliability of the RACH procedure and facilitate access to the wireless communication system when compared to a conventional wireless communication system.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the application and design constraints imposed on the overall system.

By way of example, an element, or any portion of an element, or any combination of elements may be implemented as a. "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices, state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Aspects of the disclosure are initially described in the context of wireless communications systems Aspects of the disclosure are further illustrated by and described with reference to a process flow, apparatus diagrams, system diagrams, flowcharts that relate to techniques for indicating message repetition parameters, and multiple manners for a base station to indicate a Msg3 repetition configuration via timing of the Msg2 transmission to a UE.

FIG. 1 illustrates an example of a wireless communications system 100 that supports techniques for indicating message repetition parameters in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to firm the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix (CP) prepended to each symbol period). In some wireless communications systems 100, a slot may further be divided into multiple mini-slots containing one or more symbols. Excluding the CP, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, hut the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safely or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz), For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), unlicensed radio frequency spectrum band radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a. UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to the techniques described herein, a base station 105 may indicate to a UE 115 repetition parameters for an uplink message using transmission parameters in a response message of a RACH procedure. In some examples, the base station 105 may transmit system information (e.g., in an RMSI portion of a SIB) to the UE 115 configuring a mapping between the transmission parameters and the repetition parameters, for example based on a repetition request or a capability indication in a random access request from the UE 115. The indications in the response message configuring uplink message repetitions may enable increased system efficiency and reduced latency at the UE 115, among other benefits.

FIG. 2 illustrates an example of a wireless communications system 200 that supports techniques for indicating message repetition parameters in accordance with aspects of the present disclosure. The wireless communications system 200 may implement or be implemented by aspects of the wireless communications system 100 as described with reference to FIG. 1. For example, the wireless communications system 200 may include a base station 205 and a UE 215, which may be examples of corresponding devices described with reference to FIG. 1. The wireless communications system 200 may support improvements to power consumption, connection stability, and in some examples, may promote lower latency in RACH operations, among other benefits.

As illustrated in FIG. 2, the UE 215 may perform a random access procedure (e.g., a RACH procedure) with the base station 205 to access a wireless network in the wireless communications system 200. That is, the UE 215 may transmit a request 220 (e.g., a random access request, which may be referred to as Msg1) to the base station 205 to establish a connection. In response, the base station 205 may transmit a response 225 (e.g., a RAR, which may be referred to as Msg2) to the UE 215. The response 225 may include configuration information for one or more uplink messages 230 from the UE 215. In some examples, the response 225 may include a data portion (e.g., a physical downlink shared channel (PDCCH)) and a control portion (e.g., a PDCCH). In some cases, based on channel conditions, it may be beneficial for the UE 215 to transmit one or more repetitions of the uplink message 230 to increase a likelihood the base station 205 will receive and successfully decode the uplink message 230. Accordingly, the base station 205 may indicate to the UE 215 repetition parameters for the uplink messages 230 using transmission parameters of the response 225, for example using transmission parameters of the PDCCH of the response 225.

In some examples, the base station 205 may indicate one or more repetition parameters using an index of a control channel element (CCE) of the PDCCH, such as an index of a first CCE of the PDCCH. Additionally or alternatively, the base station 205 may indicate one or more repetition parameters using an aggregation level (e.g., an aggregation level 1, 2, 4, or 8) of the PDCCH. The aggregation level of the PDCCH may indicate a quantity of consecutive CCEs to carry the PDCCH and a format of the PDCCH. The aggregation level of the PDCCH may be based on conditions of the channel between the UE 215 and the base station 205, which may influence the quantity of repetitions of the uplink message 230 the base station 205 may configure, and so it may be beneficial to use the aggregation level to indicate repetition parameters for the uplink message 230. In some examples, the base station 205 may indicate one or more repetition parameters using a reference signal sequence (e.g., a DMRS sequence) for the PDCCH. In some examples, the base station 205 may indicate a first repetition parameter using a first transmission parameter in the response 225 and a second repetition parameter using a second transmission parameter.

In some examples, the base station 205 may indicate a mapping between the one or more transmission parameters and the one or more repetition parameters in system information transmitted to the UE 215, such as in an RMSI portion. For example, the base station 205 may broadcast a SIB, which the UE 215 may receive before establishing the connection with the base station 205. Based on the SIB, the UE 215 may identify the mapping between the transmission parameters and the repetition parameters, and determine repetition parameters for the uplink messages 230 based on the transmission parameters in the response 225.

Based on the transmission parameters in the response 225, the UE 215 may transmit one or more repetitions of the uplink message 230 to the base station 205 according to the determined repetition parameters for the uplink message 230. In some examples, the repetition parameters may include a presence of repetitions, a quantity of repetitions, an indication of an inter-slot frequency hopping configuration, an indication of an intra-slot frequency hopping configuration, a configuration for joint channel estimation across repetitions of the uplink message 230, other repetition parameters, or any combination thereof. The indications in the response 225 configuring repetitions of the uplink message 230 may enable increased system efficiency and reduced latency at the UE 215, among other benefits.

Figure 3:
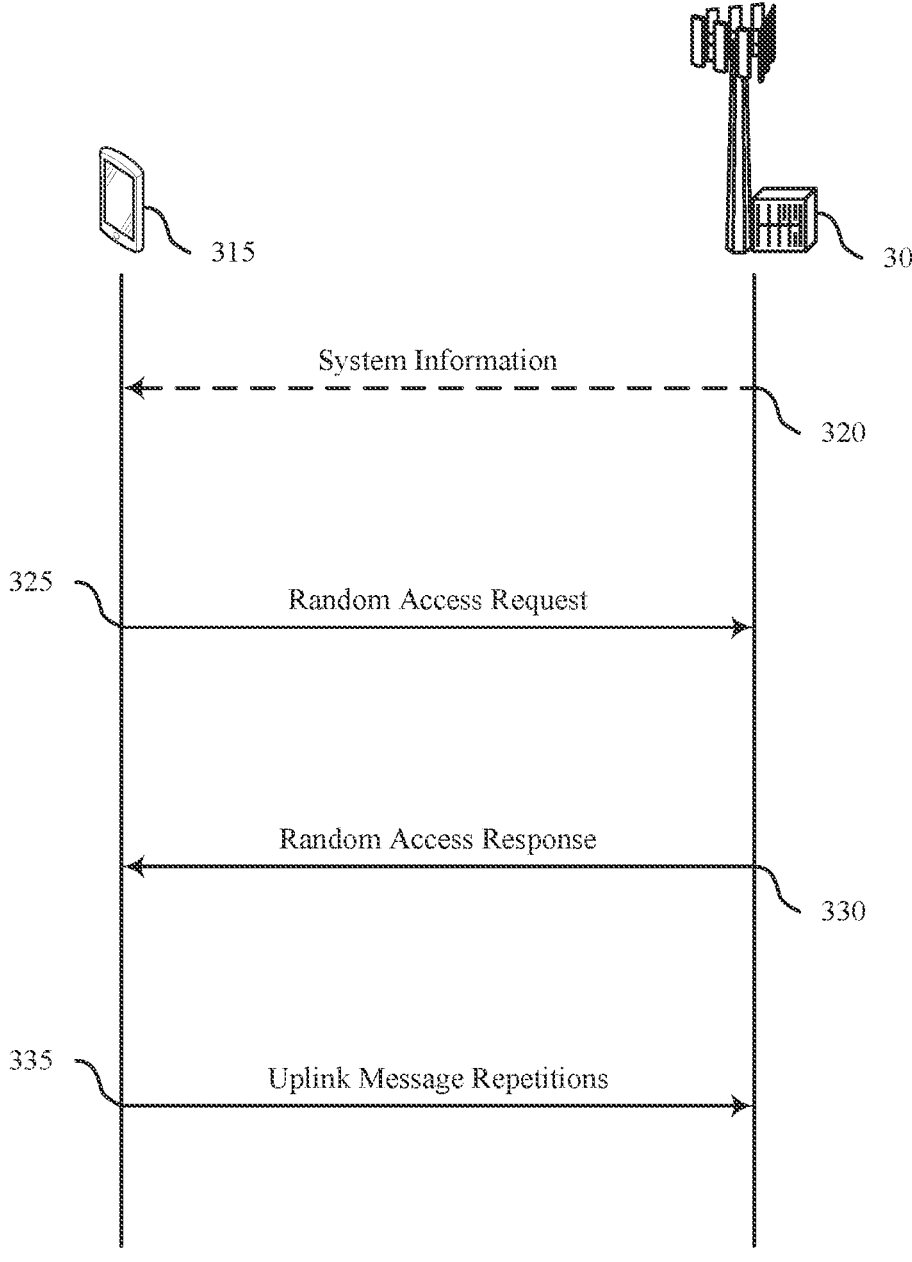
FIG. 3 illustrates an example of a process flow that supports techniques for indicating message repetition parameters in accordance with aspects of the present disclosure.

FIG. 3 illustrates an example of a process flow 300 that supports techniques for indicating message repetition parameters in accordance with aspects of the present disclosure. In some examples, the process flow 300 may implement or be implemented by one or more aspects of wireless communications systems 100 and 200. For example, the process flow 300 may include example operations associated with one or more of a base station 305 or a UE 315, which may be examples of corresponding devices described with reference to FIGS. 1 and 2. In the following description of the process flow 300, the operations between the base station 305 and the UE 315 may be performed in a different order than the example order shown, or the operations performed by the base station 305 and the UE 315 may be performed in different orders or at different times. Some operations may also be omitted from the process flow 300, and other operations may be added to the process flow 300. The operations performed by the base station 305 and the UE 315 may support improvements to RACH operations and, in some examples, may promote improvements to communications efficiency, among other benefits.

In some examples, at 320, the base station 305 may broadcast system information to the UE 315, for example before the UE 315 and the base station 305 establish a connection to enable the UE 315 to access a wireless network. The system information (e.g., an RMSI in a SIB) may indicate a mapping between one or more transmission parameters of a message from the base station 305 and one or more repetition parameters for a message from the UE 315.

At 325, the UE 315 may transmit a request (e.g., a random access request, which may be referred to as Msg1) to the base station 305 to establish a connection using a RACH procedure. In some examples, the request may include a capability indication, where the UE 315 may indicate a capability to identify the mapping between transmission parameters of a message from the base station 305 and repetition parameters for a message from the UE 315. Additionally or alternatively, the request may include a request for repetitions of an uplink message of the RACH procedure, for example based on channel conditions or a transmission environment.

At 330, the base station 305 may transmit a response (e.g., a RAR, which may be referred to as Msg2) to the UE 315. The response may include configuration information for the uplink message of the RACH procedure, for example based on the capability indication or the repetition request in the request from the UE 315. In some examples, the response may include a data portion a PDSCH) and a control portion (e.g., a PDCCH). The base station 305 may indicate to the UE 315 repetition parameters for the uplink message using transmission parameters of the response, for example using transmission parameters of the PDCCH of the response.

In some examples, the base station 305 may indicate one or more repetition parameters using an index of a CCE of the PDCCH, such as an index of a first CCE of the PDCCH. Additionally or alternatively, the base station 305 may indicate one or more repetition parameters using an aggregation level (e.g., an aggregation level 1, 3, 4, or 8) of the PDCCH. The aggregation level of the PDCCH may indicate a quantity of consecutive CCEs to carry the PDCCH and a format of the PDCCH. The aggregation level of the PDCCH may be based on conditions of the channel between the UE 315 and the base station 305, which may influence the quantity of repetitions of the uplink message the base station 305 may configure, and so it may be beneficial to use the aggregation level to indicate repetition parameters for the uplink message. In some examples, the base station 305 may indicate one or more repetition parameters using a reference signal sequence (e.g., a DMRS sequence) for the PDCCH. In some examples, the base station 305 may indicate a first repetition parameter using a first transmission parameter in the response and a second repetition parameter using a second transmission parameter.

At 335, the UE 315 may transmit one or more repetitions of the uplink message according to the identified repetition parameters. In some examples, the repetition parameters may include a presence of repetitions, a quantity of repetitions, an indication of an inter-slot frequency hopping configuration, an indication of an intra-slot frequency hopping configuration, a configuration for joint channel estimation across repetitions of the uplink message, other repetition parameters, or any combination thereof. The operations performed by the base station 305 and the UE 315 may support improvements to RACH operations and, in some examples, may promote improvements to communications efficiency, among other benefits.

Figure 4:
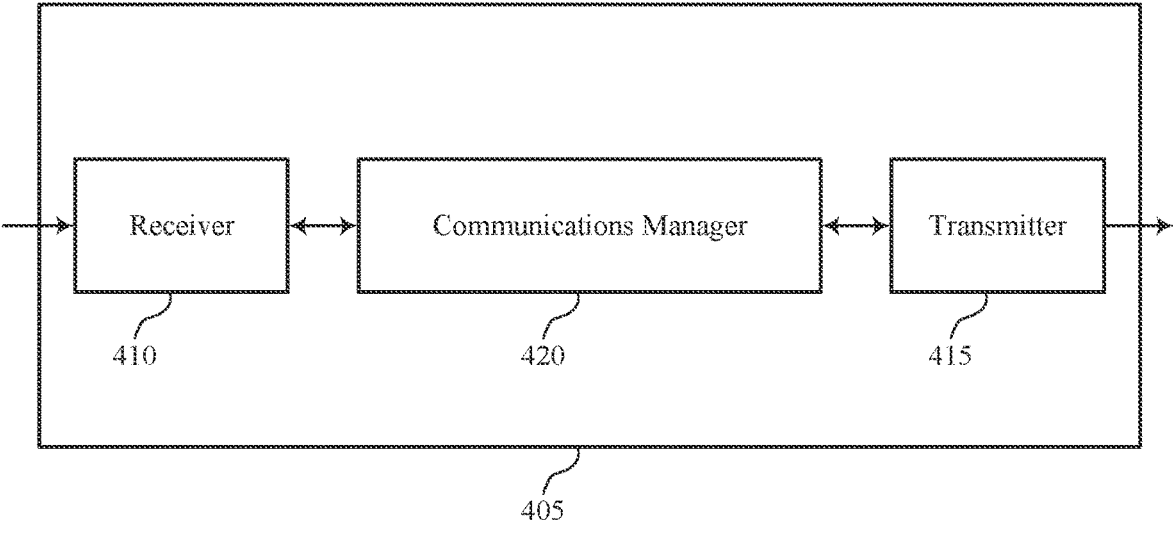
FIGS. 4 and S show block diagrams of devices that support techniques for indicating message repetition parameters in accordance with aspects of the present disclosure.

FIG. 4 shows a block diagram 400 of a device 405 that supports techniques for indicating message repetition parameters in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for indicating message repetition parameters). Information may be passed on to other components of the device 405. The receiver 410 may utilize a single antenna or a set of multiple antennas.

The transmitter 415 may provide a means for transmitting signals generated by other components of the device 405, For example, the transmitter 415 may transmit information such as packets, user data, control information, or any combination thereof associated with various information channels (e.g., control channels, data channels, information channels related to techniques for indicating message repetition parameters). In some examples, the transmitter 415 may be co-located with a receiver 410 in a transceiver component. The transmitter 415 may utilize a single antenna or a set of multiple antennas.

The communications manager 420, the receiver 410, the transmitter 415, or various combinations thereof or various components thereof may be examples of means for performing various aspects of techniques for indicating message repetition parameters as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry), The hardware may include a processor, a DSP, an application-specific integrated circuit (ASIC'), an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a. CPU, ASIC, art FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for transmitting a random access request to establish a connection with a base station. The communications manager 420 may be configured as or otherwise support a means for receiving, from the base station, a RAR including control signaling associated with one or more transmission parameters, where a first transmission parameter of the one or more transmission parameters maps to a repetition parameter associated with an uplink message. The communications manager 420 may be configured as or otherwise support a means for transmitting one or more repetitions of the uplink message according to the repetition parameter.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for efficient power consumption, more efficient utilization of communication resources, and reduced latency in RACH transmissions.

Figure 5:
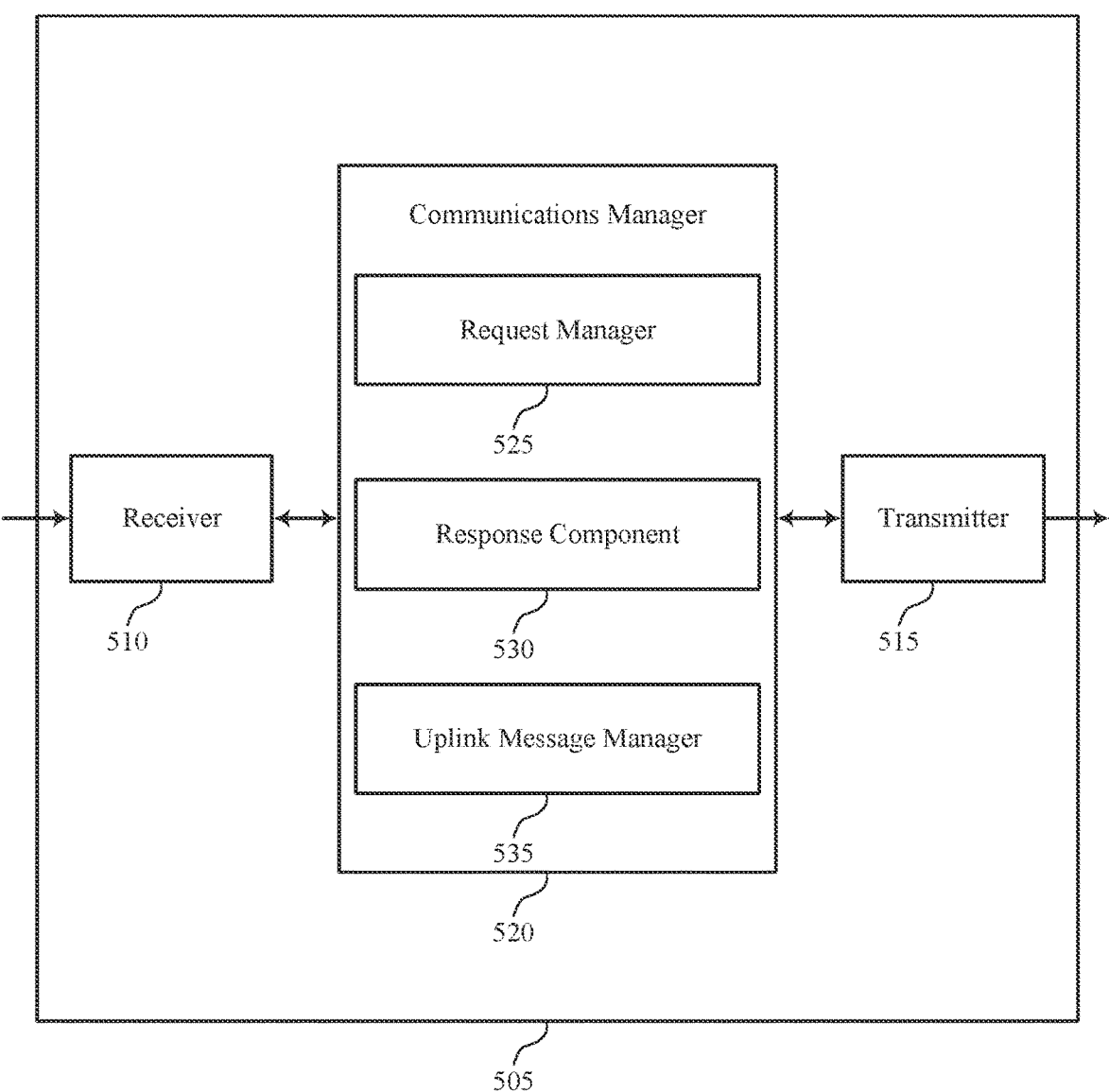

FIG. 5 shows a block diagram 500 of a device 505 that supports techniques for indicating message repetition parameters in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for indicating message repetition parameters). Information may be passed on to other components of the device 505. The receiver 510 may utilize a single antenna or a set of multiple antennas.

The transmitter 515 may provide a means for transmitting signals generated by other components of the device 505, For example, the transmitter 515 may transmit information such as packets, user data, control information, or any combination thereof associated with various information channels (e.g., control channels, data channels, information channels related to techniques for indicating message repetition parameters). In some examples, the transmitter 515 may be co-located with a receiver 510 in a transceiver component. The transmitter 515 may utilize a single antenna or a set of multiple antennas.

The device 505, or various components thereof may be an example of means for performing various aspects of techniques for indicating message repetition parameters as described herein. For example, the communications manager 520 may include a request manager 525, a response component 530, an uplink message manager 535, or any combination thereof. The communications manager 520 may be an example of aspects of a communications manager 420 as described herein. In some examples, the communications manager 520, or various components thereof may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The request manager 525 may be configured as or otherwise support a means for transmitting a random access request to establish a connection with a base station. The response component 530 may be configured as or otherwise support a means for receiving, from the base station, a RAR including control signaling associated with one or more transmission parameters, where a first transmission parameter of the one or more transmission parameters maps to a repetition parameter associated with an uplink message. The uplink message manager 535 may be configured as or otherwise support a means for transmitting one or more repetitions of the uplink message according to the repetition parameter.

Figure 6:
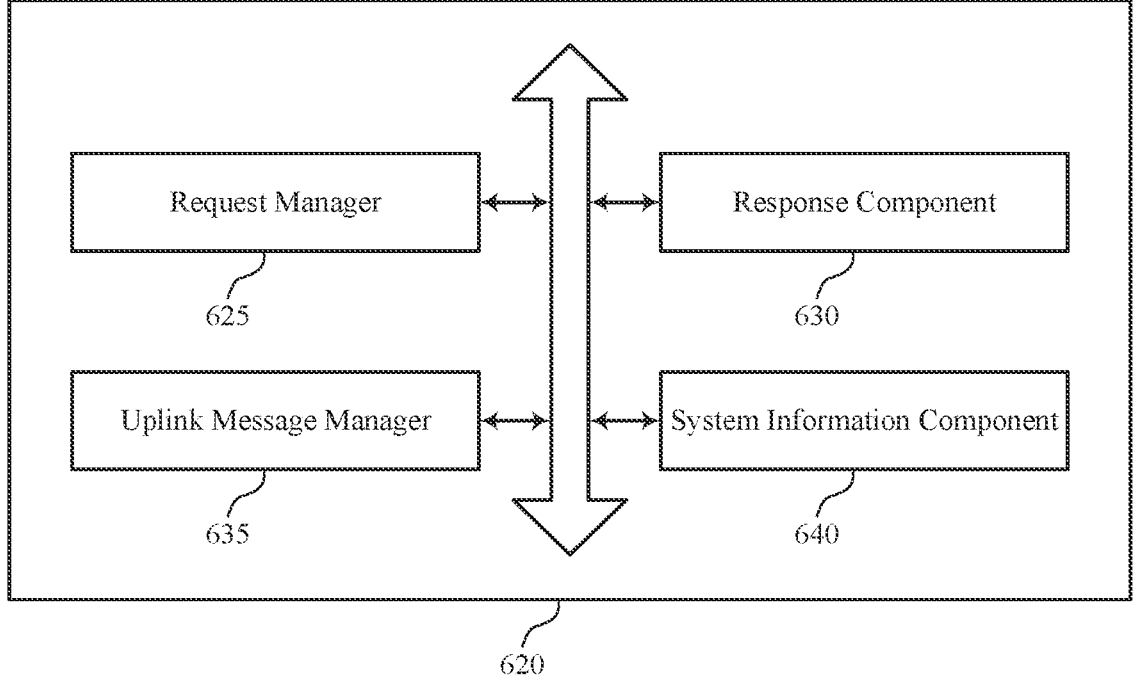
FIG. 6 shows a block diagram of a communications manager that supports techniques for indicating message repetition parameters in accordance with aspects of the present disclosure.

FIG. 6 shows a block diagram 600 of a communications manager 620 that supports techniques for indicating message repetition parameters in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for indicating message repetition parameters as described herein. For example, the communications manager 620 may include a request manager 625, a response component 630, an uplink message manager 635, a system information component 640, or any combination thereof. Each of these components may communicate, directly or indirectly, with one another (e.g., via one or more buses).

The communications manager 620 may support wireless communications at a UE in accordance with examples as disclosed herein. The request manager 625 may be configured as or otherwise support a means for transmitting a random access request to establish a connection with a base station. The response component 630 may be configured as or otherwise support a means for receiving, from the base station, a RAR including control signaling associated with one or more transmission parameters, where a first transmission parameter of the one or more transmission parameters maps to a repetition parameter associated with an uplink message. The uplink message manager 635 may be configured as or otherwise support a means for transmitting one or more repetitions of the uplink message according to the repetition parameter.

In some examples, the system information component 640 may be configured as or otherwise support a means for receiving, from the base station, a SIB identifying a mapping between the first transmission parameter and the repetition parameter, where the one or more repetitions of the uplink message are transmitted based on the received SIB.

In some examples, the response component 630 may be configured as or otherwise support a means for detecting a control channel element in the received RAR, where the first transmission parameter includes a location of the detected control channel element in a CORESET of the RAR.

In some examples, the repetition parameter is based on an index of the detected control channel element.

In some examples, the response component 630 may be configured as or otherwise support a means for detecting an aggregation level associated with the received RAR, where the first transmission parameter includes the detected aggregation level.

In some examples, the response component 630 may be configured as or otherwise support a means for detecting a reference signal sequence associated with the received RAR, where the first transmission parameter includes the detected reference signal sequence.

In some examples, to support transmitting the random access request, the request manager 625 may be configured as or otherwise support a means tier transmitting, in the random access request, a capability indication, where the one or more transmission parameters associated with the received RAR are based on the transmitted capability indication.

In some examples, to support transmitting the random access request, the request manager 625 may be configured as or otherwise support a means for transmitting, in the random access request, a repetition request, where the one or more transmission parameters associated with the received RAR are based on the transmitted repetition request.

In some examples, a second transmission parameter associated with the received RAR maps to a second repetition parameter of the uplink message. In some examples, the one or more repetitions are transmitted according to the second repetition parameter.

In some examples, the repetition parameter includes an indication of a presence of repetitions, a quantity of repetitions, an inter-slot frequency hopping pattern, an intra-slot frequency hopping pattern, a joint channel estimation configuration across the one or more repetitions, or any combination thereof.

In some examples, the received RAR includes a PDCCH.

Figure 7:
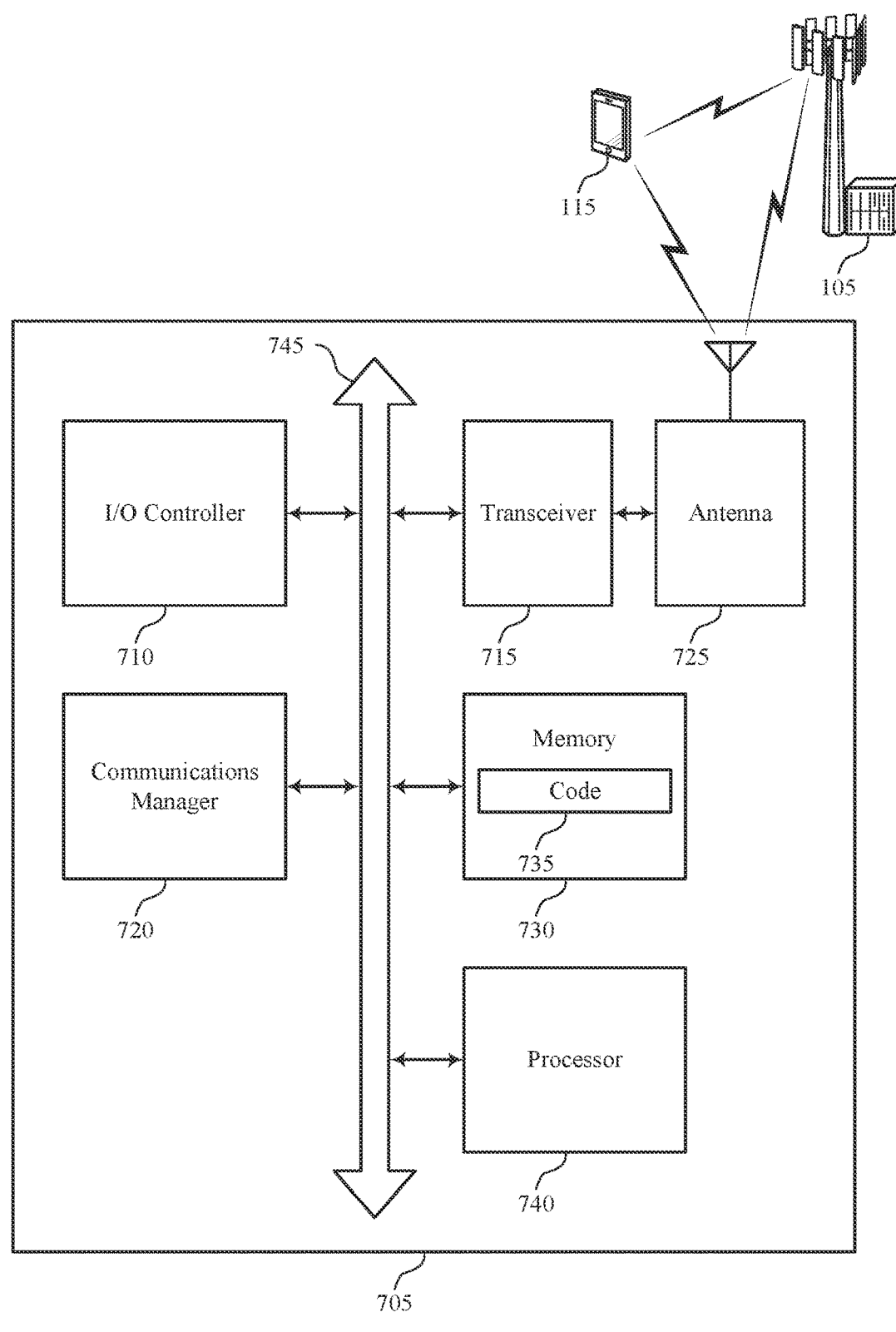
FIG. 7 shows a diagram of a system including a device that supports techniques for indicating message repetition parameters in accordance with aspects of the present disclosure.

FIG. 7 shows a diagram of a system 700 including a device 705 that supports techniques for indicating message repetition parameters in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for indicating message repetition parameters). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for transmitting a random access request to establish a connection with a base station. The communications manager 720 may be configured as or otherwise support a means for receiving, from the base station, a RAR including control signaling associated with one or more transmission parameters, where a first transmission parameter of the one or more transmission parameters maps to a repetition parameter associated with an uplink message. The communications manager 720 may be configured as or otherwise support a means for transmitting one or more repetitions of the uplink message according to the repetition parameter.

By including or configuring the communications manager 720 in accordance with examples as described herein, the device 705 may support techniques for improved communication reliability, improved user experience related to increased data throughput, more efficient utilization of communication resources, improved coordination between devices, and reduced latency.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for indicating message repetition parameters as described herein, or the processor 740 and the memory 730 may be otherwise configured to perform or support such operations.

Figure 8:
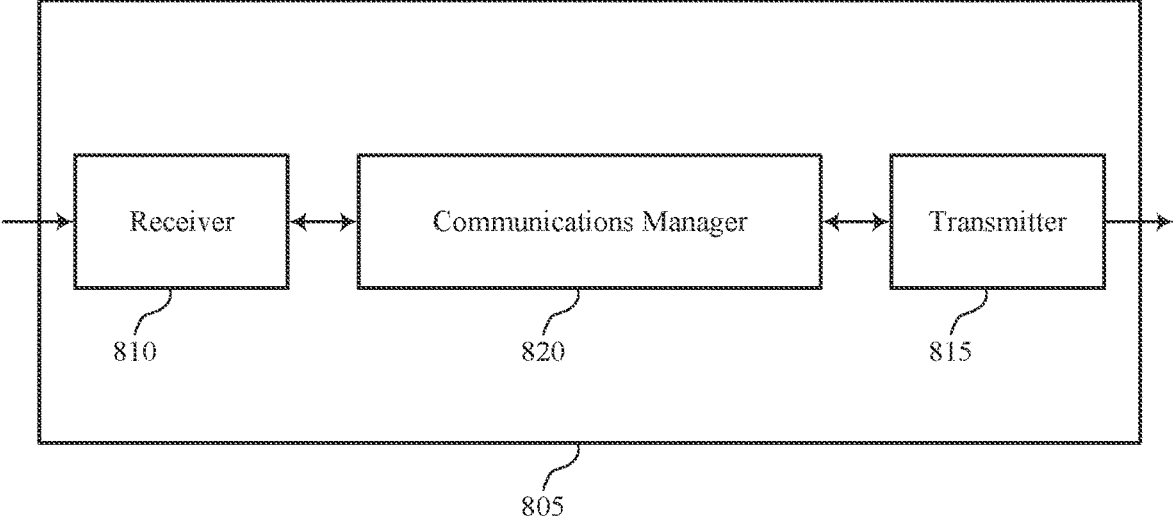
FIGS. 8 and 9 show block diagrams of devices that support techniques for indicating message repetition parameters in accordance with aspects of the present disclosure.

FIG. 8 shows a block diagram 800 of a device 805 that supports techniques for indicating message repetition parameters in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for indicating message repetition parameters). Information may be passed on to other components of the device 805. The receiver 810 may utilize a single antenna or a set of multiple antennas.

The transmitter 815 may provide a means for transmitting signals generated by other components of the device 805, For example, the transmitter 815 may transmit information such as packets, user data, control information, or any combination thereof associated with various information channels (e.g., control channels, data channels, information channels related to techniques for indicating message repetition parameters). In some examples, the transmitter 815 may be co-located with a receiver 810 in a transceiver component. The transmitter 815 may utilize a single antenna or a set of multiple antennas.

The communications manager 820, the receiver 810, the transmitter 815, or various combinations thereof or various components thereof may be examples of means for performing various aspects of techniques for indicating message repetition parameters as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g, in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC', an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for receiving, from a UE, a random access request to establish a connection with the base station. The communications manager 820 may be configured as or otherwise support a means for transmitting, to the UE, a RAR including control signaling associated with one or more transmission parameters, where a first transmission parameter of the one or more transmission parameters maps to a repetition parameter associated with an uplink message. The communications manager 820 may be configured as or otherwise support a means for monitoring for one or more repetitions of the uplink message according to the repetition parameter.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for efficient power consumption, more efficient utilization of communication resources, and reduced latency in RACH transmissions.

Figure 9:
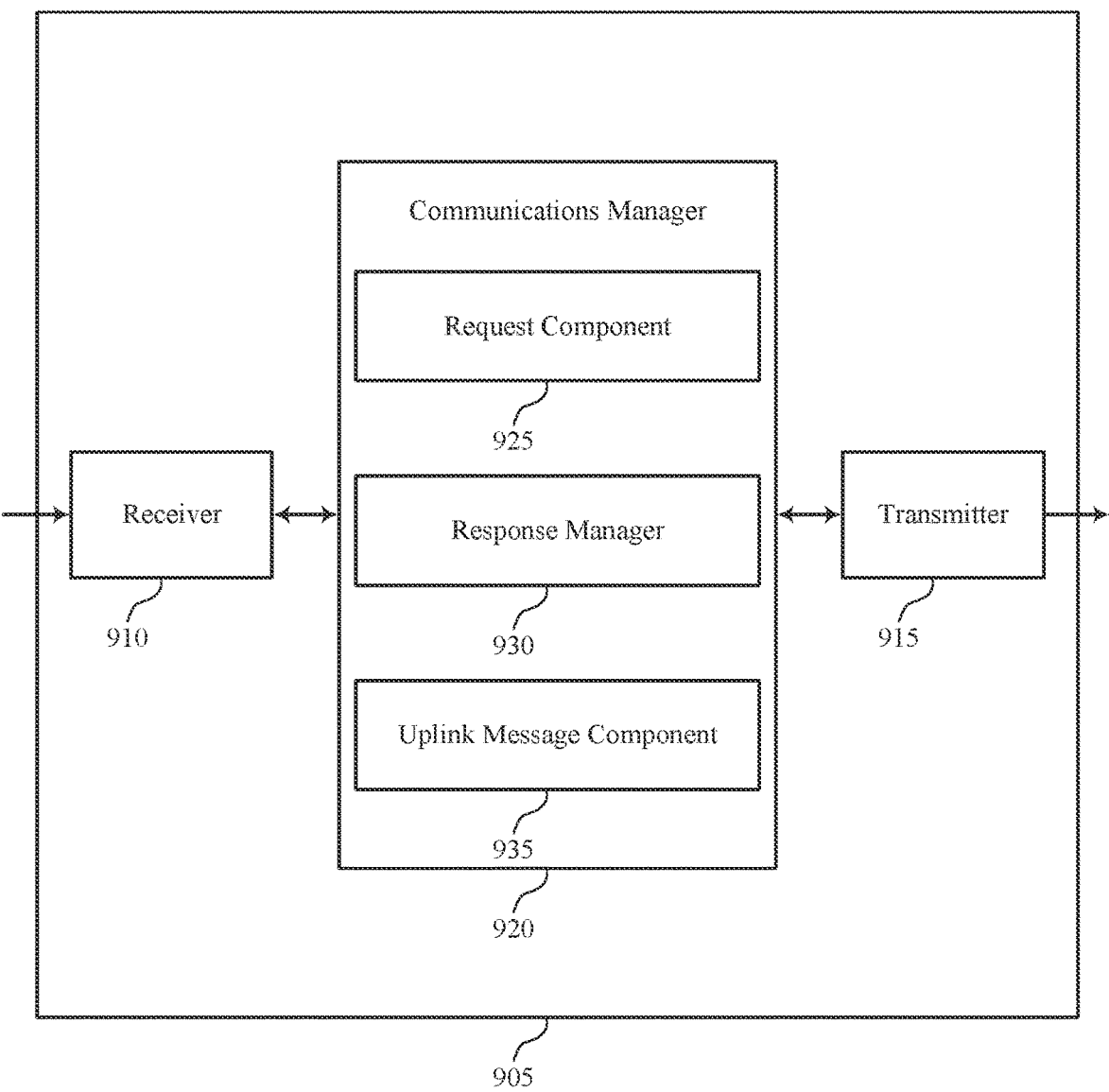

FIG. 9 shows a block diagram 900 of a device 905 that supports techniques for indicating message repetition parameters in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for indicating message repetition parameters). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for indicating message repetition parameters). In some examples, the transmitter 915 may be co-located with a receiver 910 in a transceiver component. The transmitter 915 may utilize a single antenna or a set of multiple antennas.

The device 905, or various components thereof, may be an example of means for performing various aspects of techniques for indicating message repetition parameters as described herein. For example, the communications manager 920 may include a request component 925, a response manager 930, an uplink message component 935, or any combination thereof. The communications manager 920 may be an example of aspects of a communications manager 820 as described herein In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The request component 925 may be configured as or otherwise support a means for receiving, from a UE, a random access request to establish a connection with the base station. The response manager 930 may be configured as or otherwise support a means for transmitting, to the UE, a RAR including control signaling associated with one or more transmission parameters, where a first transmission parameter of the one or more transmission parameters maps to a repetition parameter associated with an uplink message. The uplink message component 935 may be configured as or otherwise support a means for monitoring for one or more repetitions of the uplink message according to the repetition parameter.

Figure 10:
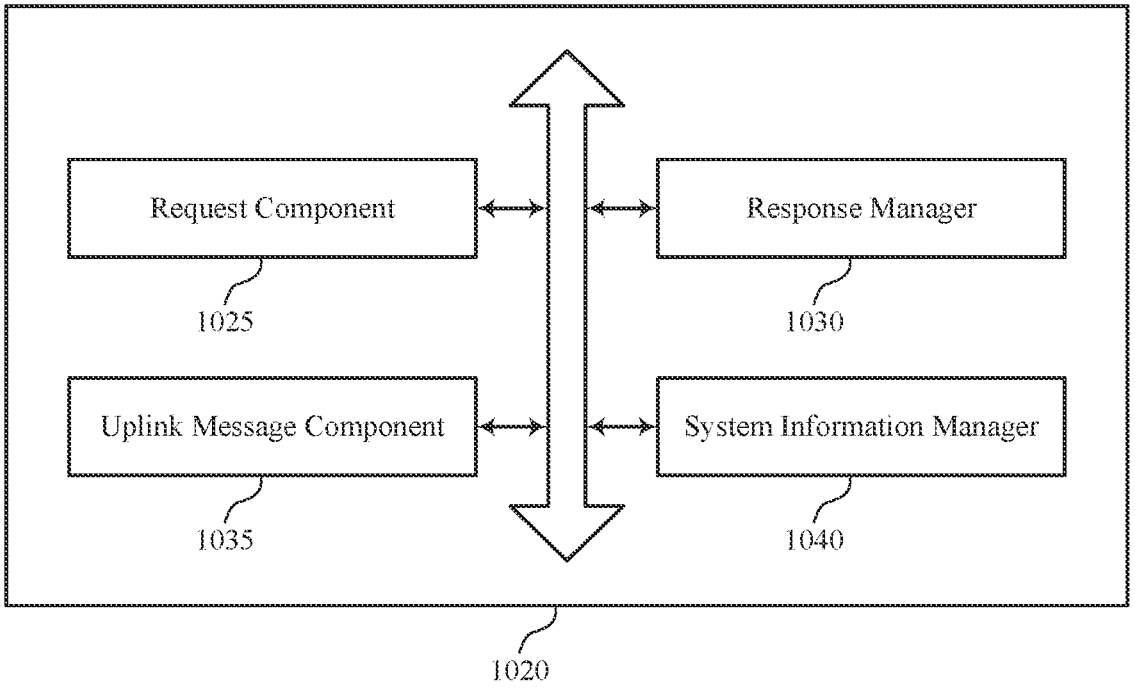
FIG. 10 shows a block diagram of a communications manager that supports techniques for indicating message repetition parameters in accordance with aspects of the present disclosure.

FIG. 10 shows a block diagram 1000 of a communications manager 1020 that supports techniques for indicating message repetition parameters in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for indicating message repetition parameters as described herein. For example, the communications manager 1020 may include a request component 1025, a response manager 1030, an uplink message component 1035, a system information manager 1040, or any combination thereof. Each of these components may communicate, directly or indirectly, with one another (e.g., via one or more buses).

The communications manager 1020 may support wireless communications at a base station in accordance with examples as disclosed herein. The request component 1025 may be configured as or otherwise support a means for receiving, from a UE, a random access request to establish a connection with the base station. The response manager 1030 may be configured as or otherwise support a means for transmitting, to the UE, a RAR including control signaling associated with one or more transmission parameters, where a first transmission parameter of the one or more transmission parameters maps to a repetition parameter associated with an uplink message. The uplink message component 1035 may be configured as or otherwise support a means for monitoring for one or more repetitions of the uplink message according to the repetition parameter.

In some examples, the system information manager 1040 may be configured as or otherwise support a means for transmitting a SIB identifying a mapping between the first transmission parameter and the repetition parameter, where the monitoring for the one or more repetitions of the uplink message is based on the transmitted SIB.

In some examples, to support transmitting the RAR, the response manager 1030 may be configured as or otherwise support a means for transmitting a control channel element in the RAR, where the first transmission parameter includes a location of the transmitted control channel element in a CORESET of the RAR.

In some examples, the repetition parameter is based on an index of the transmitted control channel element.

In some examples, to support transmitting the RAR, the response manager 1030 may be configured as or otherwise support a means for transmitting the RAR according to an aggregation level, where the first transmission parameter includes the aggregation level.

In some examples, to support transmitting the RAR, the response manager 1030 may be configured as or otherwise support a means for transmitting a reference signal sequence associated with the transmitted RAR, where the first transmission parameter includes the transmitted reference signal sequence.

In some examples, to support receiving the random access request, the request component 1025 may be configured as or otherwise support a means for receiving, in the random access request, a capability indication, where the one or more transmission parameters associated with the transmitted RAR are based on the received capability indication.

In some examples, to support receiving the random access request, the request component 1025 may be configured as or otherwise support a means for receiving, in the random access request, a repetition request, where the one or more transmission parameters associated with the transmitted RAR are based on the received repetition request.

In some examples, a second transmission parameter associated with the transmitted RAR maps to a second repetition parameter of the uplink message. In some examples, the monitoring for the one or more repetitions of the uplink message is according to the second repetition parameter.

In some examples, the repetition parameter includes an indication of a presence of repetitions, a quantity of repetitions, an inter-slot frequency hopping pattern, an intra-slot frequency hopping pattern, a joint channel estimation configuration across the one or more repetitions, or any combination thereof.

In some examples, the transmitted RAR includes a PDCCH.

Figure 11:
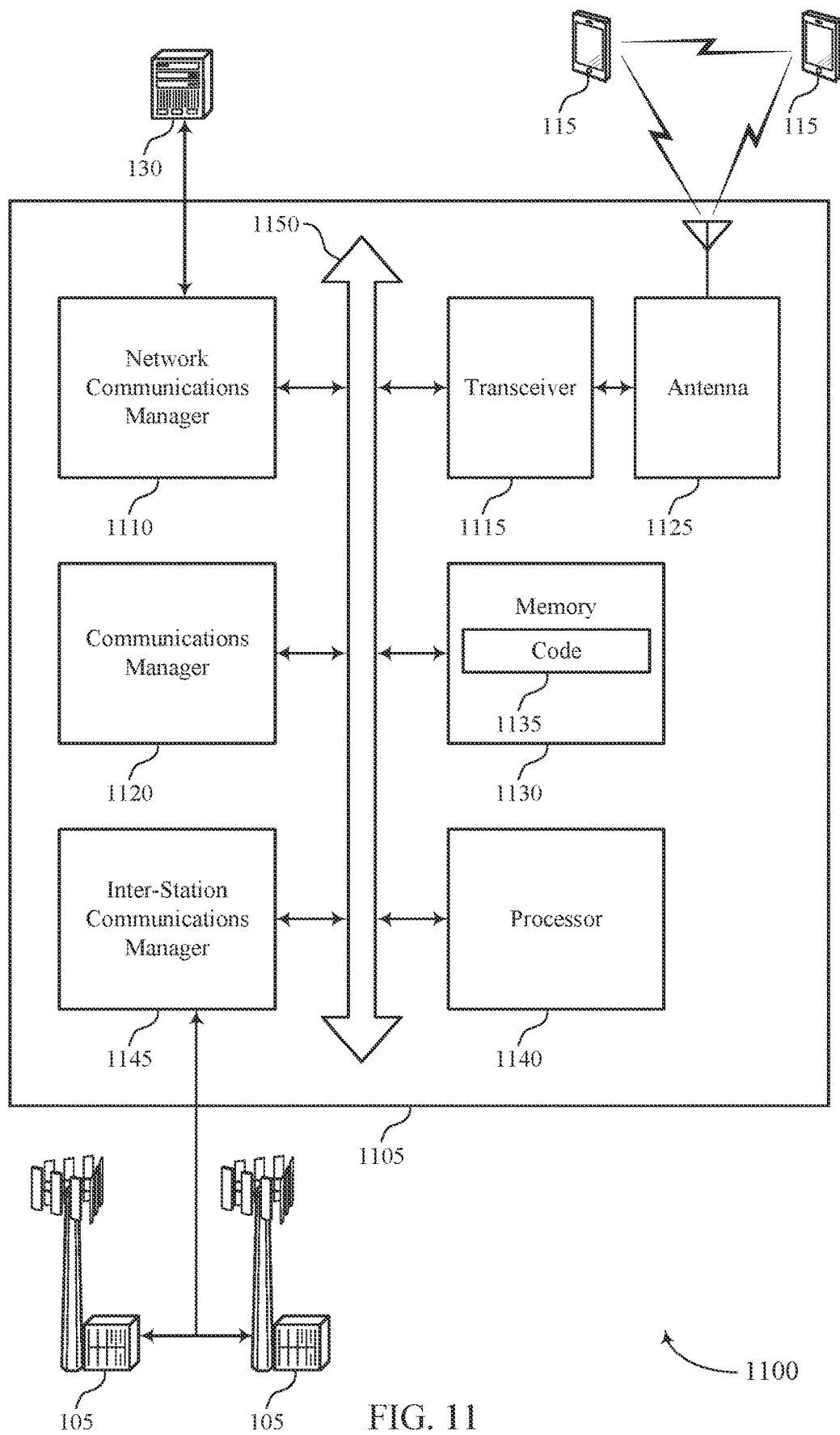
FIG. 11 shows a diagram of a system including a device that supports techniques for indicating message repetition parameters in accordance with aspects of the present disclosure.

FIG. 11 shows a diagram of a system 1100 including a device 1105 that supports techniques for indicating message repetition parameters in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter

815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, a r ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for indicating message repetition parameters). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UES 115 in cooperation with other base stations 105, For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for receiving, from a UE, a random access request to establish a connection with the base station. The communications manager 1120 may be configured as or otherwise support a means for transmitting, to the UE, a. RAR including control signaling associated with one or more transmission parameters, where a first transmission parameter of the one or more transmission parameters maps to a repetition parameter associated with an uplink message. The communications manager 1120 may be configured as or otherwise support a means for monitoring for one or more repetitions of the uplink message according to the repetition parameter.

By including or configuring the communications manager 1120 in accordance with examples as described herein, the device 1105 may support techniques for improved communication reliability, improved user experience related to increased data throughput, more efficient utilization of communication resources, improved coordination between devices, and reduced latency.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for indicating message repetition parameters as described herein, or the processor 1140 and the memory 1130 may be otherwise configured to perform or support such operations.

FIG. 12 shows a flowchart illustrating a method 1200 that supports techniques for indicating message repetition parameters in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE, to perform the described functions. Additionally or alternatively, the UE may perform aspects of the described functions using special-purpose hardware.

At 1205, the method may include transmitting a random access request to establish a connection with a base station. The operations of 1205 may be performed in accordance with examples as disclosed herein. In some examples, aspects of the operations of 1205 may be performed by a request manager 625 as described with reference to FIG. 6.

At 1210, the method may include receiving, from the base station, a RAR including control signaling associated with one or more transmission parameters, where a first transmission parameter of the one or more transmission parameters maps to a repetition parameter associated with an uplink message. The operations of 1210 may be performed in accordance with examples as disclosed herein. In some examples, aspects of the operations of 1210 may be performed by a response component 630 as described with reference to FIG. 6.

At 1215, the method may include transmitting one or more repetitions of the uplink message according to the repetition parameter. The operations of 1215 may be performed in accordance with examples as disclosed herein. In some examples, aspects of the operations of 1215 may be performed by an uplink message manager 635 as described with reference to FIG. 6.

FIG. 13 shows a flowchart illustrating a method 1300 that supports techniques for indicating message repetition parameters in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a SIB identifying a mapping between a first transmission parameter and a repetition parameter. The operations of 1305 may be performed in accordance with examples as disclosed herein. In some examples, aspects of the operations of 1305 may be performed by a system information component 640 as described with reference to FIG. 6.

At 1310, the method may include transmitting a random access request to establish a connection with the base station. The operations of 1310 may be performed in accordance with examples as disclosed herein. In some examples, aspects of the operations of 1310 may be performed by a request manager 625 as described with reference to FIG. 6.

At 1315, the method may include receiving, from the base station, a RAR including control signaling associated with one or more transmission parameters, wherein the first transmission parameter of the one or more transmission parameters maps to the repetition parameter associated with an uplink message. The operations of 1315 may be performed in accordance with examples as disclosed herein. In some examples, aspects of the operations of 1315 may be performed by a response component 630 as described with reference to FIG. 6.

At 1320, the method may include transmitting one or more repetitions of the uplink message according to the repetition parameter based at least in part on the received SM. The operations of 1320 may be performed in accordance with examples as disclosed herein. In some examples, aspects of the operations of 1320 may be performed by an uplink message manager 635 as described with reference to FIG. 6.

Figure 14:
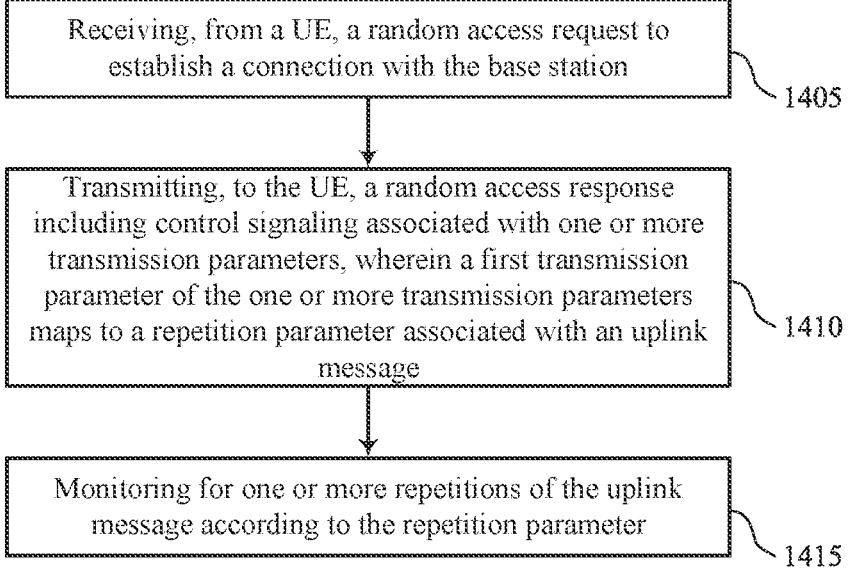

FIG. 14 shows a flowchart illustrating a method 1400 that supports techniques for indicating message repetition parameters in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include receiving, from a UE, a random access request to establish a connection with the base station. The operations of 1405 may be performed in accordance with examples as disclosed herein. In some examples, aspects of the operations of 1405 may be performed by a request component 1025 as described with reference to FIG. 10.

At 1410, the method may include transmitting, to the UE, a RAR including control signaling associated with one or more transmission parameters, where a first transmission parameter of the one or more transmission parameters maps to a repetition parameter associated with an uplink message. The operations of 1410 may be performed in accordance with examples as disclosed herein. In some examples, aspects of the operations of 1410 may be performed by a response manager 1030 as described with reference to FIG. 10.

At 1415, the method may include monitoring for one or more repetitions of the uplink message according to the repetition parameter. The operations of 1415 may be performed in accordance with examples as disclosed herein. In some examples, aspects of the operations of 1415 may be performed by an uplink message component 1035 as described with reference to FIG. 10.

FIG. 15 shows a flowchart illustrating a method 1500 that supports techniques for indicating message repetition parameters in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting a SIB identifying a mapping between a first transmission parameter and a repetition parameter. The operations of 1505 may be performed in accordance with examples as disclosed herein. In some examples, aspects of the operations of 1505 may be performed by a system information manager 1040 as described with reference to FIG. 10.

At 1510, the method may include receiving, from a UE, a random access request to establish a connection with the base station. The operations of 1510 may be performed in accordance with examples as disclosed herein. In some examples, aspects of the operations of 1510 may be performed by a request component 1025 as described with reference to FIG. 10.

At 1515, the method may include transmitting, to the UE, a RAR including control signaling associated with one or more transmission parameters, wherein the first transmission parameter of the one or more transmission parameters maps to the repetition parameter associated with an uplink message. The operations of 1515 may be performed in accordance with examples as disclosed herein. In some examples, aspects of the operations of 1515 may be performed by a response manager 1030 as described with reference to FIG. 10.

At 1520, the method may include monitoring for one or more repetitions of the uplink message according to the repetition parameter based at least in part on the transmitted. SIB. The operations of 1520 may be performed in accordance with examples as disclosed herein. In some examples, aspects of the operations of 1520 may be performed by an uplink message component 1035 as described with reference to FIG. 10.

Figure 16:
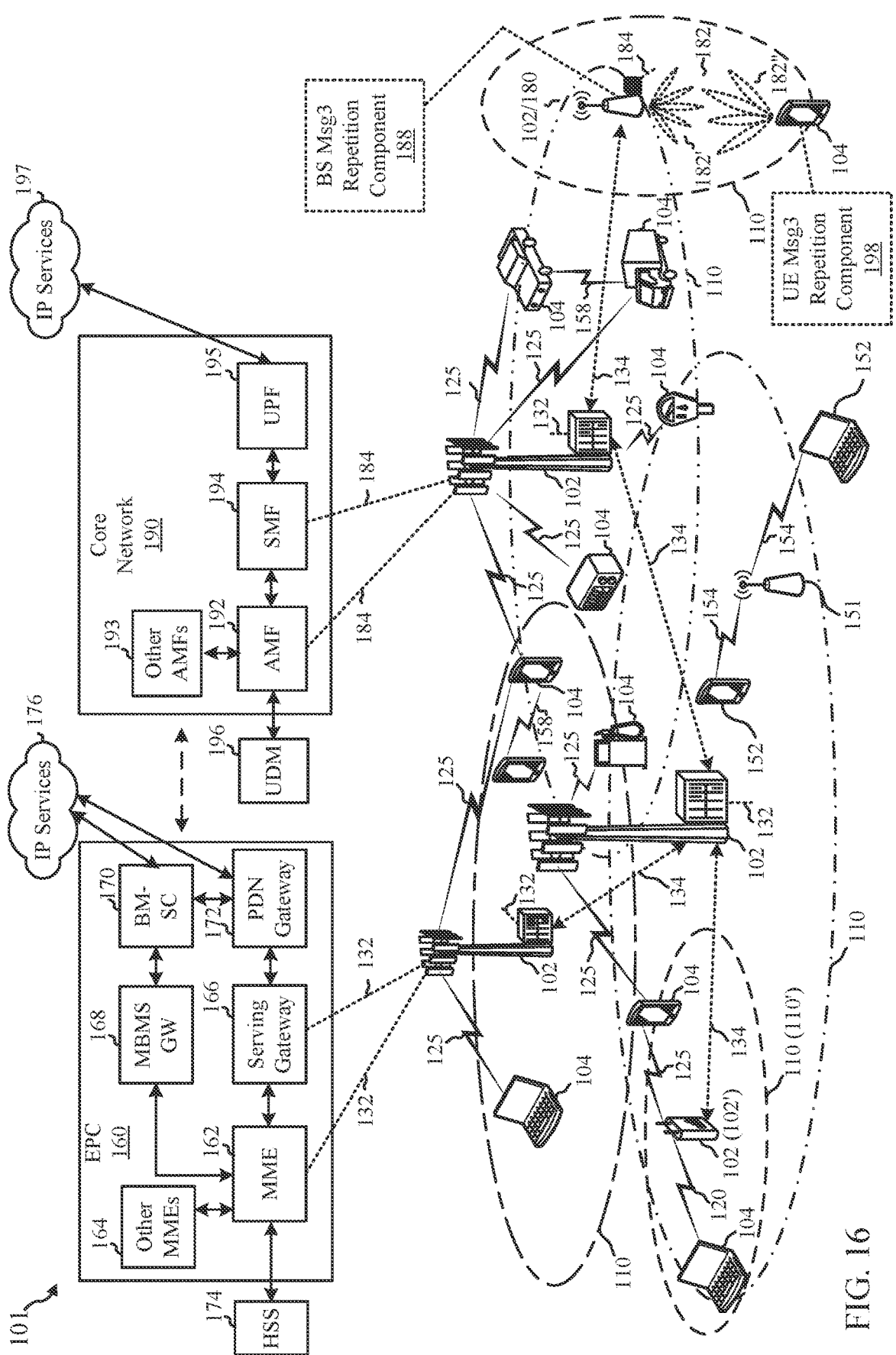
FIG. 16 is a diagram illustrating an example of a wireless communications system and an access network, in accordance with various aspects of the present disclosure.

FIG. 16 is a diagram illustrating an example of an access network 101, in accordance with various aspects of the present disclosure. The access network 101 (also referred to as a wireless wide area network (WWAN)) includes base stations 102, UEs 104, an Evolved Packet Core (EPC) 160, and another core network 190 (e.g., a 5G Core (5GC)). In some examples, the access network 101, the base stations 102, and the UEs 104 may be examples of the wireless communications system 100, the base stations 105, and the UEs 115 respectively, as described with reference to FIG. 1.

In some aspects, the UE 104 may include a UE Msg3 repetition component 198. The UE Msg3 repetition component 198 may be configured to send a Msg3 one or more times, during a RACH procedure, according to a repetition configuration indicated by a time, within a RAR window, at which a Msg2 was received by the UE 104. For example, the UE Msg3 repetition component 198 may be configured to receive system information comprising a RAR configuration, send a random access message 1 (e.g., Msg1) requesting to initiate a random access procedure, receive the Msg2 during the RAR window, determine a interval of the plurality of intervals of the RAR window according to timing information of the second random access message comprising at least one of a time at which the Msg2 was received and PDCCH scheduling of the Msg2, and send one or more times the Msg3 according to the distinct transmission configuration corresponding to the interval.

Similarly, the base stations 102 may include a base station (BS) Msg3 repetition component 188. The BS Msg3 repetition component 188 may be configured to send system information comprising a RAR configuration, receive the Msg1 requesting to initiate a random access procedure, select a interval of a plurality of intervals of the RAR window according to PDCCH scheduling of the second random access message, send the Msg2 during the interval, and receive at least one Msg3 of a plurality of Msg3 sent by the UE according to the distinct transmission configuration corresponding to the interval.

The base stations 102 may include macrocells (high power cellular base station) and/or small cells (low power cellular base station). The macrocells include base stations. The small cells include femtocells, picocells, and microcells. The base stations 102 configured for 4G UE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 125 between the base stations 102 and the UEs 104 may include uplink (also referred to as reverse link) transmissions from a UE 104 to a base station 102 and/or downlink (also referred to as forward link) transmissions from a base station 102 to a UE 104, The communication links 125 may use multiple-input and multiple-output (MIMO) antenna technology, including spatial multiplexing, beamforming, and/or transmit diversity. The communication links may be through one or more carriers. The base stations 102 and/or UEs 104 may use spectrum up to Y MHz (e.g., 5, 10, 15, 20, 100, 400, etc. MHz) bandwidth per carrier allocated in a carrier aggregation of up to a total of Yee MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard. LTE, or NR.

The access network 101 may further include a Wi-Fi access point (AP) 151 in communication with Wi-Fi stations (STAs) 152 via communication links 154, e.g., in a 5 GHz unlicensed frequency spectrum or the like. When communicating in an unlicensed frequency spectrum, the STAs 152 and/or the AP 151 may perform a clear channel assessment (CCA) prior to communicating in order to determine whether the channel is available.

A base station 102, whether a small cell 102' or a large cell (e.g., macro base station), may include an evolved Node B (eNB), gNodeB (gNB), or other type of base station. Some base stations, such as base station 180 may operate in one or more frequency bands within the electromagnetic spectrum. In some case, the base station 180 may be an example of a base station 102.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 151. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the international Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the Ulf band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180 and/or the UE 104 may perform beam training to determine the best receive and transmit directions for each of the base station 180 and/or the UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on sidelink, V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160, For example, the MME 162 provides bearer and connection management. All user Internet Protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. For example, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or an other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may provide examples for communication in connection with 5G NR, the concepts described herein may be applicable to other similar areas, such as LTE, LTE-A, CDMA, GSM, and other wireless technologies.

Referring to FIGS. 17A-17D, the diagrams illustrate examples of different resources that may be used for communications between network elements (e.g., base station 102, UE 104) of the wireless communication system and the access network 101 described above in FIG. 16. The resources may be time-based, frequency-based, or both on time and frequency.

Figures 17A, 17B, 17C, 17D:
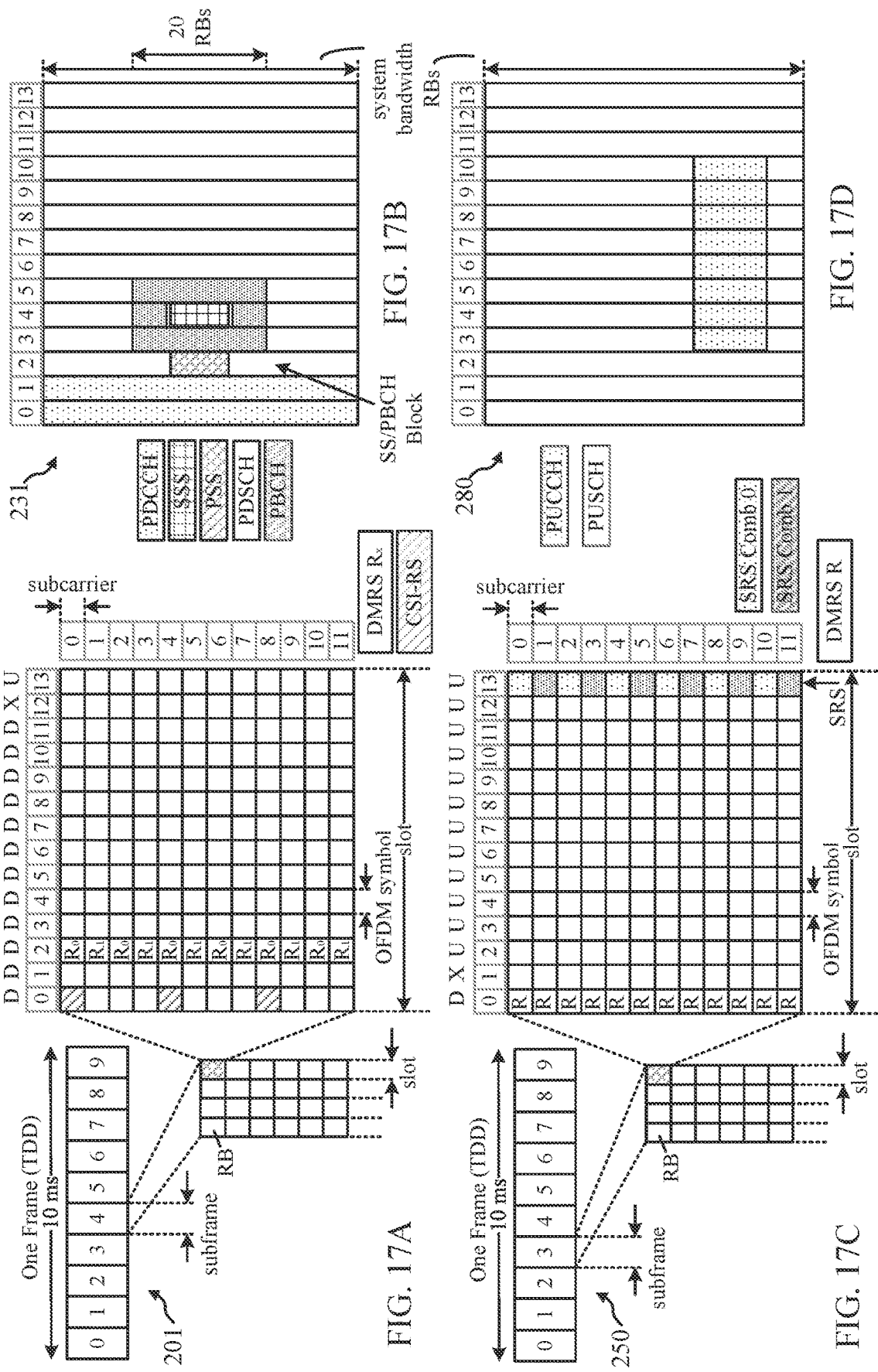
FIG. 17A is a diagram illustrating an example of a first subframe within a fifth generation (5G) new radio (NR) frame structure, in accordance with various aspects of the present disclosure.
FIG. 17B is a diagram illustrating an example of downlink channels within a 5G NR subframe, in accordance with various aspects of the present disclosure.
FIG. 17C is a diagram illustrating an example of a second subframe within a 5G NR frame structure, in accordance with various aspects of the present disclosure.
FIG. 17D is a diagram illustrating an example of uplink channels within a 5G NR subframe, in accordance with various aspects of the present disclosure.

FIG. 17A is a diagram 201 illustrating an example of a first subframe within a 5G NR frame structure, in accordance with various aspects of the present disclosure. FIG. 17B is a diagram 231 illustrating an example of downlink channels within a 5G NR subframe, in accordance with various aspects of the present disclosure. FIG. 17C is a diagram 250 illustrating an example of a second subframe within a 5G NR frame structure, in accordance with various aspects of the present disclosure. FIG. 17D is a diagram 280 illustrating an example of uplink channels within a. 5G NR subframe, in accordance with various aspects of the present disclosure. The 5G NR frame structure may be frequency division duplexed (FDD) in which for a set of subcarriers (carrier system bandwidth), subframes within the set of subcarriers are dedicated for either downlink or uplink, or may be time division duplexed. (TDD) in which for a set of subcarriers (carrier system bandwidth), subframes within the set of subcarriers are dedicated for both downlink and uplink. In the examples provided by FIGS. 17A, 17C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 1 (with mostly uplink). While subframes 3, 4 are shown with slot formats 1, 28, respectively, any subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame (e.g., 10 milliseconds) may be divided into 10 equally sized subframes (e.g., 1 millisecond). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be CP-OFDM symbols. The symbols on uplink may be CP-OFDM symbols (for high throughput scenarios) or DFT-S-OFDM symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2\mu*15$ kHz, where $\mu$ is the numerology 0 to 5, As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 17A-17D provide an example of slot configuration 0 with 14 symbols per slot and numerology $\mu=2$ with 4 slots per subframe. In such an example, the slot duration may be 0.25 milliseconds, the subcarrier spacing may be 60 kHz, and the symbol duration may be approximately 16.67 microseconds ($\mu$s). Within a set of frames, there may be one or more different bandwidth parts (BWPs) (see FIG. 17B) that are frequency division multiplexed. Each BWP may have a numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 17A, some of the REs carry reference (pilot) signals (RS) for the UE. The RS may include demodulation RS (DM-RS) (indicated as RX for one configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 17B illustrates an example of various downlink channels within a subframe of a frame. The PDCCH carries DCI within one or more control channel elements (CCEs)

(e.g., 1, 2, 4, 8, 16, or 32 CCEs), each CCE including nine RE groups (REGs), each REG including four consecutive REs in an OFDM symbol of an RB. A PDCCH within one BWP may be referred to as a CORESET. A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of subframes of a frame. The PSS is used by a UE 104 to determine subframe/symbol timing and a physical layer identity. A secondary synchronization signal (SSS) may be within symbol 4 of subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The terms SSB and SS/PBCH may be used interchangeably. The MIB provides a number of RBs in the system bandwidth and a system frame number (SFN). The PDSCH carries user data, broadcast system information not transmitted through the PBCH such as SIBs, and paging messages.

As illustrated in FIG. 17C, some of the REs carry DM-RS (indicated as R for one configuration, but other DM-RS configurations are possible) for channel estimation at the base station. The UE may transmit DM-RS for the physical uplink control channel (PUCCH) and DM-RS for the PUSCH. The PUSCH DM-RS may be transmitted in the first one or two symbols of the PUSCH. The PUCCH DM-RS may be transmitted in different configurations depending on whether short or long PUCCHs are transmitted and depending on the PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 17D illustrates an example of various uplink channels within a subframe of a frame. The PUCCH may be located as indicated in one example. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 18:
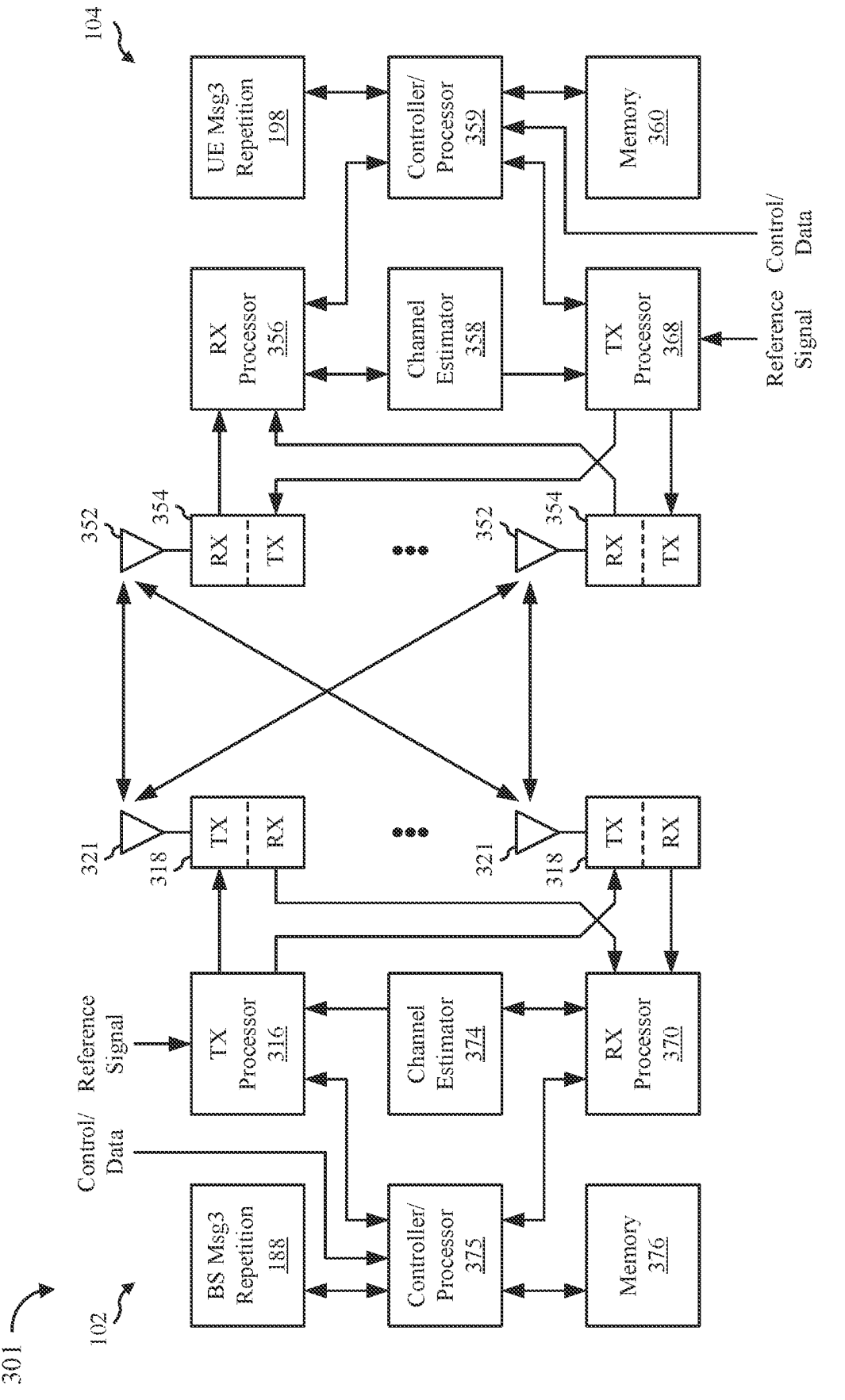
FIG. 18 is a diagram illustrating an example of hardware components of the base station and the UE in the access network, in accordance with various aspects of the present disclosure.

FIG. 18 is a diagram illustrating an example of hardware components of the base station and the UE in the access network, in accordance with various aspects of the present disclosure. The FIG. 18 illustrates a block diagram 301 of example hardware components of a base station 102 in communication with a UE 104 in an access network. In the downlink, IP packets from the EPC 160 may be provided to a controller/processor 375. The controller/processor 375 may implement Layer 3 and/or Layer 2 functionality. Layer 3 may include a radio resource control (RRC) layer, and Layer 2 may include a service data adaptation protocol (SDAP) layer, a PDCP layer, a RLC layer, and a MAC layer.

The controller/processor 375 may provide RRC layer functionality associated with broadcasting of system information (e.g., MIB, SIBs), RRC connection control (e.g., RRC connection paging, RRC connection establishment, RRC connection modification, and RRC connection release), inter radio access technology mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 may implement Layer 1 functionality associated with various signal processing functions. Layer 1, which may include a physical layer, may include error detection on the transport channels, FEC coding/decoding of the transport channels, interleaving, rate matching, mapping onto physical channels, modulation/demodulation of physical channels, and MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream may be spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 321 via a separate transmitter 318TX. Each transmitter 318TX may modulate an RF carrier with a respective spatial stream for transmission.

At the UE 104, each receiver 354RX may receive a signal through its respective antenna 352. Each receiver 354RX may recover information modulated onto an RE' carrier and may provide the information to the RX processor 356, The TX processor 368 and the RX processor 356 may implement Layer 1 functionality associated with various signal processing functions. The RX processor 356 may perform spatial processing on the information to recover any spatial streams destined for the UE 104. If or when multiple spatial streams are destined for the UE 104, the multiple spatial streams may be combined by the RX processor 356 into a single OFDM symbol stream. The RX processor 356 may then convert the OFDM symbol stream from the time-domain to the frequency domain using a Fast Fourier Transform (FFT), The frequency domain signal may comprises a separate OFDM symbol stream for each subcarrier of the OFDM signal. The symbols on each subcarrier, and the reference signal, may be recovered and demodulated by determining the most likely signal constellation points transmitted by base station 102. These soft decisions may be based on channel estimates computed by the channel estimator 358. The soft decisions may then be decoded and deinterleaved to recover the data and control signals that were originally transmitted by the base station 102 on the physical channel. The data and control signals may then be provided to the controller/processor 359, which may implement Layer 3 and Layer 2 functionality.

The controller/processor 359 can be associated with a memory 360 that stores program codes and data. The memory 360 may be referred to as a non-transitory computer-readable medium. The controller/processor 359 may provide demultiplexing between transport and logical channels, packet reassembly, deciphering, header decompression, and control signal processing to recover IP packets from the EPC 160. The controller/processor 359 is also responsible for error detection using an acknowledge (ACK) and/or negative acknowledge (NACK) protocol to support HARQ operations.

Similar to the functionality described in connection with the transmission by base station 102, the controller/processor 359 may provide RRC layer functionality associated with system information MIB, SIBs) acquisition, RRC connections, and measurement reporting; PDCP layer functionality associated with header compression/decompression, and security (ciphering, deciphering, integrity protection, integrity verification); RlX layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission may be processed at the base station 102 in a manner similar to that described in connection with the receiver function at the UE 104. Each receiver 318RX may receive a signal through its respective antenna 321. Each receiver 318RX may recover information modulated onto an RF carrier and may provide the information to a RX processor 370.

The controller/processor 375 may be associated with, and coupled with, a memory 376 that stores program codes and data. The memory 376 may be referred to as a non-transitory computer-readable medium. The controller/processor 375 may provide demultiplexing between transport and logical channels, packet reassembly, deciphering, header decompression, control signal processing to recover IP packets from the UE 104. IP packets from the controller/processor 375 may be provided to the EPC 160. The controller/processor 375 may also be responsible for error detection using an ACK and/or NACK protocol to support HARQ operations.

In some aspects, the base station 102 may comprise a BS Msg3 repetition component 188. The BS Msg3 repetition component 188 may be configured to send system information comprising a RAR configuration. The BS Msg3 repetition component 188 may be further configured to receive a first random access message Msg1) requesting to initiate a random access procedure. Alternatively or additionally, the BS Msg3 repetition component 188 may be configured to select a interval of the plurality of intervals of the RAR window according to PDCCH scheduling of the second random access message. Alternatively or additionally, the BS Msg3 repetition component 188 may be configured to send the second random access message (e.g., Msg2) during the interval. Alternatively or additionally, the BS Msg3 repetition component 188 may be configured to receive at least one third random access message of a plurality of third random access messages (e.g., Msg3) sent by the UE according to the distinct transmission configuration corresponding to the interval.

In other aspects, at least one of the TX processor 316, the RX processor 370, and the controller/processor 375 may be configured to perform aspects in connection with the BS Msg3 repetition component 188 of FIG. 16. For example, the memory 376 may store computer-executable instructions defining the BS Msg3 repetition component 188. In other aspects, the TX processor 316, the RX processor 370, and/or the controller/processor 375 may be configured to execute the BS Msg3 repetition component 188.

In some aspects, the UE 104 may comprise a UE Msg3 repetition component 198. The UE Msg3 repetition component 198 may be configured to receive system information comprising a RAR configuration. The UE Msg3 repetition component 198 may be further configured to send a first random access message (e.g., Msg1) requesting to initiate a random access procedure. Alternatively or additionally, the UE Msg3 repetition component 198 may be configured to receive a second random access message e.g., Msg2) during the RAR window. Alternatively or additionally, the UE Msg3 repetition component 198 may be configured to determine a interval of the plurality of intervals of the RAR window according to timing information of the second random access message comprising at least one of a time at which the second random access message was received and PDCCH scheduling of the second random access message. Alternatively or additionally, the UE Msg3 repetition component 198 may be configured to send the third random access message (e.g., Msg3) one or more times according to the distinct transmission configuration corresponding to the interval.

In other aspects, at least one of the TX processor 368, the RX processor 356, and the controller/processor 359 may be configured to perform aspects in connection with the UE Msg3 repetition component 198 of FIG. 16. For example, the memory 360 may store computer-executable instructions defining the UE Msg3 repetition component 198. In other aspects, the TX processor 368, the RX processor 356, and/or the controller/processor 359 may be configured to execute the UE Msg3 repetition component 198.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with enhanced mobile broadband (eMBB), massive machine type communications (mMTC), and ultra-reliable low latency communications (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 19:
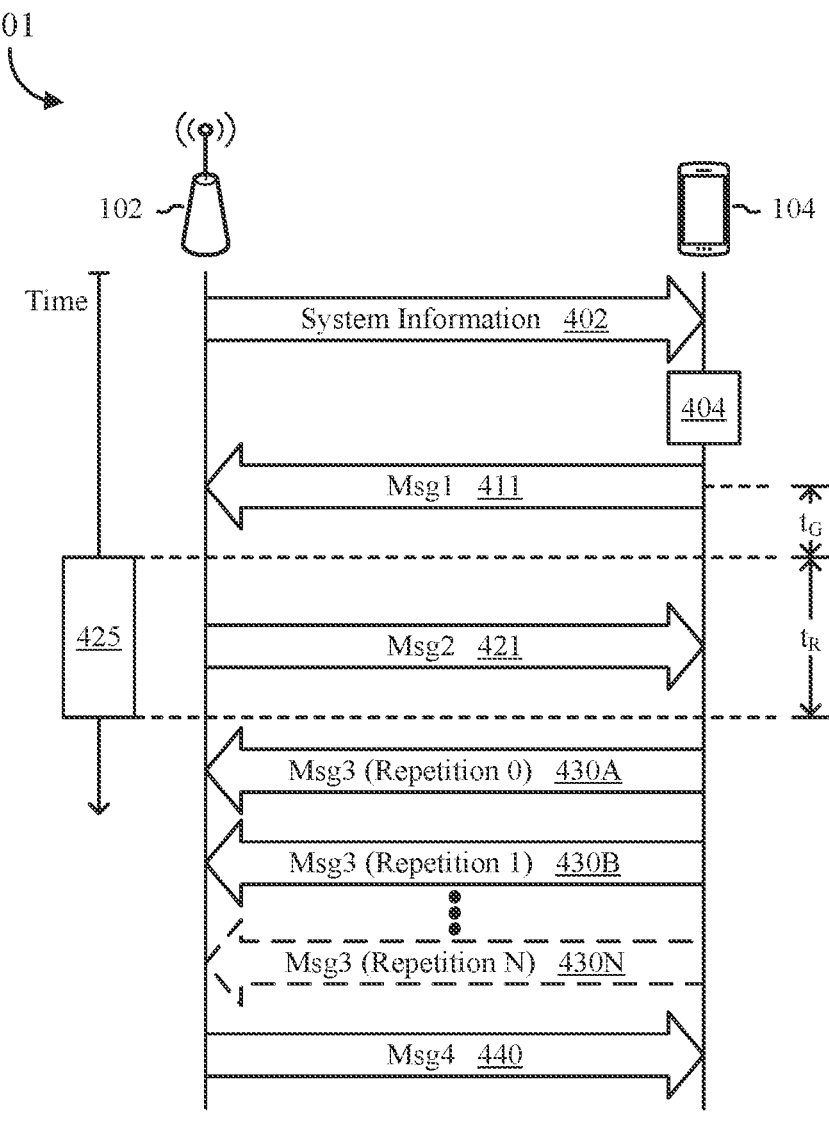
FIG. 19 is a diagram illustrating an example message exchange for a random access channel (RAM procedure between a base station and a UE in an access network, in accordance with various aspects of the present disclosure.

FIG. 19 is a diagram illustrating an example message exchange for a RACH procedure 401 between a base station 102 and a UE 104 in an access network (e.g., access network 101), in accordance with various aspects of the present disclosure. The base station 102 may include a BS Msg3 repetition component 188. The UE 104 may include a UE Msg3 repetition component 198.

As shown at 402, the UE 104 may receive system information (e.g., MIB, SIBs) from the base station 102. For example, the base station 102 may broadcast a MIB over a PBCH that may be received by the UE 104. Alternatively or additionally, the base station 102 may broadcast SIBs (e.g., SIB1, SIB2, SIB3, SIB4, and the like) over a PDCCH and/or a PDSCH that may be received by the UE 104. In some aspects, the system information transmitted by the base station 102 may comprise a RAR configuration. For example, an RMSI, (such as SIB) may comprise the RAR configuration.

In some aspects, the RAR configuration may indicate a time period tR of a RAR window 425. The RAR window 425 may refer to a time span (e.g., tR) during which the UE 104 may receive the RAR message (e.g., Msg2). Alternatively or additionally, the RAR window 425 may be configured to start after a predetermined time gap tG from the transmission of the first random access message 411 (e.g., Msg1) has elapsed. In some aspects, the time gap tG may be predefined by one or more regulations and/or standards (e.g., 3GPP). For example, the time gap tG may be defined as a value equivalent to the time duration of three (3) subframes. The UE 104 may be configured to monitor a physical channel PDCCH and/or a PDSCH) for reception of the RAR message during the RAR window 425 indicated by the RAR configuration.

Alternatively or additionally, the RAR configuration may indicate a plurality of intervals (e.g., time segments) of the RAR window 425. That is, the RAR window 425 may be divided into the plurality of intervals as indicated by the RAR configuration. Each interval of the plurality of intervals may correspond to a distinct transmission configuration of the random access message 3 (e.g., Msg3). That is, the base station 102 may implicitly indicate to the UE 104 a transmission configuration of the random access message 3 (e.g., Msg3) by transmitting the RAR Msg2) during an interval corresponding to the transmission configuration. Thus, the base station 102 may provide a Msg3 transmission configuration to the UE without having to increase the size of the RAR message (e.g., Msg2).

Figure 20:
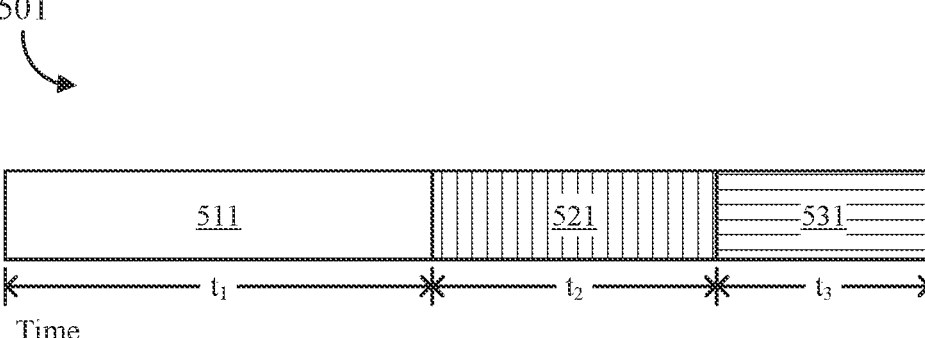
FIG. 20 is a diagram illustrating an example random access response (RAR) window, in accordance with various aspects of the present disclosure.

FIG. 20 is a diagram illustrating an example RAR window, in accordance with various aspects of the present disclosure. For example, as shown in FIG. 20, an example RAR window 501 may be divided into a plurality of intervals (e.g., intervals 511, 521, and 531). In some aspects, interval 511 may correspond to a first transmission configuration, interval 521 may correspond to a second transmission configuration, and interval 531 may correspond to a third transmission configuration. As such, the base station 102 may implicitly indicate to the UE 104 to transmit the random access message 3 (e.g., Msg) using the first transmission configuration by transmitting the RAR Msg2) during the time segment t1 of the interval 511. Alternatively or additionally, the base station 102 may implicitly indicate to the UE 104 to transmit the random access message 3 (e.g., Msg3) using the second transmission configuration by transmitting the RAR (e.g., Msg2) during the time segment t2 of the interval 521. Alternatively or additionally, the base station 102 may implicitly indicate to the UE 104 to transmit the random access message 3 (e.g., Msg3) using the third transmission configuration by transmitting the RAR (e.g., Msg2) during the time segment t3 of the interval 531.

Although the example RAR window 501 depicted in FIG. 20 shows three intervals (e.g., intervals 511, 521, and 531), it should be understood that the RAR window 501 may be divided into other quantities of intervals without deviating from the scope of the present disclosure. Notably, the present disclosure may be employed in any wireless communication system in which a Msg3 transmission configuration may be implicitly indicated by a Msg2 transmission timing within the RAR window 501.

In some aspects, the Msg3 transmission configurations associated with the plurality of intervals may be predetermined. That is, the base station 102 and the UE 104 may each comprise the Msg3 transmission configurations and/or may have access to a storage location comprising the Msg3 transmission configurations. Alternatively or additionally, the base station 102 may provide the Msg3 transmission configurations to the UE 104. For example, the base station 102 may broadcast system information (e.g., MIB, SIBs, RMSI) comprising the transmission configurations.

In some aspects, each of the Msg3 transmission configurations that correspond to the plurality of intervals of the RAR window 425 may be distinct (e.g., different) from the remaining Msg3 transmission configurations. That is, each interval of the plurality of intervals may correspond to and/or implicitly indicate a distinct Msg3 transmission configuration.

In other optional or additional aspects, the Msg3 transmission configuration may comprise an indicator indicating a quantity of Msg3 transmission repetitions to be sent by the UE 104. That is, the Msg3 transmission configuration may instruct the UE 104 to send the indicated quantity of Msg3 transmission repetitions during the RACH procedure. For example, if or when the Msg3 transmission configuration indicates a value of four (4) as the quantity of Msg3 transmission repetitions to be sent by the UE 104, the UE 104 may be configured to transmit a total of five (5) third random access messages (e.g., Msg3), during the RACH procedure (e.g., first transmission plus four repetitions). For another example, if or when the Msg3 transmission configuration indicates a value of zero (0) as the quantity of Msg3 transmission repetitions to be sent by the UE 104, the UE 104 may be configured to transmit a total of one (1) third random access message (e.g., Msg3), during the RACH procedure (i.e., no repetitions).

In other optional or additional aspects, the Msg3 transmission configuration may comprise an indicator indicating a quantity of Msg3 transmissions to be sent by the UE 104. That is, the Msg3 transmission configuration may instruct the UE 104 to send the indicated quantity of Msg3 transmissions during the RACH procedure. For example, if or when the Msg3 transmission configuration indicates a value of four (4) as the quantity of Msg3 transmissions to be sent by the UE 104, the UE 104 may be configured to transmit a total of four (4) third random access messages (e.g., Msg3), during the RACH procedure (e.g., first transmission plus three repetitions). For another example, if or when the Msg3 transmission configuration indicates a value of one (1)

as the quantity of Msg3 transmissions to be sent by the UE 104, the UE 104 may be configured to transmit a total of one (1) third random access message (e.g., Msg3), during the RACH procedure (i.e., no repetitions).

Alternatively or additionally, the UE 104 may transmit the Msg3 transmission using resources (e.g., time-based, frequency-based, or both) indicated by the base station 102. For example, the RAR configuration broadcasted by the base station 102 may indicate one or more resources reserved for the transmission of the Msg3 repetitions. In another example, the UE 104 may select resources for transmitting the Msg3 repetitions that correspond with the resources used to transmit the first Msg3. In such an example, the base station 102 may transmit a RAR configuration comprising an indication of the resources reserved for transmission of the first Msg3. In yet another example, the UE 104 may determine the resources for transmitting the Msg3 repetitions according to a predefined rule. Alternatively or additionally, the RAR configuration may comprise one or more rule parameters to configure the predefined rule.

In other optional or additional aspects, the Msg3 transmission configuration may comprise an indication of whether the third random access message (e.g., Msg3) is to be sent using frequency hopping, such as intra-slot frequency hopping and/or inter-slot frequency hopping. That is, the Msg3 transmission configuration may configure the UE 104 to perform intra-slot frequency hopping and/or inter-slot frequency hopping when performing the Msg3 transmission repetitions. In such aspects, the RAR configuration may comprise parameters, such as frequency offsets, for configuration of the frequency hopping.

With further reference to FIG. 19, and additionally to Table 1, during operation, the UE 104 may execute a RACH procedure 401, according to a 4-step NR RACH message flow, due to the occurrence of one or more RACH trigger events 404. Suitable examples of RACH trigger events 404 may include, but are not limited to: (i) the UE 104 performing an initial access to transition from an RRC_IDLE state to RRC_CONNECTED ACTIVE state; (ii) the UE 104 detecting downlink data arrival while in an RRC_IDLE state or RRC_CONNECTED INACTIVE state; (iii) the UE 104 determining uplink data arrival from higher layers during RRC_IDLE state or RRC_CONNECTED INACTIVE state; (iv) the UE 104 performing a handover from another base station to the base station 102 during the connected mode of operation; and (v) the UE performing a connection re-establishment procedure such as a beam failure recovery procedure.

The RACH procedure 401 may be associated with a contention-based random access procedure, or with a contention-free random access procedure. In some aspects, a contention-based NR RACH procedure corresponds to the following RACH trigger events 404: an initial access from RRC_IDLE to RRC_CONNECTED ACTIVE; uplink data arrival during RRC_IDLE or RRC_CONNECTED INACTIVE; and a connection re-establishment. In other aspects, a contention-free RACH procedure may correspond to the following RACH trigger events 404: downlink data arrival during RRC_IDLE or RRC_CONNECTED INACTIVE, and a handover during the connected mode of operation.

On the occurrence of any of the above RACH trigger events 404, the execution of the RACH procedure 401 may include the 4-step NR. RACH message flow (see FIG. 19 and Table 1), where the UE 104 may exchanges messages with one or more base stations 102 to gain access to a wireless network and establish a communication connection. The messages may be referred to as random access messages 1 to 4, RACH messages 1 to 4, or may alternatively be referred to by the physical channel carrying the message, for example, message 3 PUSCH.

TABLE 1

RACH procedure, including Messages and Message Content transmitted over corresponding Physical channel(s).

| Physical Channel | Message | Message Content |
|---|---|---|
| PRACH | Msg1 | RACH Preamble |
| PDCCH/PDSCH | Msg2/RAR | Detected RACH preamble ID, TA, TC-RNTI, backoff indicator, UL/DL grants |
| PUSCH | Msg3 | RRC Connection request (or scheduling request and tracking area update) |
| PDCCH/PDSCH | Msg4 | Contention resolution message |

At 411, for example, the UE 104 may transmit a first random access message Msg1), which may be referred to as a random access request message, to the base station 102 via a physical channel, such as a PRACH. The Msg1 may indicate to the base station 102 that the UE 104 is requesting to initiate a random access procedure. In some aspects, the Msg1 may comprise one or more of a RACH preamble and a resource requirement. In other aspects, the Msg1 may comprise an indication of a Msg3 repetition capability. That is, the UE 104 may indicate to the base station 102 whether the UE 104 is capable of sending the third random access message (e.g., Msg3) one or more times according to the RAR configuration. Alternatively or additionally, the Msg1 may comprise a request to send the third random access message (e.g., Msg3) one or more times according to the RAR configuration.

At 421, the base station 102 may respond to the Msg1 by transmitting a second random access message (e.g., Msg2), which may be referred to as a RAR message, over a PDCCH and/or a PDSCH. In some aspects, the Msg2 may include one or more of a detected preamble identifier (ID), a timing advance (TA) value, a temporary cell radio network temporary identifier (TC-RNTI), a backoff indicator, an uplink grant, or a downlink grant.

In other optional or additional aspects, the base station 102 may select a interval of the plurality of intervals of the RAR window 425. For example, the base station 102 may select the interval based on PDCCH scheduling of the second random access message (e.g., Msg2). Alternatively or additionally, the base station 102 may select the interval based on the preamble sequence of the Msg1. The base station 102 may send the Msg2 during the interval. As such, the base station 102 may indirectly indicate to the UE 104 a Msg3 transmission configuration.

In other optional or additional aspects, the base station 102 may select the interval in response to the Msg1 comprising an indication that the UE 104 is capable of sending the Msg3 one or more times according to the RAR configuration and/or in response to the Msg1 comprising a request to send the Msg3 one or more times according to the RAR configuration.

Alternatively or additionally, the UE 104 may monitor a physical channel (e.g., PDCCH, PDSCH) for reception of the second random access message 421 during the RAR window 425 and according to the RAR configuration. For example, the UE 104 may start to monitor the physical channel after the predetermined time gap tG has elapsed (i.e., after sending the first random access message 411 (e.g., Msg1)). The UE 104 may continue to monitor the physical channel during the time period tR of the RAR window 425 until the UE 104 receives the second random access message 421 (e.g., Msg2) and/or the RAR window 425 elapses (e.g., time period tR). The UE 104 may receive the RAR (e.g., Msg2) based on the monitoring. If or when the UE 104 does not receive the second random access message 421 (e.g., Msg2) by the time that the RAR window 425 elapses, the UE 104 may re-send the first random access message 411 (e.g., Msg1).

In some aspects, the UE 104 may determine a interval of the plurality of intervals of the RAR window 425 in which the RAR (e.g., Msg2) was received. For example, the UE 104 may record a first time at which the first random access message (e.g., Msg1) was sent, measure a second time at which the RAR (e.g., Msg2) was received, calculate a time offset between the first time and the second time, and determine the interval according to the time offset. In some aspects, the UE 104 may record a time at which the RAR window 425 starts. For example, the RAR window 425 may start a predetermined amount of time after the Msg1 has been sent. In such aspects, the UE 104 may calculate the time offset between the start of the RAR window 425 and the second time.

In other optional or additional aspects, the UE 104 may determine the interval of the plurality of intervals of the RAR window 425 according to PDCCH scheduling of the second random access message (e.g., Msg2). For example, the Msg2 may be transmitted via a PDCCH according to the PDCCH scheduling. In such an example, the UE 104 may determine the interval based on the scheduled transmission of the Msg2 according to the PDCCH scheduling.

In response to receiving the Msg2, the UE 104 may transmit a first Msg3 430A (e.g., repetition 0) and up to N repetitions of the Msg3 (e.g., 430B-430N), at 430A-430N. The UE 104 may transmit the Msg3 repetitions according to the Msg3 transmission configuration that corresponds to the interval in which the Msg2 was transmitted. Alternatively or additionally, the UE 104 may transmit the Msg3 repetitions using resources indicated by the RAR configuration broadcasted by the base station 102. In some aspects, the Msg3 may comprise an RRC connection request or a scheduling request, via a physical uplink channel such as PUSCH based on the RAR uplink grant provided in Msg2 of the base station 102. In other aspects, if or when the UE 104 is experiencing channel conditions that may result in poor reception of the Msg3 by the base station 102, the use of repetitions may enhance reception of the Msg3 by the base station 102. For example, channel conditions that may result in poor reception of the Msg3 may include relatively low receive power at the base station 102, use of millimeter wave band frequencies, obstructed line of sight, and/or interference.

In some aspects, the Msg3 transmission repetitions may utilize different frequencies if or when the Msg3 transmission configuration indicates that the Msg3 repetitions are to be sent using frequency hopping, such as intra-slot frequency hopping and/or inter-slot frequency hopping.

At 440, in response to receiving at least one Msg3, the base station 102 may transmit a fourth random access message (e.g., Msg4), which may be referred to as a contention resolution message, to the UE 104 via a PDCCH and/or a. PDSCH. For example, the Msg4 may include a cell radio network temporary identifier (C-RNTI) for the UE 104 to use in subsequent communications.

In some aspects, a collision between two or more UEs 104 requesting access can occur. For instance, two or more UEs 104 may send a Msg1 having a same RACH preamble because the number of RACH preambles may be limited and may be randomly selected by each UE 104 in a contention-based RACH procedure. As such, each colliding UE 104 that selects the same RACH preamble may receive the same temporary C-RNTI and the same uplink grant, and thus each UE 104 may send a similar Msg3 (and Msg3 repetitions), In such a case, the base station 102 may resolve the collision in one or more ways. In a first scenario, a respective Msg3 transmission from each colliding UE 104 may interfere with the other Msg3 transmission, and as a result the base station 102 may not be able to decode the Msg3 receptions and may not send the Msg4. Consequently, each UE 104 may retransmit a Msg1 with a different RACH preamble, thus resolving the collision. In a second scenario, the base station 102 may successfully decode only one Msg3 and send an ACK message to the UE 104 corresponding to the successfully decoded Msg3, In a third scenario, the base station 102 may successfully decode the Msg3 from each colliding UE 104, and may send a Msg4 comprising a contention resolution identifier (such as an identifier tied to one of the UEs) to each of the colliding UEs 104. Each colliding UE 104 may receive the Msg4, decode the Msg 4, and determine if or when the UE 104 is the correct UE by successfully matching or identifying the contention resolution identifier.

Figure 21:
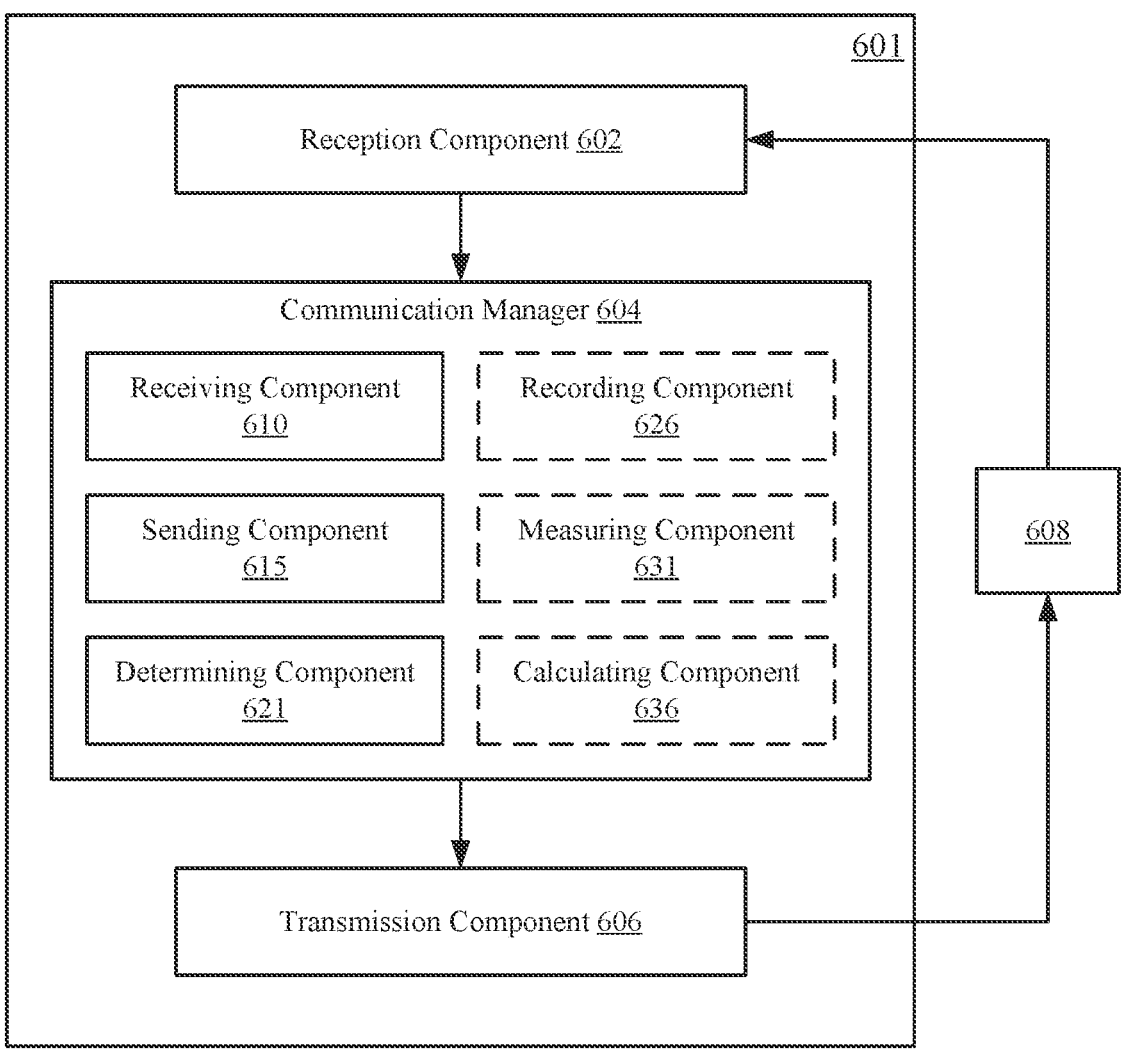
FIG. 21 is a diagram illustrating an example apparatus, such as a UE, for wireless communication, in accordance with various aspects of the present disclosure.

FIG. 21 is a diagram illustrating an example apparatus 601, such as a UE 104, for wireless communication, in accordance with various aspects of the present disclosure. The apparatus 601 may be a UE 104 (e.g., UE 104 of FIGS. 16 and 18-20) or a UE 104 may include the apparatus 601. In some aspects, the apparatus 601 may include a reception component 602 configured to receive wireless communications from another apparatus (e.g., apparatus 608), a communication manager 604 configured to perform Msg3 transmission repetitions, a transmission component 606 configured to transmit wireless communications to another apparatus (e.g., apparatus 608), and which may be in communication with one another (e.g., via, one or more buses or electrical connections). As shown, the apparatus 601 may be in communication with another apparatus 608 (such as a base station 102, or another wireless communication device) using the reception component 602 and the transmission component 606.

In some aspects, the apparatus 601 may be configured to perform one or more operations described herein in connection with FIGS. 16 and 18-20. Alternatively or additionally, the apparatus 601 may be configured to perform one or more processes described herein, such as method 701 of FIGS. 22-23. In some aspects, the apparatus 601 may include one or more components of the UE 104 described above in connection with FIGS. 16 and 18-20.

The reception component 602 may receive communications, such as reference signals, control information, data communications, or a combination thereof, from the apparatus 608. The reception component 602 may provide received communications to one or more other components of the apparatus 601, such as the communication manager 604. In some aspects, the reception component 602 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 602 may include one or more antennas, a demodulator, a MIMO detector, a receive processor, a controller/processor, a memory, or a combination thereof, of the UE 104 described above in connection with FIGS. 16 and 18-20.

The transmission component 606 may transmit communications, such as reference signals, control information, data communications, or a combination thereof, to the apparatus 608. In some aspects, the communication manager 604 may generate communications and may transmit the generated communications to the transmission component 606 for transmission to the apparatus 608. In some aspects, the transmission component 606 may perform signal processing on the generated communications (such as filtering, amplification, modulation, digital-to-analog conversion, multiplexing, interleaving, mapping, or encoding, among other examples), and may transmit the processed signals to the apparatus 608. In other aspects, the transmission component 606 may include one or more antennas, a modulator, a transmit MIMO processor, a transmit processor, a controller/processor, a memory, or a combination thereof, of the UE 104 described above in connection with FIGS. 16 and 18-20. In some aspects, the transmission component 606 may be co-located with the reception component 602 in a transceiver or transceiver component.

The communication manager 604 may receive system information comprising a RAR configuration. The communication manager 604 may send a first random access message (e.g., Msg1) requesting to initiate a random access procedure. The communication manager 604 may receive a second random access message (e.g., Msg2) during the RAR window 425. The communication manager 604 may determine a interval of the plurality of intervals of the RAR window 425 according to timing information of the second random access message comprising at least one of a time at which the second random access message was received and PDCCH scheduling of the second random access message. The communication manager 604 may send the third random access message (e.g., Msg3) one or more times according to the distinct transmission configuration corresponding to the interval.

In some aspects, the communication manager 604 may record a first time at which the first random access message was sent, measure a second time at which the second random access message was received, calculate a time offset between the first time and the second time, and determine, according to the time offset, the interval of the plurality of intervals of the RAR window 425. In other optional or additional aspects, the communication manager 604 may send the first random access message comprising capability information of the UE indicating that the UE is capable of sending the third random access message the one or more times according to the RAR configuration. In other optional or additional aspects, the communication manager 604 may send the first random access message comprising a request to send the third random access message the one or more times according to the RAR configuration. In other optional or additional aspects, the communication manager 604 may send, via a PRACH, the first random access message comprising a RNTI corresponding to the UE. In other optional or additional aspects, the communication manager 604 may receive, via a PDCCH, the second random access message. In other optional or additional aspects, the communication manager 604 may send, via a PUSCH, the third random access message according to the distinct transmission configuration corresponding to the interval.

In other optional or additional aspects, the communication manager 604 may comprise the TX processor 368, the RX processor 356, the controller/processor 359, the memory

360, or a combination thereof, of the UE 104 described above in connection with FIGS. 16 and 18-20.

In some aspects, the communication manager 604 may include a set of components, such as a receiving component 610 configured to receive system information comprising a RAR configuration and to receive the second random access message e.g., Msg2) during the RAR window 425, a sending component 615 configured to a first random access message (e.g., Msg1) and to send the third random access message (e.g., Msg3) one or more times, and a determining component 621 configured to determine a interval of the plurality of intervals of the RAR window 425.

Optionally, the communication manager 604 may further include a recording component 626 configured to record a first time at which the first random access message was sent, a measuring component 631 configured to measure a second time at which the second random access message was received, and a calculating component 636 configured to calculate a time offset between the first time and the second time.

Alternatively or additionally, the set of components may be separate and distinct from the communication manager 604. In other aspects, one or more components of the set of components may include or may be implemented within a controller/processor (e.g., the TX processor 368, the RX processor 356, the controller/processor 359), a memory (e.g., the memory 360), or a combination thereof, of the UE 104 described in FIGS. 16 and 18-20. Alternatively or additionally, one or more components of the set of components may be implemented at least in part as software stored in a memory, such as the memory 360. For example, a component (or a portion of a component) may be implemented as computer-executable instructions or code stored in a non-transitory computer-readable medium and executable by a controller or a processor to perform the functions or operations of the component.

The number and arrangement of components shown in FIG. 21 are provided as an example. In practice, there may be additional components, fewer components, different components, or differently arranged components than those shown in FIG. 21. Furthermore, two or more components shown in FIG. 21 may be implemented within a single component, or a single component shown in FIG. 21 may be implemented as multiple, distributed components. Additionally or alternatively, a set of (one or more) components shown in FIG. 21 may perform one or more functions described as being performed by another set of components shown in FIGS. 16 and 18-20.

Figure 23:
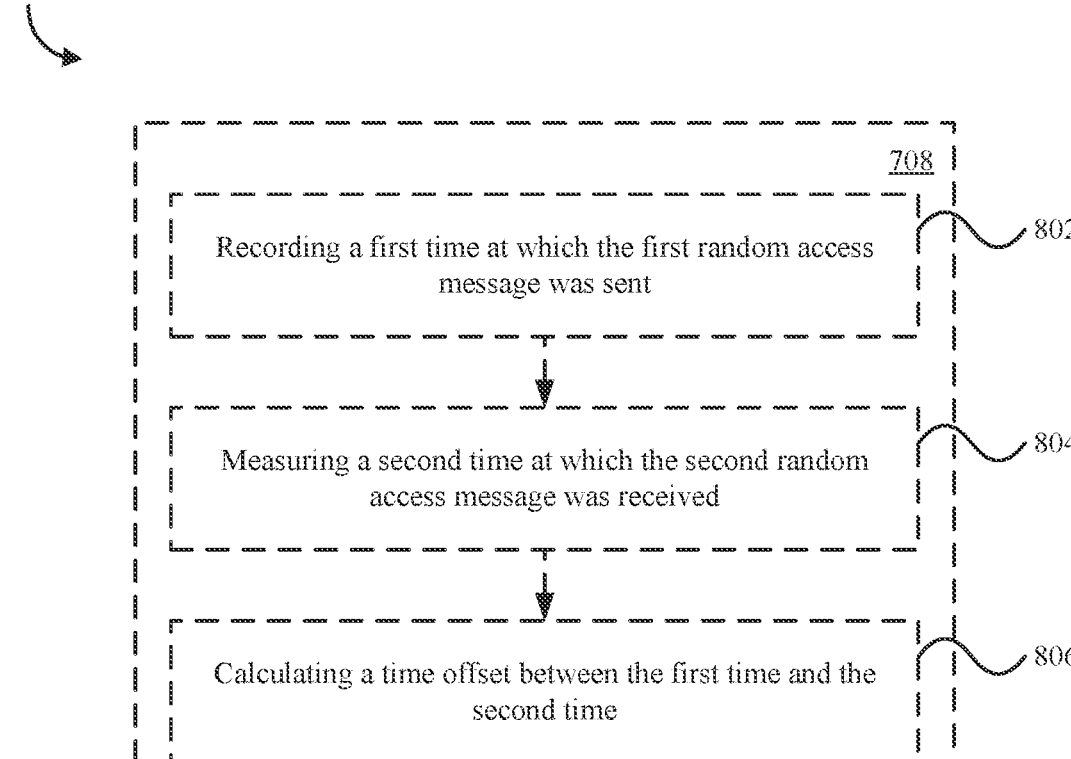
FIG. 23 is a flowchart of additional or optional steps for the method of wireless communication at the UE in accordance with various aspects of the present disclosure.

Referring to FIGS. 22-23, in operation, a UE 104 may perform a method 701 of wireless communication. The method 701 may be performed by the UE 104 (which may include the memory 360 and which may be the entire UE 104 and/or one or more components of the UE 104 such as the UE Msg3 repetition component 198, the TX processor 368, the RX processor 356, and/or the controller/processor 359). The method 701 may be performed by the UE Msg3 repetition component 198 in communication with the base station 102, FIG. 22 is a flowchart of a method of wireless communication at a UE 104, in accordance with various aspects of the present disclosure. FIG. 23 is a flowchart of additional or optional steps for the method of wireless communication at the UE 104, in accordance with various aspects of the present disclosure.

At block 702 of FIG. 22, the method 701 includes receiving, from a base station, system information comprising a RAR configuration, the RAR configuration indicating a plurality of intervals of a RAR window which indicates a time period during which a second random access message is to be received, and each interval of the plurality of intervals corresponding to a distinct transmission configuration of a third random access message. For example, in an aspect, the UE 104, the UE Msg3 repetition component 198, and/or the receiving component 610 may be configured to or may comprise means for receiving, from the base station 102, system information comprising a RAR configuration, the RAR configuration indicating a plurality of intervals of a RAR window 425, the RAR window 425 indicating a time period during which a second random access message is to be received, and each interval of the plurality of intervals corresponding to a distinct transmission configuration of a third random access message.

For example, the receiving at block 702 may include receiving a MIB over a PBCH that has been broadcasted by the base station 102. Alternatively or additionally, the receiving at block 702 may include receiving Sills (e.g., SIB1, SIB2, SIB3, SIB4, and the like) over a PDCCH and/or a PDSCH that have been broadcasted by the base station 102. In some aspects, the system information received at block 702 may comprise the RAR configuration. For example, a RMSI, (such as SIB1) may comprise the RAR configuration.

In other optional or additional aspects, the RAR configuration may indicate a time period tR of a RAR window 425. The RAR window 425 may refer to a time span (e.g., tR) during which the UE 104 may receive the RAR message (e.g., Msg2). Alternatively or additionally, the RAR window 425 may be configured to start after a predetermined time gap tG from the transmission of the first random access message 411 (e.g., Msg1) has elapsed. In some aspects, the time gap tG may be predefined by one or more regulations and/or standards (e.g., 3GPP). For example, the time gap tG may be defined as a value equivalent to the time duration of three (3) subframes. That is, the RAR configuration may indicate a time duration during which the UE 104 is to monitor a physical channel (e.g., PDCCH and/or a PDSCH) for the RAR message.

In other optional or additional aspects, the RAR configuration may indicate a plurality of intervals (e.g., time segments) of the RAR window 425. That is, the RAR window 425 may be divided into the plurality of intervals as indicated by the RAR configuration. Each interval of the plurality of intervals may correspond to a distinct transmission configuration of the random access message 3 (e.g., Msg3).

In other optional or additional aspects, the system information may comprise Msg3 transmission configurations corresponding with the plurality of intervals of the RAR window 425.

In other optional or additional aspects, each of the Msg3 transmission configurations that correspond to the plurality of intervals of the RAR window 425 may be distinct (e.g., different) from the remaining Msg3 transmission configurations. That is, each interval of the plurality of intervals may correspond to and/or implicitly indicate a distinct Msg3 transmission configuration.

In other optional or additional aspects, the Msg3 transmission configuration may comprise an indicator indicating a quantity of Msg3 transmission repetitions to be sent by the UE 104. That is, the Msg3 transmission configuration may instruct the UE 104 to send the indicated quantity of Msg3 transmission repetitions during the RACH procedure. For example, if or when the Msg3 transmission configuration indicates a value of four (4) as the quantity of Msg3 transmission repetitions to be sent by the UE 104, the UE

104 may be configured to transmit a total of five (5) third random access messages (e.g., Msg3), during the RACH procedure (e.g., first transmission plus four repetitions). For another example, if or when the Msg3 transmission configuration indicates a value of zero (0) as the quantity of Msg3 transmission repetitions to be sent by the UE 104, the UE 104 may be configured to transmit a total of one (1) third random access message (e.g., Msg3), during the RACH procedure (i.e., no repetitions).

In other optional or additional aspects, the Msg3 transmission configuration may comprise an indicator indicating a quantity of Msg3 transmissions to be sent by the UE 104. That is, the Msg3 transmission configuration may instruct the UE 104 to send the indicated quantity of Msg3 transmissions during the RACH procedure. For example, if or when the Msg3 transmission configuration indicates a value of four (4) as the quantity of Msg3 transmissions to be sent by the UE 104, the UE 104 may be configured to transmit a total of four (4) third random access messages (e.g., Msg3), during the RACH procedure (e.g., first transmission plus three repetitions). For another example, if or when the Msg3 transmission configuration indicates a value of one (1) as the quantity of Msg3 transmissions to be sent by the UE 104, the UE 104 may be configured to transmit a total of one (1) third random access message (e.g., Msg3), during the RACH procedure (i.e., no repetitions).

In other optional or additional aspects, the system information may indicate resources (e.g., time-based, frequency-based, or both) for the transmission of the Msg3 repetitions. For example, the RAR configuration may indicate one or more resources reserved for the transmission of the Msg3 repetitions. In another example, the RAR configuration may comprise one or more rule parameters to configure a predefined rule used by the UE 104 to determine the resources for transmitting the Msg3 repetitions.

In other optional or additional aspects, the Msg3 transmission configuration may comprise an indication of whether the Msg3 is to be sent using frequency hopping, such as intra-slot frequency hopping and/or inter-slot frequency hopping. That is, the Msg3 transmission configuration may configure the UE 104 to perform intra-slot frequency hopping and/or inter-slot frequency hopping when performing the Msg3 transmission repetitions. In such aspects, the RAR configuration may comprise parameters, such as frequency offsets, for configuration of the frequency hopping.

Further, fir example, the receiving at block 702 may be performed to obtain system information for configuration of the Msg3 transmission repetitions via timing of the Msg2 transmission.

At block 704 of FIG. 22, the method 701 includes sending, to the base station, a first random access message requesting to initiate a random access procedure. For example, in an aspect, the UE 104, the UE Msg3 repetition component 198, and/or the sending component 615 may be configured to or may comprise means for sending, to the base station 102, a first random access message requesting to initiate a random access procedure.

For example, the sending at block 704 may include sending the first random access message (e.g., Msg1) in response to a RACH trigger event. In some aspects, the RACH trigger event may comprise at least one of the following events: (i) the UE 104 performing an initial access to transition from an RRC_IDLE state to RRC_CONNECTED ACTIVE state; (ii) the UE 104 detecting downlink data arrival while in an RRC_IDLE state or RRC_CONNECTED INACTIVE state; (iii) the UE 104 determining uplink data arrival from higher layers during RRC_IDLE state or RRC_CONNECTED INACTIVE state; (iv) the UE 104 performing a handover from another base station to the base station 102 during the connected mode of operation; and (v) the UE performing a connection re-establishment procedure such as a beam failure recovery procedure.

In some aspects, the sending at block 704 may include sending, to the base station 102, the first random access message (e.g., Msg1) comprising capability information of the UE 104 indicating that the UE 104 is capable of sending the third random access message (e.g., Msg3) one or more times according to the RAR configuration. Alternatively or additionally, the sending at block 704 may include sending, to the base station 102, the first random access message (e.g., Msg1) comprising a request to send the third random access (e.g., Msg3) one or more times message according to the RAR configuration.

In other optional or additional aspects, the sending at block 704 may include sending, to the base station 102 via a PRACH, the first random access message (e.g., Msg1) comprising a RNTI corresponding to the UE 104.

Further, for example, the sending at block 704 may be performed to initiate the random access procedure. Alternatively or additionally, the sending at block 704 may be performed to indicate to the base station 102 that the UE 104 is capable of and/or is requesting the transmission of Msg3 repetitions.

At block 706 of FIG. 22, the method 701 includes receiving, from the base station in response to sending the first random access message, the second random access message during the RAR window. For example, in an aspect, the UE 104, the UE Msg3 repetition component 198, and/or the receiving component 610 may be configured to or may comprise means for receiving, from the base station 102 in response to sending the first random access message, the second random access message during the RAR window 425.

For example, the receiving at block 706 may include monitoring a physical channel (e.g., PDCCH, PDSCH) for reception of the second random access message Msg2) during the RAR window 425 and according to the RAR configuration. For example, the UE 104 may start to monitor the physical channel after the predetermined time gap tG has elapsed (i.e., after sending the first random access message 411 (e.g., Msg1) at block 704). The UE 104 may continue to monitor the physical channel during the time period tR of the RAR window 425 until the UE 104 receives the second random access message 421 (e.g., Msg2) and/or the RAR window 425 elapses (e.g., time period tR).

In some aspects, the receiving at block 706 may include re-sending the first random access message 411. (e.g., Msg1) if or when the UE 104 does not receive the second random access message 421 (e.g., Msg2) by the time that the RAR window 425 elapses.

In other optional or additional aspects, the second random access message (e.g., Msg2), which may be referred to as a RAR message, may be transmitted over a PDCCH and/or a PDSCH. In some aspects, the Msg2 may include one or more of a detected preamble ID, a TA value, a TC-RNTI, a backoff indicator, an uplink grant, and a downlink grant.

In some aspects, the Msg2 may be transmitted during a interval of the plurality of intervals of the RAR window 425. The interval may correspond to a distinct Msg3 transmission configuration. That is, the timing of the Msg2 transmission may indirectly indicate a Msg3 transmission configuration to the UE 104.

Further, for example, the receiving at block 706 may be performed to acknowledge reception of the random access request (e.g., Msg1) by the base station 102. Further, the timing of the receiving Msg2 transmission may indirectly indicate a Msg3 transmission configuration to the UE 104. As such, the UE 104 may be configured to send the Msg3 one or more times without adding configuration data to the Msg2 contents. Thus, aspects presented herein may improve reliability of the RACH procedure and facilitate access to the wireless communication system when compared to a conventional wireless communication system.

At block 708 of FIG. 22, the method 701 includes determining a interval of the plurality of intervals of the RAR window according to timing information of the second random access message comprising at least one of a time at which the second random access message was received and PDCCH scheduling of the second random access message. For example, in an aspect, the UE 104, the UE Msg3 repetition component 198, and/or the determining component 621 may be configured to or may comprise means for determining a interval of the plurality of intervals of the RAR window 425 according to timing information of the second random access message comprising at least one of a time at which the second random access message was received and PDCCH scheduling of the second random access message.

For example, the determining at block 708 may include determining the interval of the plurality of intervals of the RAR window 425 that has a time segment corresponding to the time at which the second random access message Msg2) was received. For example, the Msg2 may have been received during a first time segment of a first interval of the plurality of intervals. In such an example, the determining at block 708 may include determining the first interval as the interval. In another example, the Msg2 may have been received during a second time segment of a second interval of the plurality of intervals. In such an example, the determining at block 708 may include determining the second interval as the interval. In yet another example, the Msg2 may have been received during a third time segment of a third interval of the plurality of intervals. In such an example, the determining at block 708 may include determining the third interval as the interval.

In some aspects, the determining at block 708 may include accessing the Msg3 transmission configuration that corresponds to the interval.

In other optional or additional aspects, the determining at block 708 may include determining the interval of the plurality of intervals of the RAR window 425 according to PDCCH scheduling of the second random access message (e.g., Msg2). For example, the Msg2 may be transmitted via a PDCCH according to the PDCCH scheduling. In such an example, the UE 104 may determine the interval based on the scheduled transmission of the Msg2 according to the PDCCH scheduling.

Further, for example, the determining at block 708 may be performed to determine the Msg3 transmission configuration that is indirectly indicated by the timing of the Msg2 transmission. As such, the UE 104 may be configured to send the Msg3 one or more times according to a configuration without adding configuration data to the Msg2 contents. Thus, aspects presented herein may improve reliability of the RACH procedure and facilitate access to the wireless communication system when compared to a conventional wireless communication system.

At block 711 of FIG. 22, the method 701 includes sending one or more times, to the base station, the third random access message according to the distinct transmission configuration corresponding to the interval. For example, in an aspect, the UE 104, the UE Msg3 repetition component 198, and/or the sending component 615 may be configured to or may comprise means for sending one or more times, to the base station 102, the third random access message according to the distinct transmission configuration corresponding to the interval.

For example, the sending at block 711 may include sending, in response to receiving the Msg2, the third random access message Msg3) according to the distinct transmission configuration corresponding to the interval. The sending at block 711 may further include sending a first Msg3 (e.g., repetition 0) and up to N repetitions of the Msg3 as indicated by the Msg3 transmission configuration indirectly indicated by the timing of the Msg2 transmission. That is, the sending at block 711 may include sending the Msg3 repetitions according to the Msg3 transmission configuration that corresponds to the interval in which the Msg2 was transmitted.

In some aspects, the sending at block 711 may include sending the Msg3 repetitions using resources indicated by the RAR configuration broadcasted by the base station 102. In other optional or additional aspects, the Msg3 may comprise an RRC connection request or a scheduling request, via a physical uplink channel such as PUSCH based on the RAR uplink grant provided in Msg2 of the base station 102. In other optional or additional aspects, the sending at block 711 may include sending the Msg3 transmission repetitions using different frequencies if or when the Msg3 transmission configuration indicates that the Msg3 repetitions are to be sent using frequency hopping, such as intra-slot frequency hopping and/or inter-slot frequency hopping.

Further, for example, the sending at block 711 may be performed to potentially enhance reception of the Msg3 by the base station 102 if or when channel conditions result in poor reception of the Msg3 by the base station 102. Channel conditions that may result in poor reception of the Msg3 may include relatively low receive power at the base station 102, use of millimeter wave band frequencies, obstructed line of sight, and/or interference, Thus, aspects presented herein may improve reliability of the RACH procedure and facilitate access to the wireless communication system when compared to a conventional wireless communication system.

Referring to FIG. 23, in an optional or additional aspect that may be combined with any other aspect, at block 802, the determining at block 708 of determining a interval of the plurality of intervals of the RAR window according to timing information of the second random access message comprising at least one of a time at which the second random access message was received and PDCCH scheduling of the second random access message may include recording a first time at which the first random access message was sent. For example, in an aspect, the UE 104, the UE Msg3 repetition component 198, and/or the recording component 626 may be configured to or may comprise means for increasing the uplink transmit power by the predetermined amount.

For example, the recording at block 802 may include storing a first timestamp indicating a time during which the first random access message (e.g., Msg1) was sent. Alternatively or additionally, the recording at block 802 may include storing a second timestamp indicating a start of the RAR window 425. In some aspects, the RAR window 425 may start a predetermined amount of time after the first random access message (e.g., Msg1) is sent.

In this optional or additional aspect, at block 804, the determining at block 708 of determining a interval of the plurality of intervals of the RAR window according to timing information of the second random access message comprising at least one of a time at which the second random access message was received and PDCCH scheduling of the second random access message may include measuring a second time at which the second random access message was received. For example, in an aspect, the UE 104, the UE Msg3 repetition component 198, and/or the measuring component 631 may be configured to or may comprise means for measuring a second time at which the second random access message was received.

For example, the measuring at block 804 may include storing a timestamp indicating a time during which the second random access message (e.g., Msg2) was received.

In this optional or additional aspect, at block 806, the determining at block 708 of determining a interval of the plurality of intervals of the RAR window according to timing information of the second random access message comprising at least one of a time at which the second random access message was received and PDCCH scheduling of the second random access message may include calculating a time offset between the first time and the second time. For example, in an aspect, the UE 104, the UE Msg3 repetition component 198, and/or the calculating component 636 may be configured to or may comprise means for calculating the time offset between the first time and the second time.

For example, the calculating at block 806 may include determining a time difference between the first timestamp indicating when the Msg1 was sent and the second timestamp indicating when the Msg2 was received. Alternatively or additionally, the calculating at block 806 may include determining a time difference between the first timestamp indicating the start of the RAR window 425 and the second timestamp indicating when the Msg2 was received.

In this optional or additional aspect, at block 808, the determining at block 708 of determining a interval of the plurality of intervals of the RAR window according to timing information of the second random access message comprising at least one of a time at which the second random access message was received and PDCCH scheduling of the second random access message may include determining, according to the time offset, the interval of the plurality of intervals of the RAR window. For example, in an aspect, the UE 104, the UE Msg3 repetition component 198, and/or the determining component 621 may be configured to or may comprise means for determining, according to the time offset, the interval of the plurality of intervals of the RAR window 425.

Figure 24:
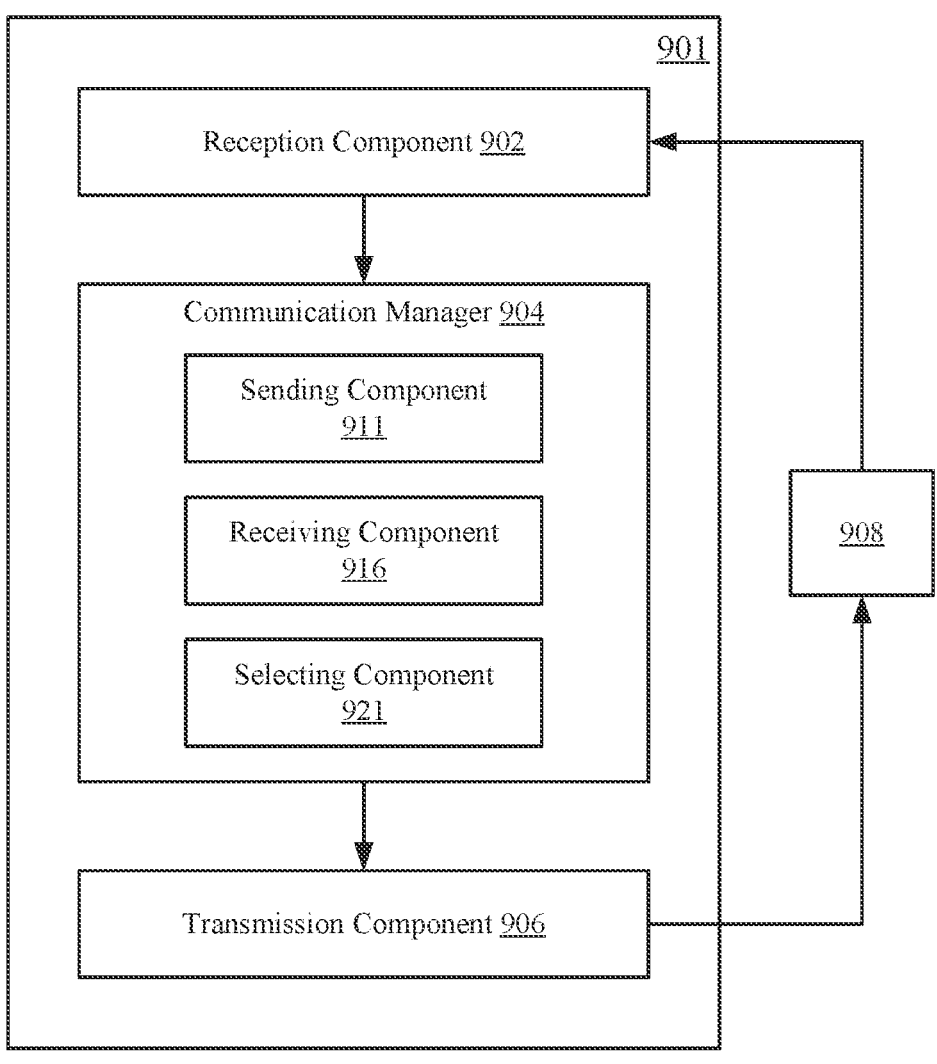
FIG. 24 is a diagram illustrating an example apparatus, such as a base station, for wireless communication, in accordance with various aspects of the present disclosure.

FIG. 24 is a diagram illustrating an example apparatus 901, such as a base station, for wireless communication, FIG. 22 is a flowchart of a method of wireless communication at a UE, in accordance with various aspects of the present disclosure. The apparatus 901 may be a base station 102 (e.g., base station 102 of FIGS. 16 and 18-20) or a base station 102 may include the apparatus 901. In some aspects, the apparatus 901 may include a reception component 902 configured to receive wireless communications from another apparatus (e.g., apparatus 908), a communication manager 904 configured to perform Msg3 transmission repetitions via Msg2 timing, a transmission component 906 configured to transmit wireless communications to another apparatus (e.g., apparatus 908), and which may be in communication with one another (e.g., via one or more buses or electrical connections). As shown, the apparatus 901 may be in communication with another apparatus 908 (such as a UE 104, or another wireless communication device) using the reception component 902 and the transmission component 906.

In some aspects, the apparatus 901 may be configured to perform one or more operations described herein in connection with FIGS. 16 and 18-20. Alternatively or additionally, the apparatus 901 may be configured to perform one or more processes described herein, such as method 1001 of FIG. 25. In some aspects, the apparatus 901 may include one or more components of the base station 102 described above in connection with FIGS. 16 and 18-20.

The reception component 902 may receive communications, such as reference signals, control information, data communications, or a combination thereof, from the apparatus 908. The reception component 902 may provide received communications to one or more other components of the apparatus 901, such as the communication manager 904. In some aspects, the reception component 902 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the base station 102 described above in connection with FIGS. 16 and 18-20.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In other aspects, the transmission component 906 may include one or more antennas, a modulator, a transmit MIMO processor, a transmit processor, a controller/processor, a memory, or a combination thereof, of the base station 102 described above in connection with FIGS. 16 and 18-20. In some aspects, the transmission component 906 may be co-located with the reception component 902 in a transceiver or transceiver component.

The communication manager 904 may send system information comprising a RAR configuration. The communication manager 904 may receive a first random access message (e.g., Msg1) requesting to initiate a random access procedure. The communication manager 904 may select a interval of the plurality of intervals of the RAR window 425 according to PDCCH scheduling of the second random access message. The communication manager 904 may send a second random access message (e.g., Msg2) during the interval. The communication manager 904 may receive at least one third random access message of a plurality of third random access messages (e.g., Msg3) sent by the UE according to the distinct transmission configuration corresponding to the interval.

In some aspects, the communication manager 904 may receive the first random access message comprising capability information of the UE indicating that the UE is capable of sending the third random access message (e.g., Msg3) one or more times according to the RAR configuration. In other optional or additional aspects, the communication manager 904 may receive the first random access message (e.g., Msg1) comprising a request to send the third random access message (e.g., Msg3) one or more times according to the RAR configuration. In other optional or additional aspects, the communication manager 904 may receive, from the UE via a PRACH, the first random access message (e.g., Msg1) comprising a RNTI corresponding to the UE 104. In other optional or additional aspects, the communication manager 904 may send, to the UE 104 via a PDCCH, the second random access message (e.g., Msg2). In other optional or additional aspects, the communication manager 904 may receive, via a PUSCH, the at least one third random access message of the plurality of third random access messages (e.g., Msg3) according to the distinct transmission configuration corresponding to the interval.

In other optional or additional aspects, the communication manager 904 may comprise the TX processor 316, the RX processor 370, the controller/processor 375, the memory 376, or a combination thereof, of the base station 102 described above in connection with FIGS. 16 and 18-20.

In some aspects, the communication manager 904 may include a set of components, such as a sending component 911 configured to send system information comprising a RAR configuration and to send the second random access message (e.g., Msg2) during the interval, a receiving component 916 configured receive to a first random access message (e.g., Msg1) requesting to initiate a random access procedure and to receive or more third random access messages (e.g., Msg3) according to the distinct transmission configuration corresponding to the interval, and a selecting component 921 configured to select a interval of the plurality of intervals of the RAR window 425 according to PDCCH scheduling of the second random access message.

Alternatively or additionally, the set of components may be separate and distinct from the communication manager 904. In other aspects, one or more components of the set of components may include or may be implemented within a controller/processor (e.g., the TX processor 316, the RX processor 370, the controller/processor 375), a memory (e.g., the memory 376), or a combination thereof, of the base station 102 described in FIGS. 16 and 18-20. Alternatively or additionally, one or more components of the set of components may be implemented at least in part as software stored in a memory, such as the memory 376. For example, a component (or a portion of a component) may be implemented as computer-executable instructions or code stored in a non-transitory computer-readable medium and executable by a controller or a processor to perform the functions or operations of the component.

The number and arrangement of components shown in FIG. 24 are provided as an example. In practice, there may be additional components, fewer components, different components, or differently arranged components than those shown in FIG. 24. Furthermore, two or more components shown in FIG. 24 may be implemented within a single component, or a single component shown in FIG. 24 may be implemented as multiple, distributed components, Additionally or alternatively, a set of (one or more) components shown in FIG. 24 may perform one or more functions described as being performed by another set of components shown in FIGS. 16 and 18-20.

FIG. 25 is a flowchart of a method of wireless communication at a base station, in accordance with various aspects of the present disclosure, Referring to FIG. 25, in operation, a base station 102 may perform a method 1001 of wireless communication. The method 1001 may be performed by the base station 102 (which may include the memory 376 and which may be the entire base station 102 and/or one or more components of the base station 102 such as the BS Msg3 repetition component 188, the TX processor 316, the RX processor 370, and/or the controller/processor 375). The method 1001 may be performed by the BS Msg3 repetition component 188 in communication with the UE 104.

At block 1002 of FIG. 25, the method 1001 includes sending, to a UE, system information comprising a RAR configuration, the RAR configuration indicating a plurality of intervals of a RAR window which indicates a time period during which a second random access message is to be received, and each interval of the plurality of intervals corresponding to a distinct transmission configuration of a third random access message. For example, in an aspect, the base station 102, the BS Msg3 repetition component 188, and/or the sending component 911 may be configured to or may comprise means for sending, to the UE 104, the system information comprising the RAR configuration, the RAR configuration indicating the plurality of intervals of the RAR window 425 which indicates the time period during which the second random access message is to be received, and each interval of the plurality of intervals corresponding to a distinct transmission configuration of the third random access message.

For example, the sending at block 1002 may include broadcasting a MIB over a PBCH. Alternatively or additionally, the sending at block 1002 may include broadcasting SIBs (e.g., SIB1, SIB2, SIB3, SIB4, and the like) over a PDCCH and/or a PDSCH, in some aspects, the system information sent at block 1002 may comprise the RAR configuration. For example, a RMSI, (such as SIB1) may comprise the RAR configuration.

In other optional or additional aspects, the RAR configuration may indicate a time duration of a RAR window 425. The RAR window 425 may refer to a time span during which the base station 102 may transmit the RAR message (e.g., Msg2). That is, the RAR configuration may indicate a time duration during which the UE 104 is to monitor a physical channel (e.g., PDCCH and/or a PDSCH) for the RAR message.

In other optional or additional aspects, the RAR configuration may indicate a plurality of intervals (e.g., time segments) of the RAR window 425. That is, the RAR window 425 may be divided into the plurality of intervals as indicated by the RAR configuration. Each interval of the plurality of intervals may correspond to a distinct transmission configuration of the random access message 3 (e.g., Msg3).

In other optional or additional aspects, the system information may comprise Msg3 transmission configurations corresponding with the plurality of intervals of the RAR window 425.

In other optional or additional aspects, each of the Msg3 transmission configurations that correspond to the plurality of intervals of the RAR window 425 may be distinct (e.g., different) from the remaining Msg3 transmission configurations. That is, each interval of the plurality of intervals may correspond to and/or implicitly indicate a distinct Msg3 transmission configuration.

In other optional or additional aspects, the Msg3 transmission configuration may comprise an indicator indicating a quantity of Msg3 transmission repetitions to be sent by the UE 104. That is, the Msg3 transmission configuration may instruct the UE 104 to send the indicated quantity of Msg3 transmission repetitions during the RACH procedure. For example, if or when the Msg3 transmission configuration indicates a value of four (4) as the quantity of Msg3 transmission repetitions to be sent by the UE 104, the UE 104 may be configured to transmit a total of five (5) third random access messages (e.g., Msg3), during the RACH procedure (e.g., first transmission plus four repetitions). For another example, if or when the Msg3 transmission configuration indicates a value of zero (0) as the quantity of Msg3 transmission repetitions to be sent by the UE 104, the UE 104 may be configured to transmit a total of one (1) third random access message (e.g., Msg3), during the RACH procedure (i.e., no repetitions).

In other optional or additional aspects, the Msg3 transmission configuration may comprise an indicator indicating a quantity of Msg3 transmissions to be sent by the UE 104. That is, the Msg3 transmission configuration may instruct the UE 104 to send the indicated quantity of Msg3 transmissions during the RACH procedure. For example, if or when the Msg3 transmission configuration indicates a value of four (4) as the quantity of Msg3 transmissions to be sent by the UE 104, the UE 104 may be configured to transmit a total of four (4) third random access messages (e.g., Msg3), during the RACH procedure (e.g., first transmission plus three repetitions). For another example, if or when the Msg3 transmission configuration indicates a value of one (1) as the quantity of Msg3 transmissions to be sent by the UE 104, the UE 104 may be configured to transmit a total of one (1) third random access message (e.g., Msg3), during the RACH procedure (i.e., no repetitions).

In other optional or additional aspects, the system information may indicate resources (e.g., time-based, frequency-based, or both) for the transmission of the Msg3 repetitions. For example, the RAR configuration may indicate one or more resources reserved for the transmission of the Msg3 repetitions. In another example, the RAR configuration may comprise one or more rule parameters to configure a predefined rule used by the UE 104 to determine the resources for transmitting the Msg3 repetitions.

In other optional or additional aspects, the Msg3 transmission configuration may comprise an indication of whether the Msg3 is to be sent using frequency hopping, such as intra-slot frequency hopping and/or inter-slot frequency hopping. That is, the Msg3 transmission configuration may configure the UE 104 to perform intra-slot frequency hopping and/or inter-slot frequency hopping when performing the Msg3 transmission repetitions. In such aspects, the RAR configuration may comprise parameters, such as frequency offsets, for configuration of the frequency hopping.

Further, for example, the sending at block 1002 may be performed to provide system information to the UE 104 for configuration of the Msg3 transmission repetitions via timing of the Msg2 transmission.

At block 1004 of FIG. 25, the method 1001 includes receiving, from the UE, a first random access message requesting to initiate a random access procedure. For example, in an aspect, the base station 102, the BS Msg3 repetition component 188, and/or the receiving component 916 may be configured to or may comprise means for receiving, from the UE 104, the first random access message requesting to initiate the random access procedure.

For example, the receiving at block 1004 may include receiving, from the UE 104, the first random access message (e.g., Msg1) comprising capability information of the UE 104 indicating that the UE 104 is capable of sending the third random access message (e.g., Msg3) one or more times according to the RAR configuration. Alternatively or additionally, the receiving at block 1004 may include receiving, from the UE 104, the first random access message (e.g., Msg1) comprising a request to send the third random access e.g., Msg3) one or more times message according to the RAR configuration.

In other optional or additional aspects, the receiving at block 1004 may include receiving, from the UE 104 via a PRACH, the first random access message (e.g., Msg1) comprising a RNTI corresponding to the UE 104.

Further, for example, the receiving at block 1004 may be performed to initiate the random access procedure. Alternatively or additionally, the receiving at block 1004 may be performed to indicate to the base station 102 that the UE 104 is capable of and/or is requesting the transmission of Msg3 repetitions.

At block 1006 of FIG. 25, the method 1001 includes selecting a interval of the plurality of intervals of the RAR window according to PDCCH scheduling of the second random access message. For example, in an aspect, the base station 102, the BS Msg3 repetition component 188, and/or the selecting component 921 may be configured to or may comprise means for selecting a interval of the plurality of intervals of the RAR window 425 according to PDCCH scheduling of the second random access message.

For example, the selecting at block 1006 may include selecting the interval based on the preamble sequence of the Msg1. In some aspects, the selecting at block 1006 may include selecting the interval based on PDCCH scheduling of the second random access message (Msg2). Alternatively or additionally, the base station 102 may select the interval in response to the Msg1 comprising an indication that the UE 104 is capable of sending the Msg3 one or more times according to the RAR configuration and/or in response to the Msg1 comprising a request to send the Msg3 one or more times according to the RAR configuration.

Further, for example, the selecting at block 1006 may be performed to determine a Msg3 transmission configuration that is indirectly indicated by the timing of the Msg2 transmission. As such, the UE 104 may be configured to send the Msg3 one or more times according to a configuration without adding configuration data to the Msg2 contents. Thus; aspects presented herein may improve reliability of the RACH procedure and facilitate access to the wireless communication system when compared to a conventional wireless communication system.

At block 1008 of FIG. 25, the method 1001 includes sending, to the UE in response to receiving the first random access message, the second random access message during the interval. For example, in an aspect, the base station 102, the BS Msg3 repetition component 188, and/or the sending component 911 may be configured to or may comprise means for sending; to the UE 104 in response to receiving the first random access message, the second random access message during the interval.

For example, the sending at block 1008 may include sending the second random access message (e.g., Msg2), which may be referred to as a RAR message, over a PDCCH and/or a PDSCH. In some aspects, the Msg2 may include one or more of a detected preamble ID, a TA value, a TC-RNTI, a backoff indicator, an uplink grant, and a downlink grant.

In other optional or additional aspects, the Msg2 may be transmitted during a interval of the plurality of intervals of the RAR window 425. The interval may correspond to a distinct Msg3 transmission configuration. That is, the timing of the Msg2 transmission may indirectly indicate a Msg3 transmission configuration to the UE 104.

For example, a first interval may correspond to a first transmission configuration, a second interval may correspond to a second transmission configuration, and a third interval may correspond to a third transmission configuration. As such, the base station 102 may implicitly indicate to the UE 104 to transmit the random access message 3 (e.g., Msg3) using the first transmission configuration by transmitting the RAR (e.g., Msg2) during a first time segment of the first interval. Alternatively or additionally, the base station 102 may implicitly indicate to the UE 104 to transmit the random access message 3 (e.g., Msg3) using the second transmission configuration by transmitting the RAR Msg2) during a second time segment of the second interval. Alternatively or additionally, the base station 102 may implicitly indicate to the UE 104 to transmit the random access message 3 (e.g., Msg3) using the third transmission configuration by transmitting the RAR Msg2) during a third time segment of the third interval.

Further, for example, the sending at block 1008 may be performed to acknowledge reception of the random access request (e.g., Msg1) by the base station 102. Further, the timing of the receiving Msg2 transmission may indirectly indicate a Msg3 transmission configuration to the UE 104. As such, the UE 104 may be configured to send the Msg3 one or more times without adding configuration data to the Msg2 contents. Thus, aspects presented herein may improve reliability of the RACH procedure and facilitate access to the wireless communication system when compared to a conventional wireless communication system.

At block 1010 of FIG. 25, the method 1001 includes receiving, from the UE, at least one third random access message of a plurality, of third random access messages sent by the UE according to the distinct transmission configuration corresponding to the interval. For example, in an aspect, the base station 102, the BS Msg3 repetition component 188, and/or the receiving component 916 may be configured to or may comprise means for receiving, from the UE 104, at least one third random access message of a plurality of third random access messages sent by the UE according to the distinct transmission configuration corresponding to the interval.

For example, the receiving at block 1010 may include receiving, in response to sending the Msg2, at least one third random access message of a plurality of third random access messages (e.g., Msg3) sent by the UE according to the distinct transmission configuration corresponding to the interval. The receiving at block 1010 may further include receiving a first Msg3 (e.g., repetition 0) and up to N repetitions of the Msg3 as indicated by the Msg3 transmission configuration indirectly indicated by the timing of the Msg2 transmission. That is, the receiving at block 1010 may include receiving the one or more Msg3 according to the Msg3 transmission configuration that corresponds to the interval in which the Msg2 was transmitted.

In some aspects, the receiving at block 1010 may include receiving the Msg3 repetitions using resources indicated by the RAR configuration. In other optional or additional aspects, the Msg3 may comprise an RRC connection request or a scheduling request, via a physical uplink channel such as PUSCH based on the RAR uplink grant provided in Msg2 of the base station 102. In other optional or additional aspects, the receiving at block 1010 may include receiving the one or more Msg3 using different frequencies if or when the Msg3 transmission configuration indicates that the Msg3 repetitions are to be sent using frequency hopping, such as intra-slot frequency hopping and/or inter-slot frequency hopping.

Further, for example, the receiving at block 1010 may be performed to potentially enhance reception of the Msg3 by the base station 102 if or when channel conditions result in poor reception of the Msg3 by the base station 102. Channel conditions that may result in poor reception of the Msg3 may include relatively low receive power at the base station 102, use of millimeter wave band frequencies, obstructed line of sight, and/or interference. Thus, aspects presented herein may improve reliability of the RACH procedure and facilitate access to the wireless communication system when compared to a conventional wireless communication system.

The following provides an overview of aspects of the present disclosure:

Aspect 1: A method for wireless communications at a UE, including: transmitting a random access request to establish a connection with a base station; receiving, from the base station, a RAR including control signaling associated with one or more transmission parameters, wherein a first transmission parameter of the one or more transmission parameters maps to a repetition parameter associated with an uplink message; and transmitting one or more repetitions of the uplink message according to the repetition parameter.

Aspect 2: The method of aspect 1, further comprising: receiving, from the base station, a SIB identifying a mapping between the first transmission parameter and the repetition parameter, wherein the one or more repetitions of the uplink message are transmitted based at least in part on the received SIB.

Aspect 3: The method of any of aspects 1 through 2, further comprising: detecting a control channel element in the received RAR, wherein the first transmission parameter includes a location of the detected control channel element in a CORESET of the RAR.

Aspect 4: The method of aspect 3, wherein the repetition parameter is based at least in part on an index of the detected control channel element.

Aspect 5: The method of any of aspects 1 through 4, further comprising: detecting an aggregation level associated with the received RAR, wherein the first transmission parameter includes the detected aggregation level.

Aspect 6: The method of any of aspects 1 through 5, further comprising: detecting a reference signal sequence associated with the received RAR, wherein the first transmission parameter includes the detected reference signal sequence.

Aspect 7: The method of any of aspects 1 through 6, Wherein transmitting the random access request comprises: transmitting, in the random access request, a capability indication, wherein the one or more transmission parameters associated with the received RAR are based at least in part on the transmitted capability indication.

Aspect 8: The method of any of aspects 1 through 7, wherein transmitting the random access request comprises: transmitting, in the random access request, a repetition request, wherein the one or more transmission parameters associated with the received RAR are based at least in part on the transmitted repetition request.

Aspect 9: The method of any of aspects 1 through 8, wherein a second transmission parameter associated with the received RAR maps to a second repetition parameter of the uplink message; and the one or more repetitions are transmitted according to the second repetition parameter.

Aspect 10: The method of any of aspects 1 through 9, wherein the repetition parameter comprises an indication of a presence of repetitions, a quantity of repetitions, an inter-slot frequency hopping pattern, an intra-slot frequency hopping pattern, a joint channel estimation configuration across the one or more repetitions, or any combination thereof.

Aspect 11: The method of any of aspects 1 through 10, wherein the received RAR includes a PDCCH.

Aspect 12: A method of wireless communication at a UE of a mobile network, including: receiving, from a base station, system information including a RAR configuration, the RAR configuration indicating a plurality of intervals of a RAR window which indicates a time period during which a second random access message is to be received, and each interval of the plurality of intervals corresponding to a distinct transmission configuration of a third random access message; sending, to the base station, a first random access message requesting to initiate a random access operation; receiving, from the base station in response to sending the first random access message, the second random access message during the RAR window; determining a interval of the plurality of intervals of the RAR window according to timing information of the second random access message including at least one of a time at which the second random access message was received and PDCCH scheduling of the second random access message; and sending one or more times, to the base station, the third random access message according to the distinct transmission configuration corresponding to the interval.

Aspect 13: The method of aspect 12, wherein the distinct transmission configuration comprises: an indicator indicating a quantity of third random access message transmission repetitions to be sent by the UE.

Aspect 14: The method of aspect 13, wherein a first distinct transmission configuration comprises: the indicator indicating a first quantity of the third random access message transmission repetitions to be sent by the UE, the first quantity being an integer greater than zero.

Aspect 15: The method of any of aspects 12 through 14, wherein the distinct transmission configuration comprises an indication of whether the third random access message is to be sent using inter-slot frequency-hopping; and receiving the second random access message comprises receiving, from the base station via the PDCCH, the second random access message.

Aspect 16: The method of any of aspects 12 through 15, wherein determining the interval of the plurality of intervals of the RAR window comprises: recording a first time at which the first random access message was sent; measuring a second time at which the second random access message was received; calculating a time offset between the first time and the second time; and determining, according to the time offset, the interval of the plurality of intervals of the RAR window.

Aspect 17: The method of any of aspects 12 through 16, wherein sending the first random access message comprises: sending, to the base station, the first random access message comprising capability information of the UE indicating that the UE is capable of sending the third random access message the one or more times according to the RAR configuration.

Aspect 18: The method of any of aspects 12 through 17, wherein sending the first random access message comprises: sending, to the base station, the first random access message comprising a request to send the third random access message the one or more times according to the RAR configuration.

Aspect 19: The method of any of aspects 12 through 18, wherein sending the first random access message comprises: sending, to the base station via a PRACH, the first random access message comprising a radio network temporary identifier (RNTI) corresponding to the UE.

Aspect 20: The method of any of aspects 12 through 19, wherein sending the third random access message comprises: sending, to the base station via an PUSCH, the third random access message according to the distinct transmission configuration corresponding to the interval.

Aspect 21: The method of any of aspects 12 through 20, wherein receiving the second random access message during the RAR window comprises: receiving, from the base station, the second random access message comprising information corresponding to the UE and at least one other device, the time at which the second random access message was received indirectly indicating, without increasing a data size of the second random access message, a transmission configuration of the third random access message.

Aspect 22: A method for wireless communications at a UE, comprising: transmitting a random access request to establish a connection with a base station; receiving, from the base station, a RAR including control signaling associated with one or more transmission parameters, wherein a first transmission parameter of the one or more transmission parameters maps to a repetition parameter associated with an uplink message; and transmitting one or more repetitions of the uplink message according to the repetition parameter.

Aspect 23: The method of aspect 22, further comprising: receiving, from the base station, a SIB identifying a mapping between the first transmission parameter and the repetition parameter, wherein the one or more repetitions of the uplink message are transmitted based at least in part on the received SIB.

Aspect 24: The method of any of aspects 22 through 23, further comprising: detecting a control channel element in the received RAR, wherein the first transmission parameter includes a location of the detected control channel element in a CORESET of the RAR.

Aspect 25: The method of aspect 24, wherein the repetition parameter is based at least in part on an index of the detected control channel element.

Aspect 26: The method of any of aspects 22 through 25, further comprising: detecting an aggregation level associated with the received RAR, wherein the first transmission parameter includes the detected aggregation level.

Aspect 27: The method of any of aspects 22 through 26, further comprising: detecting a reference signal sequence associated with the received RAR, wherein the first transmission parameter includes the detected reference signal sequence.

Aspect 28: The method of any of aspects 22 through 27, wherein transmitting the random access request comprises: transmitting, in the random access request, a capability indication, wherein the one or more transmission parameters associated with the received RAR are based at least in part on the transmitted capability indication.

Aspect 29: The method of any of aspects 22 through 28, wherein transmitting the random access request comprises: transmitting, in the random access request, a repetition request, wherein the one or more transmission parameters associated with the received RAR are based at least in part on the transmitted repetition request.

Aspect 30: The method of any of aspects 22 through 29, wherein a second transmission parameter associated with the received RAR maps to a second repetition parameter of the uplink message; and the one or more repetitions are transmitted according to the second repetition parameter.

Aspect 31: The method of any of aspects 22 through 30, wherein the repetition parameter comprises an indication of a presence of repetitions, a quantity of repetitions, an inter-slot frequency hopping pattern, an intra-slot frequency hopping pattern, a joint channel estimation configuration across the one or more repetitions, or any combination thereof.

Aspect 32: The method of any of aspects 22 through 31, wherein the received RAR includes a PDCCH.

Aspect 33: A method for wireless communications at a base station, comprising: receiving, from a UE, a random access request to establish a connection with the base station; transmitting, to the UE, a RAR including control signaling associated with one or more transmission parameters, wherein a first transmission parameter of the one or more transmission parameters maps to a repetition parameter associated with an uplink message; and monitoring for one or more repetitions of the uplink message according to the repetition parameter.

Aspect 34: The method of aspect 33, further comprising: transmitting a SIB identifying a mapping between the first transmission parameter and the repetition parameter, wherein the monitoring for the one or more repetitions of the uplink message is based at least in part on the transmitted SIB.

Aspect 35: The method of any of aspects 33 through 34, wherein transmitting the RAR comprises: transmitting a control channel element in the RAR, wherein the first transmission parameter includes a location of the transmitted control channel element in a CORESET of the RAR.

Aspect 36: The method of aspect 35, wherein the repetition parameter is based at least in part on an index of the transmitted control channel element.

Aspect 37: The method of any of aspects 33 through 36, wherein transmitting the RAR comprises: transmitting the RAR according to an aggregation level, wherein the first transmission parameter includes the aggregation level.

Aspect 38: The method of any of aspects 33 through 37, wherein transmitting the RAR comprises: transmitting a reference signal sequence associated with the transmitted RAR, wherein the first transmission parameter includes the transmitted reference signal sequence.

Aspect 39: The method of any of aspects 33 through 38, wherein receiving the random access request comprises: receiving, in the random access request, a capability indication, wherein the one or more transmission parameters associated with the transmitted RAR are based at least in part on the received capability indication.

Aspect 40: The method of any of aspects 33 through 39, wherein receiving the random access request comprises: receiving, in the random access request, a repetition request, wherein the one or more transmission parameters associated with the transmitted RAR are based at least in part on the received repetition request.

Aspect 41: The method of any of aspects 33 through 40, wherein a second transmission parameter associated with the transmitted RAR maps to a second repetition parameter of the uplink message; and the monitoring for the one or more repetitions of the uplink message is according to the second repetition parameter.

Aspect 42: The method of any of aspects 33 through 41, wherein the repetition parameter comprises an indication of a presence of repetitions, a quantity of repetitions, an inter-slot frequency hopping pattern, an intra-slot frequency hopping pattern, a joint channel estimation configuration across the one or more repetitions, or any combination thereof.

Aspect 43: The method of any of aspects 33 through 42, wherein the transmitted RAR includes a PDCCH.

Aspect 44: A method of wireless communication al a UE of a mobile network, comprising: receiving, from a base station, system information comprising a RAR configuration, the RAR configuration indicating a plurality of intervals of a RAR window which indicates a time period during which a second random access message is to be received, and each interval of the plurality of intervals corresponding to a distinct transmission configuration of a third random access message; sending, to the base station, a first random access message requesting to initiate a random access procedure; receiving, from the base station in response to sending the first random access message, the second random access message during the RAR window; determining a interval of the plurality of intervals of the RAR window according to timing information of the second random access message comprising at least one of a time at which the second random access message was received and PDCCH scheduling of the second random access message; and sending one or more times, to the base station, the third random access message according to the distinct transmission configuration corresponding to the interval.

Aspect 45: The method of aspect 44, wherein the distinct transmission configuration comprises: an indicator indicating a quantity of third random access message transmission repetitions to be sent by the UE.

Aspect 46: The method of aspect 45, wherein a first distinct transmission configuration comprises: the indicator indicating a first quantity of the third random access message transmission repetitions to be sent by the UE, the first quantity being an integer greater than zero.

Aspect 47: The method of any of aspects 44 through 46, wherein the distinct transmission configuration comprises: an indication of whether the third random access message is to be sent using inter-slot frequency-hopping.

Aspect 48: The method of any of aspects 44 through 47, wherein determining the interval of the plurality of intervals of the RAR window comprises: recording a first time at which the first random access message was sent; measuring a second time at which the second random access message was received; calculating a time offset between the first time and the second time; and determining, according to the time offset, the interval of the plurality of intervals of the RAR window.

Aspect 49: The method of any of aspects 44 through 48, wherein sending the first random access message comprises: sending, to the base station, the first random access message comprising capability information of the UE indicating that the UE is capable of sending the third random access message the one or more times according to the RAR configuration.

Aspect 50: The method of any of aspects 44 through 49, wherein sending the first random access message comprises: sending, to the base station, the first random access message comprising a request to send the third random access message the one or more times according to the RAR configuration.

Aspect 51: The method of any of aspects 44 through 50, wherein sending the first random access message comprises: sending, to the base station via a PRACH, the first random access message comprising a RNTI corresponding to the UE.

Aspect 52: The method of any of aspects 44 through 51, wherein receiving the second random access message comprises: receiving, from the base station via the PDCCH, the second random access message.

Aspect 53: The method of any of aspects 44 through 52, wherein sending the third random access message comprises: sending, to the base station via an PUSCH, the third random access message according to the distinct transmission configuration corresponding to the interval.

Aspect 54: The method of any of aspects 44 through 53, wherein receiving the second random access message during the RAR window comprises: receiving, from the base station, the second random access message comprising information corresponding to the UE and at least one other device, the time at which the second random access message was received indirectly indicating, without increasing a data size of the second random access message, a transmission configuration of the third random access message.

Aspect 55: A method of wireless communication at a base station of a mobile network, comprising: sending, to a UE, system information comprising a RAR configuration, the RAR configuration indicating a plurality of intervals of a RAR window which indicates a time period during which a second random access message is to be received, and each interval of the plurality of intervals corresponding to a distinct transmission configuration of a third random access message; receiving, from the UE, a first random access message requesting to initiate a random access procedure: selecting a interval of the plurality of intervals of the RAR window according to PDCCH scheduling of the second random access message; sending, to the UE in response to receiving the first random access message, the second random access message during the interval; and receiving, from the UE, at least one third random access message of a plurality of third random access messages sent by the UE according to the distinct transmission configuration corresponding to the interval.

Aspect 56: The method of aspect 55, wherein the distinct transmission configuration comprises: an indicator indicating a quantity of third random access message transmission repetitions to be sent by the UE.

Aspect 57: The method of aspect 56, wherein a first distinct transmission configuration comprises: the indicator indicating a first quantity of the third random access message transmission repetitions to be sent by the UE, the first quantity being an integer greater than zero.

Aspect 58: The method of any of aspects 55 through 57, wherein the distinct transmission configuration comprises: an indication of whether the plurality of third random access messages are to be sent using inter-slot frequency-hopping.

Aspect 59: The method of any of aspects 55 through 58, wherein receiving the first random access message comprises: receiving, from the UE, the first random access message comprising capability information of the UE indicating that the UE is capable of sending the third random access message one or more times according to the RAR configuration.

Aspect 60: The method of any of aspects 55 through 59, wherein receiving the first random access message comprises: receiving, from the UE, the first random access message comprising a request to send the third random access message one or more times according to the RAR configuration.

Aspect 61: The method of any of aspects 55 through 60, wherein receiving the first random access message comprises: receiving, from the UE via a PRACH, the first random access message comprising a RNTI corresponding to the UE.

Aspect 62: The method of any of aspects 55 through 61, wherein sending the second random access message comprises: sending, to the UE via the PDCCH, the second random access message.

Aspect 63: The method of any of aspects 55 through 62, wherein receiving the at least one third random access message of the plurality of third random access messages comprises: receiving, from the UE via an PUSCH, the at least one third random access message of the plurality of third random access messages sent by the UE according to the distinct transmission configuration corresponding to the interval.

Aspect 64: The method of any of aspects 55 through 63, wherein sending the second random access message during the interval comprises: sending, to the UE, the second random access message comprising information corresponding to the UE and at least one other device, a time at which the second random access message is sent indirectly indicating, without increasing a data size of the second random access message, a transmission configuration of the third random access message.

Aspect 65: An apparatus for wireless communications at a UE, comprising a processor; memory coupled with the processor; and instructions stored in the memory and executable by the processor to cause the apparatus to perform a method of any of aspects 1 through 11.

Aspect 66: An apparatus for wireless communications at a UE, comprising at least one means for performing a method of any of aspects 1 through 11.

Aspect 67: A non-transitory computer-readable medium storing code for wireless communications at a UE, the code comprising instructions executable by a processor to perform a method of any of aspects 1 through 11.

Aspect 68: An apparatus comprising a processor; memory coupled with the processor; and instructions stored in the memory and executable by the processor to cause the apparatus to perform a method of any of aspects 12 through 21.

Aspect 69: An apparatus comprising at least one means for performing a method of any of aspects 12 through 21.

Aspect 70: A non-transitory computer-readable medium storing code the code comprising instructions executable by a processor to perform a method of any of aspects 12 through 21.

Aspect 71: An apparatus for wireless communications at a UE, comprising a processor; memory coupled with the processor; and instructions stored in the memory and executable by the processor to cause the apparatus to perform a method of any of aspects 22 through 32.

Aspect 72: An apparatus for wireless communications at a UE, comprising at least one means for performing a method of any of aspects 22 through 32.

Aspect 73: A non-transitory computer-readable medium storing code for wireless communications at a UE, the code comprising instructions executable by a processor to perform a method of any of aspects 22 through 32.

Aspect 74: An apparatus for wireless communications at a base station, comprising a processor; memory coupled with the processor; and instructions stored in the memory and executable by the processor to cause the apparatus to perform a method of any of aspects 33 through 43.

Aspect 75: An apparatus for wireless communications at a base station, comprising at least one means for performing a method of any of aspects 33 through 43.

Aspect 76: A non-transitory computer-readable medium storing code for wireless communications at a base station, the code comprising instructions executable by a processor to perform a method of any of aspects 33 through 43.

Aspect 77: An apparatus comprising a processor; memory coupled with the processor; and instructions stored in the memory and executable by the processor to cause the apparatus to perform a method of any of aspects 44 through 54.

Aspect 78: An apparatus comprising at least one means for performing a method of any of aspects 44 through 54.

Aspect 79: A non-transitory computer-readable medium storing code the code comprising instructions executable by a processor to perform a method of any of aspects 44 through 54.

Aspect 80: An apparatus comprising a processor; memory coupled with the processor; and instructions stored in the memory and executable by the processor to cause the apparatus to perform a method of any of aspects 55 through 64.

Aspect 81: An apparatus comprising at least one means for performing a method of any of aspects 55 through 64.

Aspect 82: A non-transitory computer-readable medium storing code the code comprising instructions executable by a processor to perform a method of any of aspects 55 through 64.

It should be noted that the methods described herein describe possible implementations, and that the operations and the steps may be rearranged or otherwise modified and that other implementations are possible. Further, aspects from two or more of the methods may be combined.

Although aspects of an LTE. UE-A, UE-A Pro, or NR system may be described for purposes of example, and LTE. LTE-A, LTE-A Pro, or NR terminology may be used in much of the description, the techniques described herein are applicable beyond LTE, UE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration," Any aspect described herein as "exemplary" is not necessarily to be construed as preferred or advantageous over other aspects. Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communications at a user equipment (UE), comprising:
   receiving a system information block identifying a mapping between a first transmission parameter associated with transmissions from the UE and a repetition parameter associated with an uplink message;
   transmitting a random access request to establish a connection with a network entity;
   receiving, in response to transmitting the random access request, a random access response including control signaling transmitted with one or more transmission parameters associated with transmissions from the UE, wherein the one or more transmission parameters comprises the first transmission parameter, wherein the first transmission parameter maps to the repetition parameter associated with the uplink message in accordance with the received system information block; and transmitting, based at least in part on the first transmission parameter mapping to the repetition parameter in accordance with the received system information block, one or more repetitions of the uplink message according to the repetition parameter.

2. The method of claim 1, further comprising:

detecting a control channel element in the received random access response, wherein the first transmission parameter includes a location of the detected control channel element in a control resource set of the random access response.

3. The method of claim 2, wherein the repetition parameter is based at least in part on an index of the detected control channel element.

4. The method of claim 1, further comprising:

detecting an aggregation level associated with the received random access response, wherein the first transmission parameter includes the detected aggregation level.

5. The method of claim 1, further comprising:

detecting a reference signal sequence associated with the received random access response, wherein the first transmission parameter includes the detected reference signal sequence.

6. The method of claim 1, wherein transmitting the random access request comprises:

transmitting, in the random access request, a capability indication, wherein the one or more transmission parameters associated with the received random access response are based at least in part on the transmitted capability indication.

7. The method of claim 1, wherein transmitting the random access request comprises:

transmitting, in the random access request, a repetition request, wherein the one or more transmission parameters associated with the received random access response are based at least in part on the transmitted repetition request.

8. The method of claim 1, wherein:

a second transmission parameter associated with the received random access response maps to a second repetition parameter of the uplink message; and the one or more repetitions are transmitted according to the second repetition parameter.

9. The method of claim 1, wherein the repetition parameter comprises an indication of a presence of repetitions, a quantity of repetitions, an inter-slot frequency hopping pattern, an intra-slot frequency hopping pattern, a joint channel estimation configuration across the one or more repetitions, or any combination thereof.

10. The method of claim 1, wherein the received random access response includes a physical downlink control channel.

11. An apparatus for wireless communications at a user equipment (UE), comprising:

one or more processors;

memory coupled with the one or more processors; and instructions stored in the memory and executable by the one or more processors to cause the apparatus to:

receive a system information block identifying a mapping between a first transmission parameter associated with transmissions from the UE and a repetition parameter associated with an uplink message;

transmit a random access request to establish a connection with a network entity;

receive, in response to transmitting the random access request, a random access response including control signaling transmitted with one or more transmission parameters associated with transmissions from the UE, wherein the one or more transmission parameters comprises the first transmission parameter, wherein the first transmission parameter maps to the repetition parameter associated with the uplink message in accordance with the received system information block; and transmit, based at least in part on the first transmission parameter mapping to the repetition parameter in accordance with the received system information block one or more repetitions of the uplink message according to the repetition parameter.

12. The apparatus of claim 11, wherein the instructions are further executable by the one or more processors to cause the apparatus to:

detect a control channel element in the received random access response, wherein the first transmission parameter includes a location of the detected control channel element in a control resource set of the random access response, and wherein the repetition parameter is based at least in part on an index of the detected control channel element.

13. The apparatus of claim 12, wherein the repetition parameter is based at least in part on an index of the detected control channel element.

14. The apparatus of claim 11, wherein the instructions are further executable by the one or more processors to cause the apparatus to:

detect an aggregation level, a reference signal sequence, or both, associated with the received random access response, wherein the first transmission parameter includes the detected aggregation level, the detected reference signal sequence, or both.

15. The apparatus of claim 11, wherein the instructions to transmit the random access request are executable by the one or more processors to cause the apparatus to:

transmit, in the random access request, a capability indication, a repetition request, or both, wherein the one or more transmission parameters associated with the received random access response are based at least in part on the transmitted capability indication, the repetition request, or both.

16. The apparatus of claim 11, wherein the instructions are further executable by the one or more processors to cause the apparatus to:

detect a reference signal sequence associated with the received random access response, wherein the first transmission parameter includes the detected reference signal sequence.

17. The apparatus of claim 11, wherein the instructions to transmit the random access request are executable by the one or more processors to cause the apparatus to:

transmit, in the random access request, a repetition request, wherein the one or more transmission parameters associated with the received random access response are based at least in part on the transmitted repetition request.

18. The apparatus of claim 11, wherein:

a second transmission parameter associated with the received random access response maps to a second repetition parameter of the uplink message; and the one or more repetitions are transmitted according to the second repetition parameter.

19. The apparatus of claim 11, wherein the repetition parameter comprises an indication of a presence of repetitions, a quantity of repetitions, an inter-slot frequency hopping pattern, an intra-slot frequency hopping pattern, a joint channel estimation configuration across the one or more repetitions, or any combination thereof.

20. The apparatus of claim 11, wherein the received random access response includes a physical downlink control channel.

21. A non-transitory computer-readable medium storing code for wireless communications at a user equipment (UE), the code comprising instructions executable by one or more processors to:

receive a system information block identifying a mapping between a first transmission parameter associated with transmissions from the UE and a repetition parameter associated with an uplink message;

transmit a random access request to establish a connection with a network entity;

receive, in response to transmitting the random access request, a random access response including control signaling transmitted with one or more transmission parameters associated with transmissions from the UE, wherein the one or more transmission parameters comprises the first transmission parameter, wherein the first transmission parameter maps to the repetition parameter associated with the uplink message in accordance with the received system information block; and transmit, based at least in part on the first transmission parameter mapping to the repetition parameter in accordance with the received system information block, one or more repetitions of the uplink message according to the repetition parameter.

22. The non-transitory computer-readable medium of claim 21, wherein the instructions are further executable by the one or more processors to:

detect a control channel element in the received random access response, wherein the first transmission parameter includes a location of the detected control channel element in a control resource set of the random access response.

23. The non-transitory computer-readable medium of claim 21, wherein the instructions are further executable by the one or more processors to:

detect an aggregation level associated with the received random access response, wherein the first transmission parameter includes the detected aggregation level.

24. The non-transitory computer-readable medium of claim 21, wherein the instructions are further executable by the one or more processors to:

detect a reference signal sequence associated with the received random access response, wherein the first transmission parameter includes the detected reference signal sequence.

25. The non-transitory computer-readable medium of claim 21, wherein the instructions to transmit the random access request are further executable by the one or more processors to:

transmit, in the random access request, a capability indication, wherein the one or more transmission parameters associated with the received random access response are based at least in part on the transmitted capability indication.

26. The non-transitory computer-readable medium of claim 21, wherein the instructions to transmit the random access request are further executable by the one or more processors to:

transmit, in the random access request, a repetition request, wherein the one or more transmission parameters associated with the received random access response are based at least in part on the transmitted repetition request.

27. An apparatus for wireless communications at a user equipment (UE), comprising:

means for receiving a system information block identifying a mapping between a first transmission parameter associated with transmissions from the UE and a repetition parameter associated with an uplink message;

means for transmitting a random access request to establish a connection with a network entity;

means for receiving, in response to transmitting the random access request, a random access response including control signaling transmitted with one or more transmission parameters associated with transmissions from the UE, wherein the one or more transmission parameters comprises the first transmission parameter, wherein the first transmission parameter maps to the repetition parameter associated with the uplink message in accordance with the received system information block; and means for transmitting, based at least in part on the first transmission parameter mapping to the repetition parameter in accordance with the received system information block, one or more repetitions of the uplink message according to the repetition parameter.

* * * * *